(12) United States Patent
Takaki et al.

(10) Patent No.: US 10,639,983 B2
(45) Date of Patent: May 5, 2020

(54) WORK VEHICLE

(71) Applicant: Kubota Corporation, Osaka-shi (JP)

(72) Inventors: Go Takaki, Sakai (JP); Takahito Matsumori, Sakai (JP); Shunsuke Miyashita, Sakai (JP); Yukifumi Yamanaka, Sakai (JP); Masatoshi Sakai, Sakai (JP)

(73) Assignee: Kubota Corporation, Osaka (JP)

( * ) Notice: Subject to any disclaimer, the term of this patent is extended or adjusted under 35 U.S.C. 154(b) by 279 days.

(21) Appl. No.: 15/842,988

(22) Filed: Dec. 15, 2017

(65) Prior Publication Data

US 2018/0264928 A1 Sep. 20, 2018

(30) Foreign Application Priority Data

Mar. 16, 2017 (JP) .................................. 2017-051662
Mar. 16, 2017 (JP) .................................. 2017-051663

(Continued)

(51) Int. Cl.
*B60K 6/485* (2007.10)
*B60K 6/543* (2007.10)
(Continued)

(52) U.S. Cl.
CPC ................ *B60K 6/485* (2013.01); *B60K 1/00* (2013.01); *B60K 6/40* (2013.01); *B60K 6/405* (2013.01);
(Continued)

(58) Field of Classification Search
CPC .......... B60K 6/485; B60K 6/40; B60K 6/405; B60K 6/52; B60K 6/543; B60K 17/344;
(Continued)

(56) References Cited

U.S. PATENT DOCUMENTS

2002/0047352 A1* 4/2002 Shimizu ................... B60K 6/40
310/68 B
2009/0062052 A1* 3/2009 Kim ........................ B60K 6/365
475/5

(Continued)

FOREIGN PATENT DOCUMENTS

JP 201146300 A 3/2011
JP 2014133489 A 7/2014
JP 2015217797 A 12/2015

*Primary Examiner* — Edwin A Young
(74) *Attorney, Agent, or Firm* — The Webb Law Firm

(57) ABSTRACT

A work vehicle includes an assist motor that is located opposite an engine with respect to a continuously variable transmission device. The assist motor has an output shaft that extends coaxially with a drive shaft of the continuously variable transmission device and is interlocked with the drive shaft. A motor support platform that supports the assist motor protrudes more outward than the continuously variable transmission device does in a lateral direction relative to a vehicle body. The motor support platform includes a slide movement mechanism, and the slide movement mechanism is configured to change the position at which the assist motor is attached, relative to the continuously variable transmission device, axially of the drive shaft, between a connected position and a disconnected position of the drive shaft and the output shaft.

8 Claims, 34 Drawing Sheets

(30) Foreign Application Priority Data

Mar. 16, 2017 (JP) ................................ 2017-051664
Mar. 27, 2017 (JP) ................................ 2017-061296

(51) Int. Cl.

| | |
|---|---|
| *B60K 6/52* | (2007.10) |
| *B60K 6/405* | (2007.10) |
| *B60W 10/26* | (2006.01) |
| *B60W 50/00* | (2006.01) |
| *B60K 6/40* | (2007.10) |
| *B60W 20/10* | (2016.01) |
| *B60L 50/15* | (2019.01) |
| *B60W 10/08* | (2006.01) |
| *B60K 1/00* | (2006.01) |
| *B60W 10/06* | (2006.01) |
| *B60K 17/356* | (2006.01) |
| *B60K 17/344* | (2006.01) |
| *B60W 20/30* | (2016.01) |
| *B60W 10/10* | (2012.01) |
| *B62D 23/00* | (2006.01) |

(52) U.S. Cl.
CPC ............... *B60K 6/52* (2013.01); *B60K 6/543* (2013.01); *B60K 17/344* (2013.01); *B60K 17/356* (2013.01); *B60L 50/15* (2019.02); *B60W 10/06* (2013.01); *B60W 10/08* (2013.01); *B60W 10/26* (2013.01); *B60W 20/10* (2013.01); *B60W 50/0098* (2013.01); *B60W 10/10* (2013.01); *B60W 20/30* (2013.01); *B60W 2050/0088* (2013.01); *B60W 2510/081* (2013.01); *B60W 2520/10* (2013.01); *B60W 2540/10* (2013.01); *B60W 2710/083* (2013.01); *B60Y 2200/20* (2013.01); *B60Y 2200/92* (2013.01); *B60Y 2400/72* (2013.01); *B62D 23/005* (2013.01); *Y02T 10/6226* (2013.01); *Y02T 10/6265* (2013.01); *Y02T 10/7077* (2013.01)

(58) Field of Classification Search
CPC ..... B60K 17/356; B60W 10/06; B60W 10/08; B60W 20/10; B60W 20/20; B60Y 2200/20; B60Y 2200/92
See application file for complete search history.

(56) References Cited

U.S. PATENT DOCUMENTS

| | | | |
|---|---|---|---|
| 2014/0113766 A1 | 4/2014 | Yagyu et al. | |
| 2014/0144719 A1* | 5/2014 | Morgan | ............... B60K 1/00 180/65.31 |
| 2017/0043658 A1 | 2/2017 | Yagyu et al. | |

* cited by examiner

WORK VEHICLE

CROSS-REFERENCE TO RELATED APPLICATIONS

This application claims priority to Japanese Patent Applications Nos. 2017-051662, 2017-051663, and 2017-051664, each filed Mar. 16, 2017, and Japanese Patent Application No. 2017-061296, filed Mar. 27, 2017, the disclosures of which are hereby incorporated in their entirety by reference.

BACKGROUND OF THE INVENTION

1. Field of the Invention

The present invention relates to a work vehicle such as a multipurpose vehicle.

2. Description of the Related Art (1) First Related Art

JP 2014-133489 A (or US 2014/0113766 A1 corresponding thereto) discloses a hybrid work vehicle that includes two types of output devices for the vehicle to travel, namely an engine and an assist motor, and includes a continuously variable transmission device (CVT device) for transmitting driving forces from the engine and the assist motor. In this work vehicle, the continuously variable transmission device (belt type continuously variable transmission device) is provided on one side of the engine, and the assist motor is provided inside a case cover (a transmission case) of the continuously variable transmission device.

The motor is located opposite the engine across the continuously variable transmission device. Also, in the case cover, the motor is fixed to an engine block, using a supporting bracket, a clutch case, and so on, and the entirety of the motor is covered by the case cover.

Therefore, when it becomes necessary to perform maintenance work on the continuously variable transmission device or replace a belt, for example, it is necessary to remove the case cover so that the continuously variable transmission device and the motor are exposed to the outside, and then remove the motor, before performing maintenance and inspection work such as replacing the belt of the continuously variable transmission device. Therefore, it is necessary to take a lot of steps to perform maintenance and inspection work. In addition, since the motor in itself is a heavy object, it is necessary to prepare, for example, a device for lifting the motor, such as a crane. Thus, there is room for improvement in that it is difficult to perform maintenance and inspection work.

(2) Second Related Art

With the work vehicle disclosed in JP 2014-133489 A (US 2014/0113766 A1), it is necessary to remove the case cover of the continuously variable transmission device to inspect the assist motor inside the case. Also, since the entirety of the motor is covered by the case cover of the continuously variable transmission device, heat generated by the continuously variable transmission device as well as heat generated by the motor itself is likely to be trapped in the case cover. Therefore, a more efficient heat dissipation means or cooling means is needed.

To solve such a problem, a configuration in which the assist motor is provided outside the case cover of the continuously variable transmission device can be conceived of. However, in a multipurpose vehicle in which the engine is provided rearward of the driving section and below the load carrying platform, there are restrictions on the position of the assist motor, due to the positional relationship with the engine and the continuously variable transmission device. Therefore, it is difficult to select, and independently install the assist motor at, a position that is outside the case and at which the assist motor will not come into contact with another object, and at which the assist motor will not be affected by rainwater or splashed muddy water when the vehicle is travelling. Therefore, the assist motor needs to be provided in a state of being built into a cover. However, there is room for improvement in that the aforementioned thermal influence is problematic.

(3) Third Related Art

A multipurpose vehicle disclosed in JP 2011-046300 A includes a charging generator and a charging control device for controlling the generator, to charge a battery. However, with a configuration that is not provided with such a charging generator or the like, it is only possible to charge the battery on the condition that regenerative power for the motor can be used.

Therefore, there is room for improvement in that, with a multipurpose vehicle that is not provided with a charging generator or the like, it is not possible to charge the battery when the vehicle is not travelling.

(4) Fourth Related Art

A work vehicle disclosed in JP 2015-217797 A includes: an accelerator sensor that detects the operation amount of an acceleration tool; a vehicle speed sensor that detects the speed of the vehicle; an electric motor that outputs travelling power; a rotation sensor that detects the rotation speed of the electric motor; and a control unit that controls the operation of the electric motor. The control unit (a control device) includes: a storage section (a storage device) that stores a table that indicates target driving torque characteristics (a torque curve) relative to the vehicle speed; a torque setting unit (torque calculation unit) that sets a torque instruction value (a target driving torque) based on the table, detection performed by the accelerator sensor (pedal operation amount sensor), and detection performed by the vehicle speed sensor (the vehicle speed calculated by the vehicle speed calculation unit); and a torque control unit (a travelling inverter) that controls the operation of an electric motor (a travelling motor) such that the output torque from the electric motor reaches the torque instruction value.

Usually, in a work vehicle such as that described above, the storage section stores a torque limit value that has been set based on the vehicle speed limit value (the maximum vehicle speed), and if the torque instruction value, which is set based on the table, detection performed by the accelerator sensor, and detection performed by the vehicle speed sensor, exceeds the torque limit value, the torque setting unit fixes the torque instruction value to the torque limit value so that the torque instruction value does not exceed the torque limit value.

The torque limit value is set based on a speed limit value that is set with reference to the travelling resistance on flat ground. Therefore, if the torque instruction value, which is set by the torque setting unit, reaches the torque limit value while the work vehicle is travelling on flat ground, the vehicle speed, which is obtained by the torque control unit performing a control operation, is the same as or substantially the same as the speed limit value. As a result, it is possible to keep the vehicle speed at the speed limit value.

However, when the work vehicle is travelling on an upslope or the like that has a larger travelling resistance than flat ground, the torque instruction value, which is set by the torque setting unit, may reach the torque limit value even if the vehicle speed has not reached the speed limit value. In such a case, an amount by which the vehicle speed obtained by the torque control unit performing a control operation is lower than the speed limit value increases as the travelling resistance increases.

Conversely, when the work vehicle is travelling on a downslope or the like that has a smaller travelling resistance than flat ground, the vehicle speed may exceed the speed limit value even if the torque instruction value, which is set by the torque setting unit, has not reached the torque limit value. In such a case, an amount by which the vehicle speed obtained by the torque control unit performing a control operation is higher than the speed limit value increases as the travelling resistance decreases.

Therefore, it is desirable to make it easier to keep the vehicle speed at the speed limit value regardless of changes in the travelling resistance.

SUMMARY OF THE INVENTION (1) The work vehicle as under is proposed in view of First Related Art.

A work vehicle comprising:

an engine;

a continuously variable transmission device that is located on a lateral side of the engine and receives a driving force from the engine, the continuously variable transmission device having a drive shaft;

an assist motor that is located opposite the engine across the continuously variable transmission device, the assist motor having an output shaft that extends coaxially with the drive shaft and is interlocked with the drive shaft;

a motor support platform that supports the assist motor, the motor support platform protruding more outward than the continuously variable transmission device does in a lateral direction relative to a vehicle body; and a slide movement mechanism that is provided for the motor support platform, the slide movement mechanism being configured to change a position at which the assist motor is attached, relative to the continuously variable transmission device, axially of the drive shaft, between a connected position and a disconnected position of the drive shaft and the output shaft.

With this configuration, it is possible to move the position at which the assist motor is attached, toward and away from the continuously variable transmission device, while keeping the assist motor in the state of being supported by the motor support platform. Therefore, it is easier to perform maintenance and inspection work such as replacing the belt of the continuously variable transmission device, without using, for example, a heavy object lifting device such as a crane device.

According to one preferred embodiment, the work vehicle further comprises: a vehicle frame to which the engine and the continuously variable transmission device are attached;

wherein the motor support platform includes an extension frame portion that protrudes more outward than the continuously variable transmission device attached to the vehicle frame does in a lateral direction relative to the vehicle body, and a motor attachment frame that is attached to the extension frame portion so as to be movable relative to the extension frame portion, the slide movement mechanism is provided between the extension frame portion and the motor attachment frame, and the assist motor is attached to the motor attachment frame.

With the configuration, the motor attachment frame, which is movable relative to the extension frame portion of the vehicle frame, is provided separately from the extension frame portion. Therefore, it is easier to form the extension frame portion of the vehicle frame side so as to be relatively compact. That is, if an area on which the assist motor is mounted and an area in which the assist motor can be moved are secured using only the extension frame portion of the vehicle frame, there is the risk of the extension frame portion being long in the direction in which the axis of the drive shaft of the continuously variable transmission device extends. However, due to the slide movement mechanism being provided between the extension frame portion and the motor attachment frame that is movable relative to the extension frame portion, the extension frame portion needs only have an extension length that makes it possible to secure the area in which the assist motor can be moved.

According to another preferred embodiment, the slide movement mechanism includes an elongated slot that is formed in one of the extension frame portion and the motor attachment frame and extends axially of the drive shaft, and a guide member that is formed on the other of the extension frame portion and the motor attachment frame and is guided by being engaged with the elongated slot.

With the configuration, the slide movement mechanism can be formed with a simple configuration, using an elongated slot, which has a long diameter in the direction in which the axis of the drive shaft of the continuously variable transmission device extends, and the guide member, which is guided by engaging with the elongated slot.

(2) The multipurpose vehicle as under is proposed in view of Second Related Art.

A multipurpose vehicle comprising:

a pair of right and left front wheels and a pair of right and left rear wheels;

a vehicle frame that is supported by the front wheels and the rear wheels;

a driving section that is located on a front portion of the vehicle frame;

a load carrying platform that is located on the vehicle frame at a position that is rearward of the driving section;

an engine and an assist motor that transmit driving forces to the front wheels and the rear wheels, the engine being located below the load carrying platform, the assist motor being located forward of the rear wheels and laterally outward of the engine, and the assist motor including a connection terminal portion, to which a wire is connected, in an upper portion thereof; and a motor cover that covers the assist motor, the motor cover including a top cover portion that covers an upper portion of the assist motor, the upper portion including the connection terminal portion, and a cover supporting portion that supports the top cover portion, the cover supporting portion including an opening portion that allows external air to come into contact with the assist motor.

With this configuration, the motor cover, which includes the top cover portion and the cover supporting portion, makes it possible to avoid problems such as another object coming into contact with the connection terminal portion of the assist motor, rainwater falling thereon, and splashed muddy water attaching thereto.

Nevertheless, since the opening portion is provided in the cover supporting portion of the motor cover, it is possible to supply and discharge external air through the opening portion. Therefore, it is possible to effectively utilize a heat dissipation effect resulting from contact with external air while the machine body is travelling. Thus, with a simple configuration in which the opening portion is simply provided in the cover supporting portion, it is possible to reliably protect the connection terminal portion, which is to be prevented from coming into contact with another object or the like, and effectively dissipate heat from the assist motor and the vicinity thereof.

According to one preferred embodiment, the motor cover covers a bottom surface of the assist motor, a rear surface of the assist motor, which faces a front side of the rear wheels, and a connection terminal portion and the vicinity thereof, and a front surface and right and left surfaces of the assist motor are open to the outside through the opening portion.

With the configuration, the motor cover covers the bottom surface of the assist motor, the rear surface of the assist motor, which faces the front side of the rear wheels, and the connection terminal portion and the vicinity thereof. Therefore, it is easier to reliably prevent another object from coming into contact with the connection terminal portion, and prevent muddy water splashed from the road surface or the rear wheels side from attaching to the connection terminal portion.

Also, the front surface and the right and left surfaces of the assist motor are open to the outside, and therefore hot air that surrounds the assist motor is diffused due to contact with external air while the machine body is travelling, and heat is efficiently dissipated.

According to another preferred embodiment, the multipurpose vehicle further comprises:

a motor support platform that protrudes laterally outward from the vehicle frame, and on which the assist motor is mounted; and a continuously variable transmission mechanism that is provided on a lateral side of the engine, wherein the cover supporting portion is attached to the motor support platform at a position that is laterally outward of the continuously variable transmission mechanism, and the top cover portion is coupled to the vehicle frame at a position that is forward of the motor support platform.

With the configuration, the top cover portion that is at a distance from the motor support platform is coupled and fixed to the machine body frame at a position that is forward of the motor support platform. Therefore, the supporting strength of the motor support platform, which is reduced due to the opening portion being provided, is supplemented by being coupled to the machine body frame, and the motor cover is firmly supported.

(3) The multipurpose vehicle as under is proposed in view of Third Related Art.

A multipurpose vehicle comprising:

a pair of right and left front wheels and a pair of right and left rear wheels;

a vehicle frame that is supported by the front wheels and the rear wheels;

a driving section that is located on a front portion of the vehicle frame;

a load carrying platform that is located on the vehicle frame at a position that is rearward of the driving section;

an engine;

an assist motor;

a battery that supplies a driving force for the assist motor to the assist motor;

a travelling power transmission mechanism that transmits driving forces from the engine and the assist motor to the front wheels and the rear wheels; and a power transmission state switching device that is located downstream of the travelling power transmission mechanism in a direction in which power is transmitted, and is configured to connect and disconnect transmission of travelling power from the travelling power transmission mechanism to the front wheels and the rear wheels, wherein the power transmission state switching device is configured to be switchable to:

a parallel hybrid travel driving state in which a driving force from the engine and a driving force from the assist motor are both transmitted to the front wheels and the rear wheels via the travelling power transmission mechanism, a regenerative brake state in which regenerative torque is transmitted from the travelling power transmission mechanism to the assist motor, and a non-travelling charging state in which power is not transmitted from the travelling power transmission mechanism to the front wheels or the rear wheels, and power generated by the engine is transmitted to the assist motor as regenerative torque.

With this configuration, due to the non-travelling charging state realized by the power transmission state switching device, a multipurpose vehicle, which has a configuration without a charging generator or the like, can use engine power as regenerative torque for the assist motor even while the multipurpose vehicle is not travelling. Therefore, it is possible to perform charging while the multipurpose vehicle, which is not provided with a charging generator or the like, is not travelling.

According to one preferred embodiment, the engine is located below the load carrying platform so as to overlap the rear wheels in side view, the travelling power transmission mechanism is located on one side of the engine, the assist motor is located opposite the engine with respect to the travelling power transmission mechanism, and the battery is located in a space below the driving section.

With the configuration, it is possible to effectively use a space below the load carrying platform of the multipurpose vehicle to arrange the devices such as the engine, which is a heavy object, the travelling power transmission mechanism, and the assist motor in a balanced manner. Also, it is possible to use a space below the driving section, which is different from the space for the prime mover section, to separately arrange the battery, which is a heavy object, such that the machine body has a good weight balance overall.

(4) The work vehicle as under is proposed in view of Fourth Related Art.

A work vehicle comprising:

an acceleration tool;

an accelerator sensor that detects an operation amount of the acceleration tool;

a vehicle speed sensor that detects a vehicle speed;

an electric motor that outputs travelling power;

a rotation sensor that detects a rotation speed of the electric motor;

a control unit that controls an operation of the electric motor;

wherein the control unit includes: a storage section that stores data that indicates a relationship between the rotation speed and output torque of the electric motor; a torque setting section that sets a torque instruction value based on the data, detection performed by the accelerator sensor and detection performed by the rotation sensor; and a torque controller section that controls an operation of the electric motor so that the output torque reaches the torque instruction value, the storage section stores a torque limit value that has been set based on a speed limit value of the vehicle, the control unit includes a limit value optimizer section, if the torque instruction value reaches the torque limit value when the vehicle speed has not reached the speed limit value, the limit value optimizer section performs limit value lowering processing to lower the torque limit value so that the vehicle speed increases toward the speed limit value, and if the vehicle speed exceeds the speed limit value, the limit value optimizer section performs limit value raising processing to raise the torque limit value so that the vehicle speed decreases toward the speed limit value.

With this configuration, if the torque instruction value, which is set by the torque setting section, reaches the torque limit value before the vehicle speed reaches the speed limit value (the maximum vehicle speed) when the work vehicle is travelling on an upslope or the like that has a large travelling resistance, the limit value optimizer section performs limit value lowering processing, so that the torque instruction value decreases together with the torque limit value. Thus, even if the travelling resistance is large, it is possible to raise the vehicle speed toward the speed limit value due to the torque controller section performing control. Then, upon the vehicle speed reaching the speed limit value, the limit value optimizer section ends limit value lowering processing, and the vehicle speed is kept at the speed limit value due to the torque controller section performing control based on the torque instruction value at this end point.

Conversely, if the vehicle speed exceeds the speed limit value when the work vehicle is travelling on a downslope or the like that has a small travelling resistance, the limit value optimizer section performs limit value raising processing, so that the torque instruction value increases together with the torque limit value. Thus, if the travelling resistance is small, it is possible to lower the vehicle speed toward the speed limit value due to the torque controller section performing control. Then, upon the vehicle speed reaching the speed limit value, the limit value optimizer section ends limit value raising processing, and the vehicle speed is kept at the speed limit value due to the torque controller section performing control based on the torque instruction value at this end point.

That is, due to control performed by the limit value optimizer section, it is possible to appropriately adjust the torque limit value according to changes in the travelling resistance, and due to this adjustment, it is easier to keep the vehicle speed at the speed limit value regardless of changes in the travelling resistance.

According to one preferred embodiment, the limit value optimizer section performs integral control using the speed limit value as a target value and the vehicle speed as a control amount, to perform the limit value raising processing.

With the configuration, it is possible to eliminate a residual deviation that occurs in limit value raising processing. Consequently, it is possible to keep the vehicle speed at the speed limit value with high accuracy when the work vehicle is travelling on a downslope or the like that has a small travelling resistance.

(5) Other features, and advantageous effects achieved thereby will become apparent from reading the following description with reference to the accompanying drawings.

BRIEF DESCRIPTION OF THE DRAWINGS

FIG. 34 is a rear view of a steering wheel and the vicinity thereof, showing the arrangement of a main switch, a selection switch, and so on.

DETAILED DESCRIPTION OF PREFERRED EMBODIMENTS

The front-rear direction and the right-left direction in each of the embodiments are as follows, unless otherwise specified. A forward travelling direction in which the travelling machine body travels to perform a work (see an arrow F in FIG. 2) is "forward", a rearward travelling direction (see an arrow B in FIG. 2) is "rearward", a direction corresponding to the right of the travelling machine body when the travelling machine body faces forward (see an arrow R in FIG. 2) is "right", and, similarly, a direction corresponding to the left of the travelling machine body (see an arrow L in FIG. 2) is "left".

First Embodiment

Overall Configuration

Figure 1:
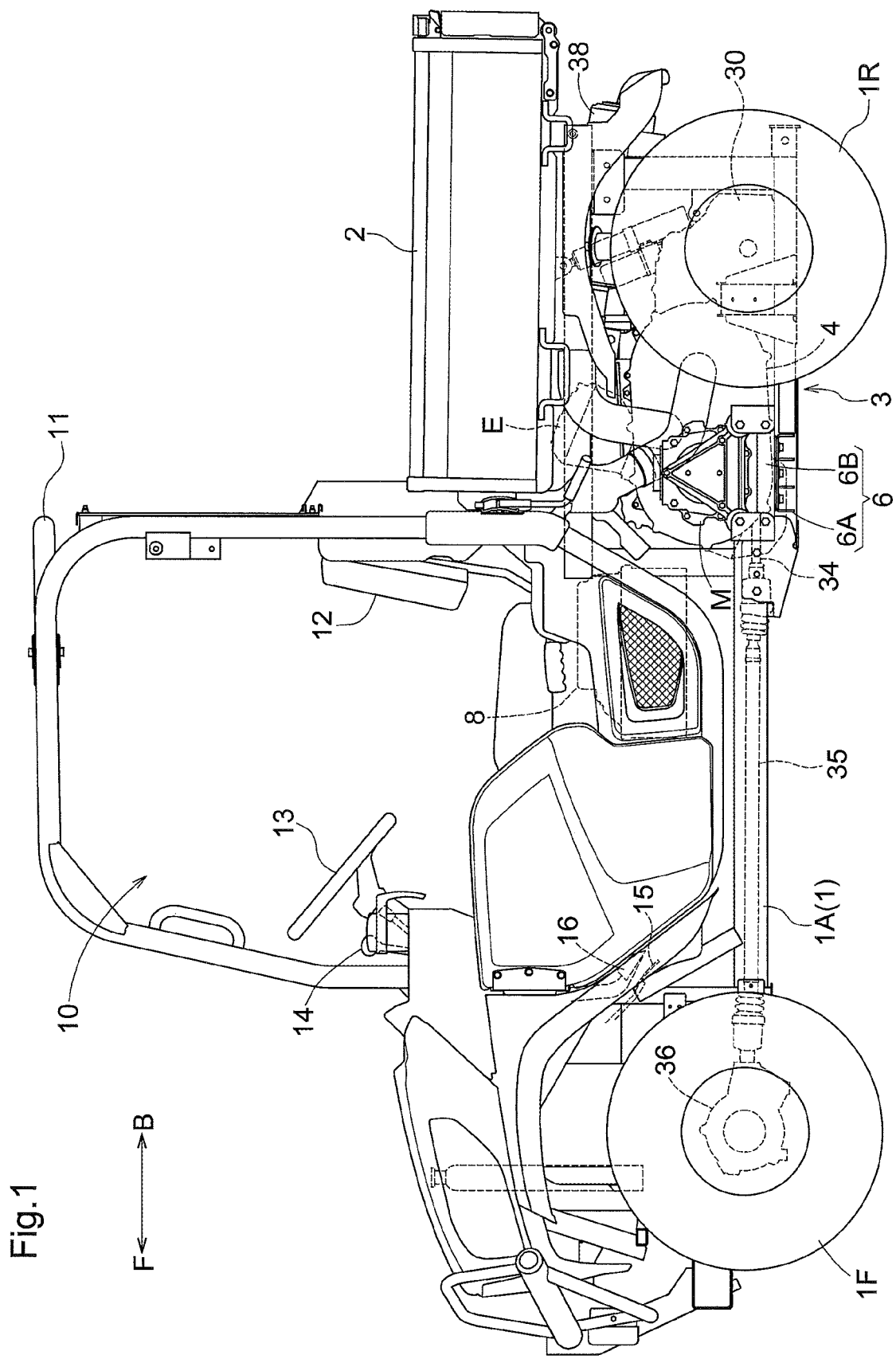
FIG. 1 is a left side view of a utility vehicle according to a first embodiment (the same applies through to FIG. 11).
Figure 2:
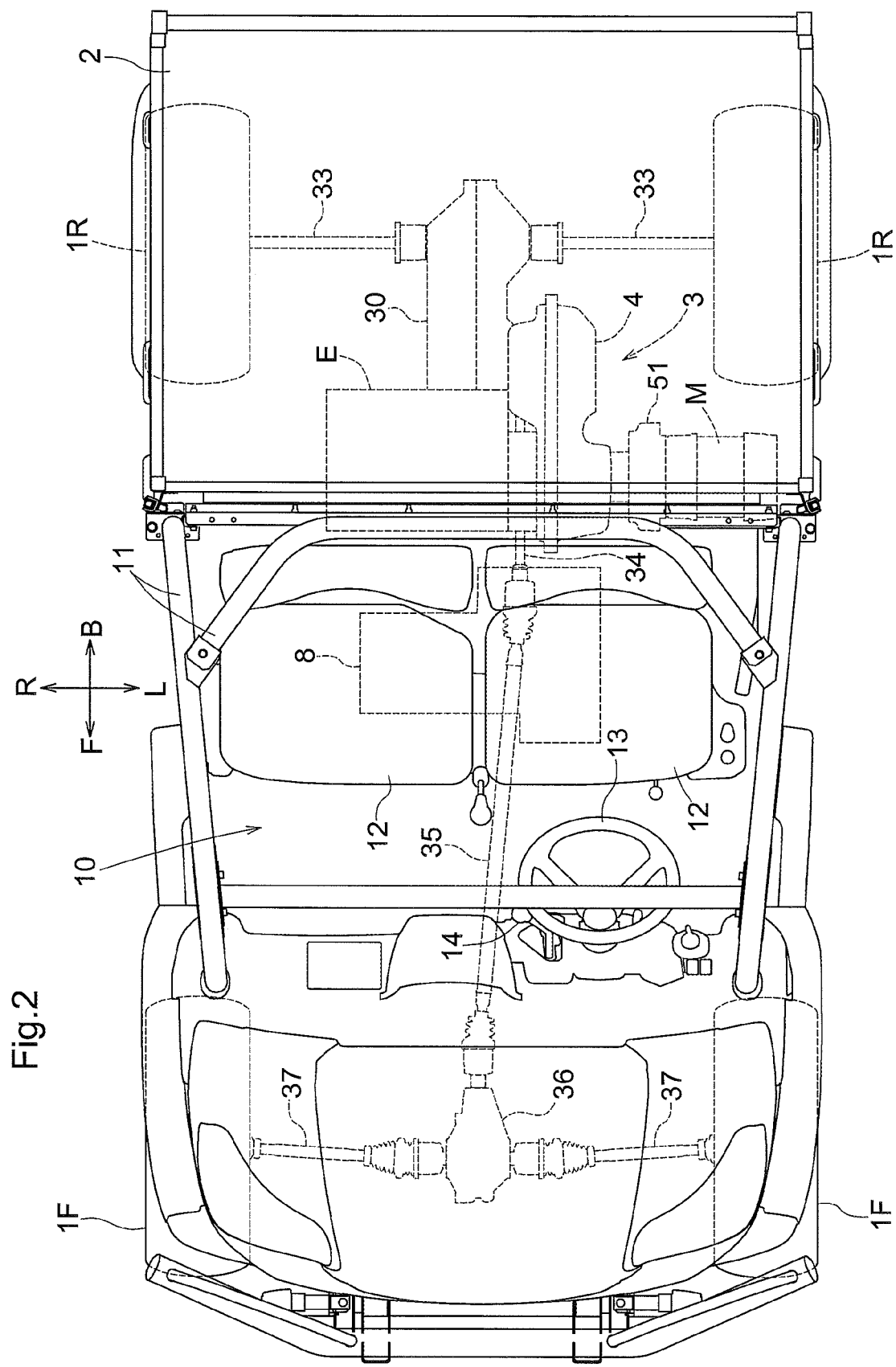
FIG. 2 is a plan view of the utility vehicle.

As shown in FIGS. 1 and 2, a utility vehicle (an example of a work vehicle) includes a pair of right and left front wheels 1F that are steerable, in a front portion of a vehicle frame 1 that constitutes the framework of a travelling machine body, and a pair of right and left rear wheels 1R that are not steerable are supported in a rear portion of the vehicle frame 1.

A driving section 10 is provided in a central portion of the travelling machine body in the front-rear direction, above the vehicle frame 1. A load carrying platform 2 is provided in a rear portion of the travelling machine body, above the vehicle frame 1, and a prime mover section 3 is provided below the load carrying platform 2.

The front wheels 1F and the rear wheels 1R are configured such that driving forces from an engine E and an assist motor M, which are included in the prime mover section 3 described below, can be transmitted thereto. Thus, the utility vehicle is configured as a four-by-four type four-wheel drive vehicle, and is used for multiple purposes such as farm work and transportation work. A ROPS frame (rollover protection structure frame) 11 for protecting the driving section 10 is provided around the driving section 10.

The load carrying platform 2 function to discharge loads like a dump truck by raising the front end side thereof about a right-left axis extending on the rear end side, and the load carrying platform 2 is supported on the vehicle frame 1 so as to be swingable about the lateral axis. Also, a hydraulic actuator (not shown) that raises and lowers the front end side of the load carrying platform 2 is provided.

The driving section 10 includes a driver's seat 12 for a driver to sit on, a steering wheel 13 for performing control to steer the front wheels 1F, a shift lever 14, an accelerator pedal 15 for controlling the travelling speed, and a brake pedal 16 for operating brake devices 17 for the front wheels 1F and the rear wheels 1R. Typically, a passenger seat is provided adjacent to a driver's seat 12. However, this driver's seat 12 is configured as a bench seat that is constituted by one laterally-elongated seat base and one laterally-elongated seat back.

A fuel tank (not shown) for supplying fuel to the engine E and a battery 8 for supplying electrical power to the assist motor M are provided in an under-seat space, which is a space below the driver's seat 12.

Configuration of Prime Mover Section

Figure 3:
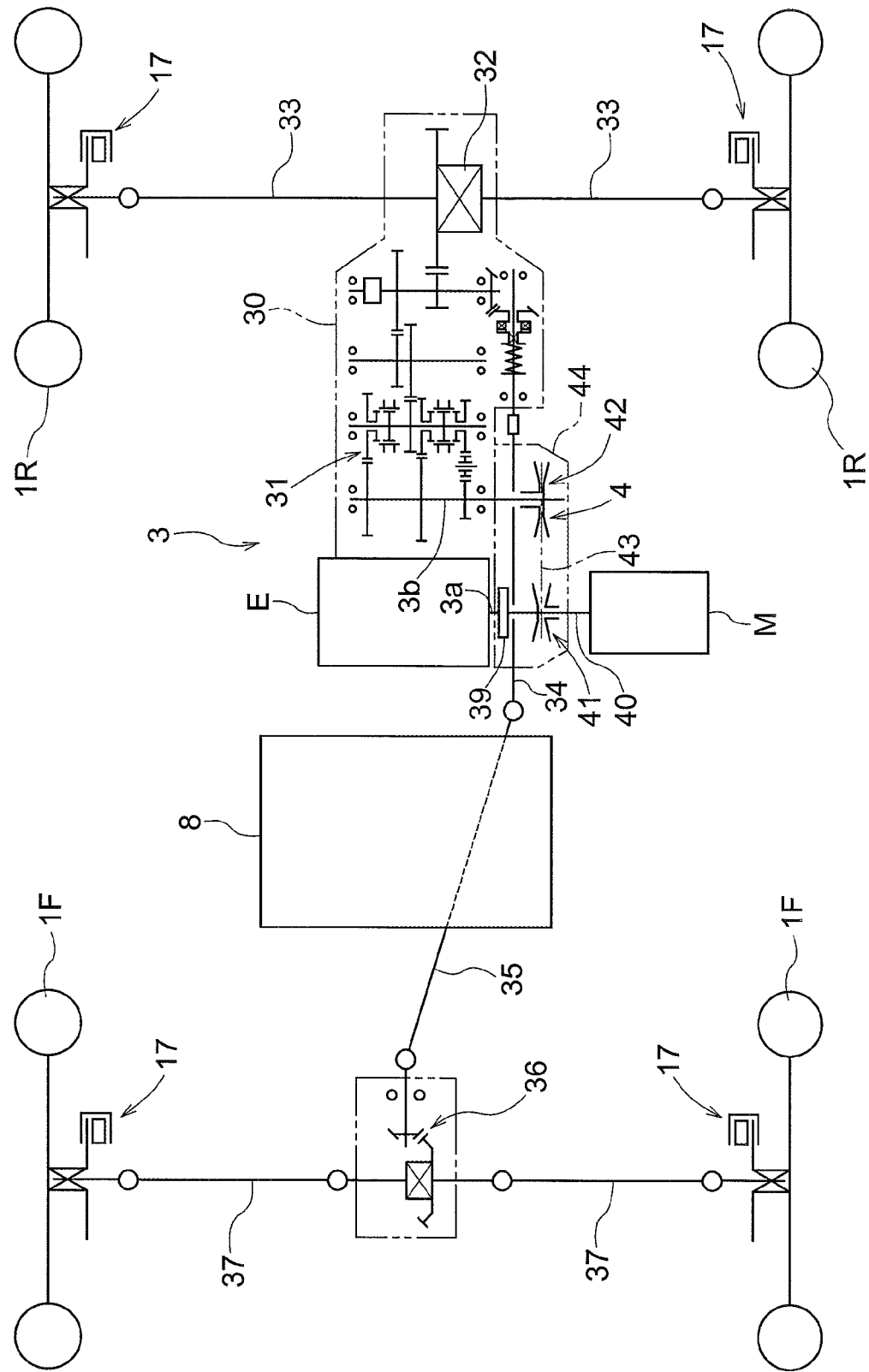
FIG. 3 is a schematic diagram showing power transmission systems for the utility vehicle.

As shown in FIGS. 2 and 3, the prime mover section 3 is provided below the load carrying platform 2 in a rear portion of the travelling machine body.

The prime mover section 3 includes: a water-cooled type gasoline engine E, which is an internal combustion engine in the illustrated embodiment (hereinafter simply referred to as "engine E"); the assist motor M (hereinafter simply referred to as "assist motor"), which is constituted by an electric motor; a transmission case 30; and a dry-type continuously variable transmission device 4. A gear shift mechanism 31 and a differential mechanism 32 are built into the transmission case 30. A pair of right and left rear wheel drive shafts 33 that transmit a driving force from the differential mechanism 32 to the rear wheels 1R are provided in a lower end portion of the transmission case 30.

A power take-off shaft 34 that protrudes forward is provided in a lower end portion of the transmission case 30. A transmission shaft 35 to which a driving force from the power take-off shaft 34 is transmitted is provided in a lower portion of the travelling machine body, and a front wheel differential mechanism 36, to which a driving force from the transmission shaft 35 is transmitted, and front wheel drive shafts 37, which transmit a driving force from the front wheel differential mechanism 36 to the front wheels 1F, are provided in a front portion of the travelling machine body.

The brake devices 17 are provided at the shaft ends of the pair of right and left front wheel drive shafts 37 and the shaft ends of the pair of right and left rear wheel drive shafts 33. The brake devices 17 function to apply braking forces to the front wheels 1F and the rear wheels 1R upon the brake pedal 16 being operated.

The gear shift mechanism 31 provided in the transmission case 30 is subjected to gear shifting upon the shift lever 14 being operated. In accordance with an operation made with the shift lever 14, the gear shift mechanism 31 changes the travelling speed of the travelling machine body (a high speed and a low speed), and changes the direction in which the traveling machine body travels (forward travelling and rearward travelling). The shift lever 14 is configured such that the setting of a travelling speed and the switching between forward travelling and rearward travelling can be performed by operating a single lever. However, a lever for a shift operation and a forward and rearward travelling lever for switching between forward travelling and rearward traveling may be configured as separate levers.

Figure 4:
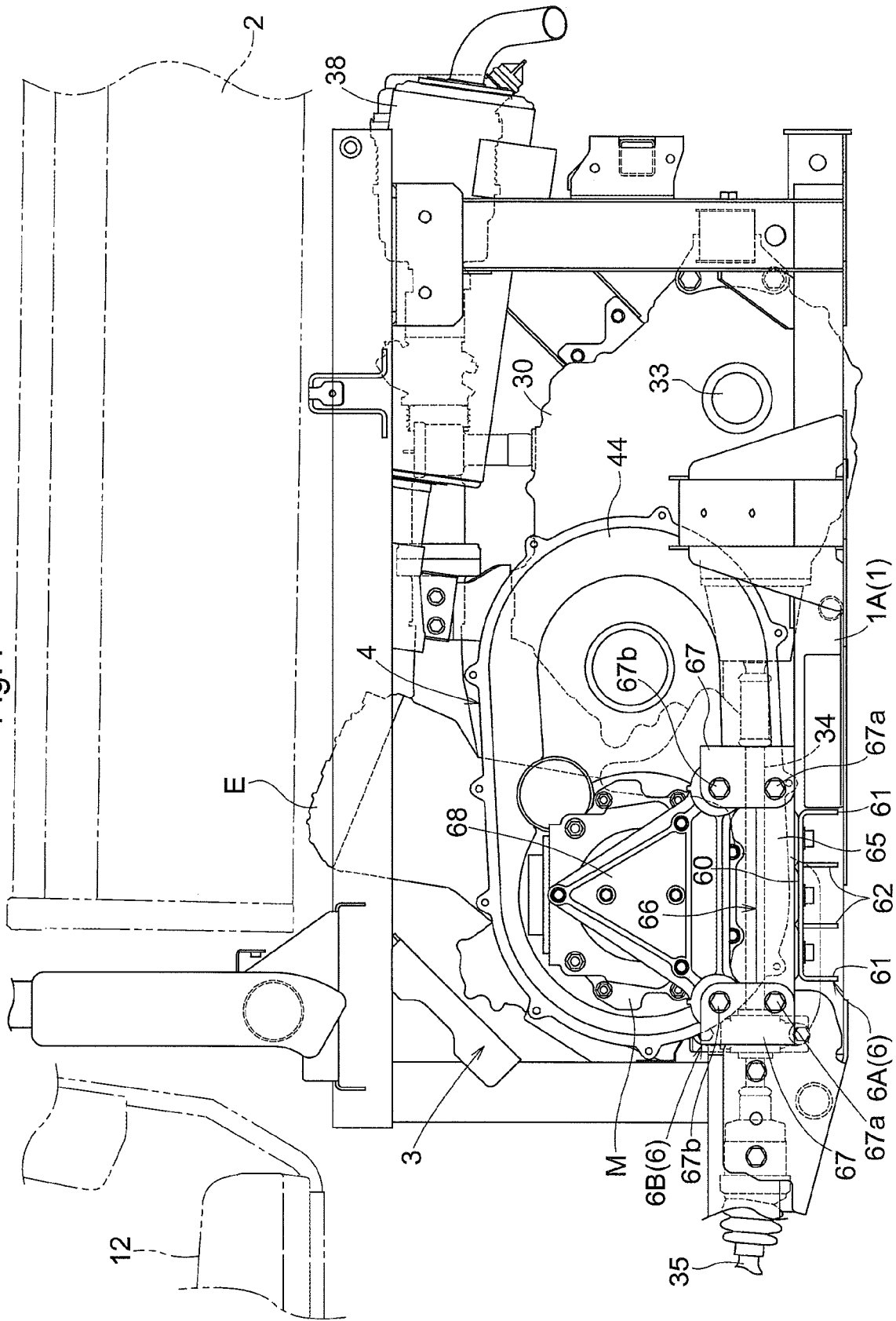
FIG. 4 is a left side view showing a prime mover section of the utility vehicle.
Figure 5:
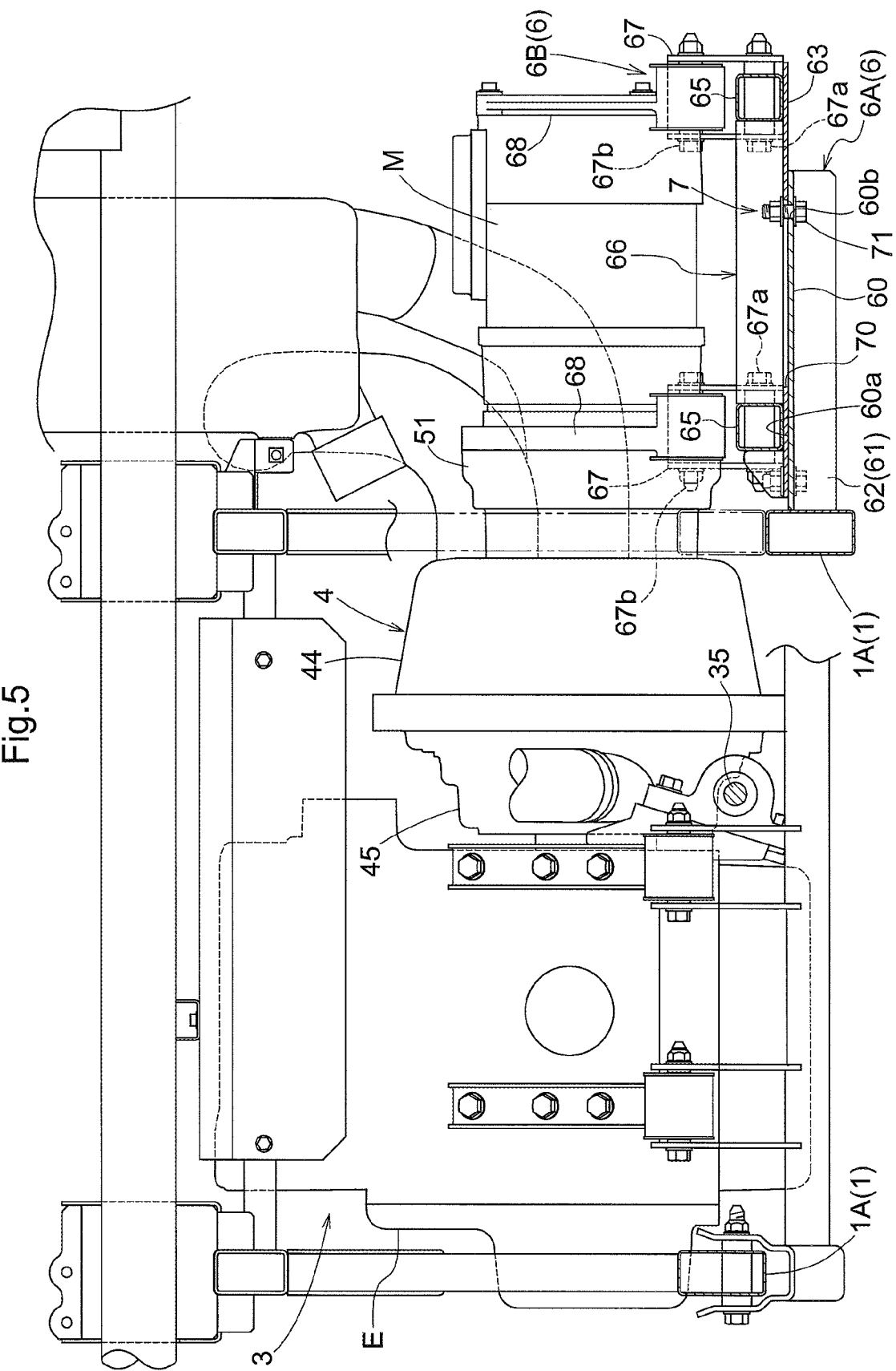
FIG. 5 is a front view showing the prime mover section of the utility vehicle.
Figure 6:
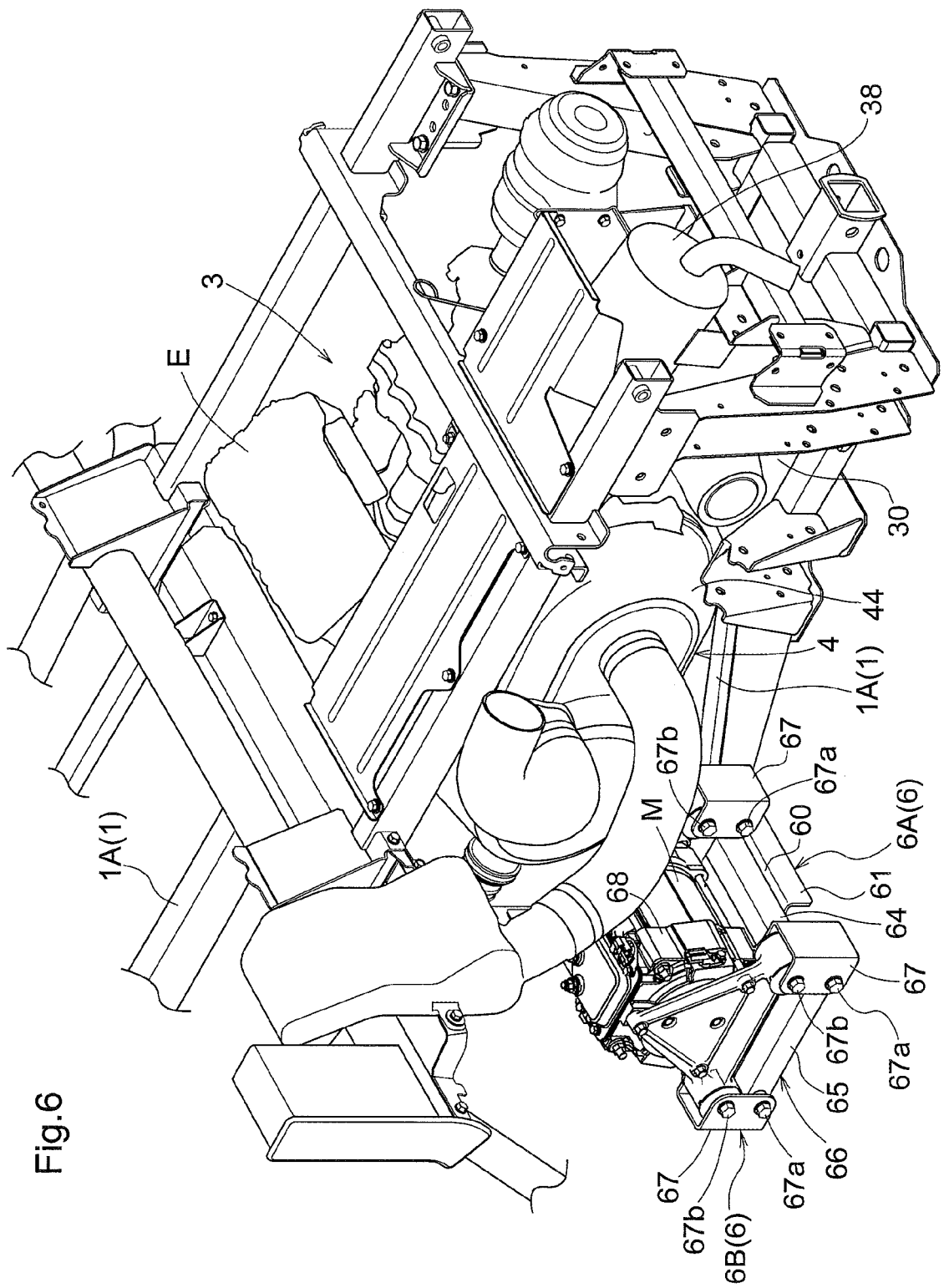
FIG. 6 is a perspective view showing the prime mover section of the utility vehicle.
Figure 7:
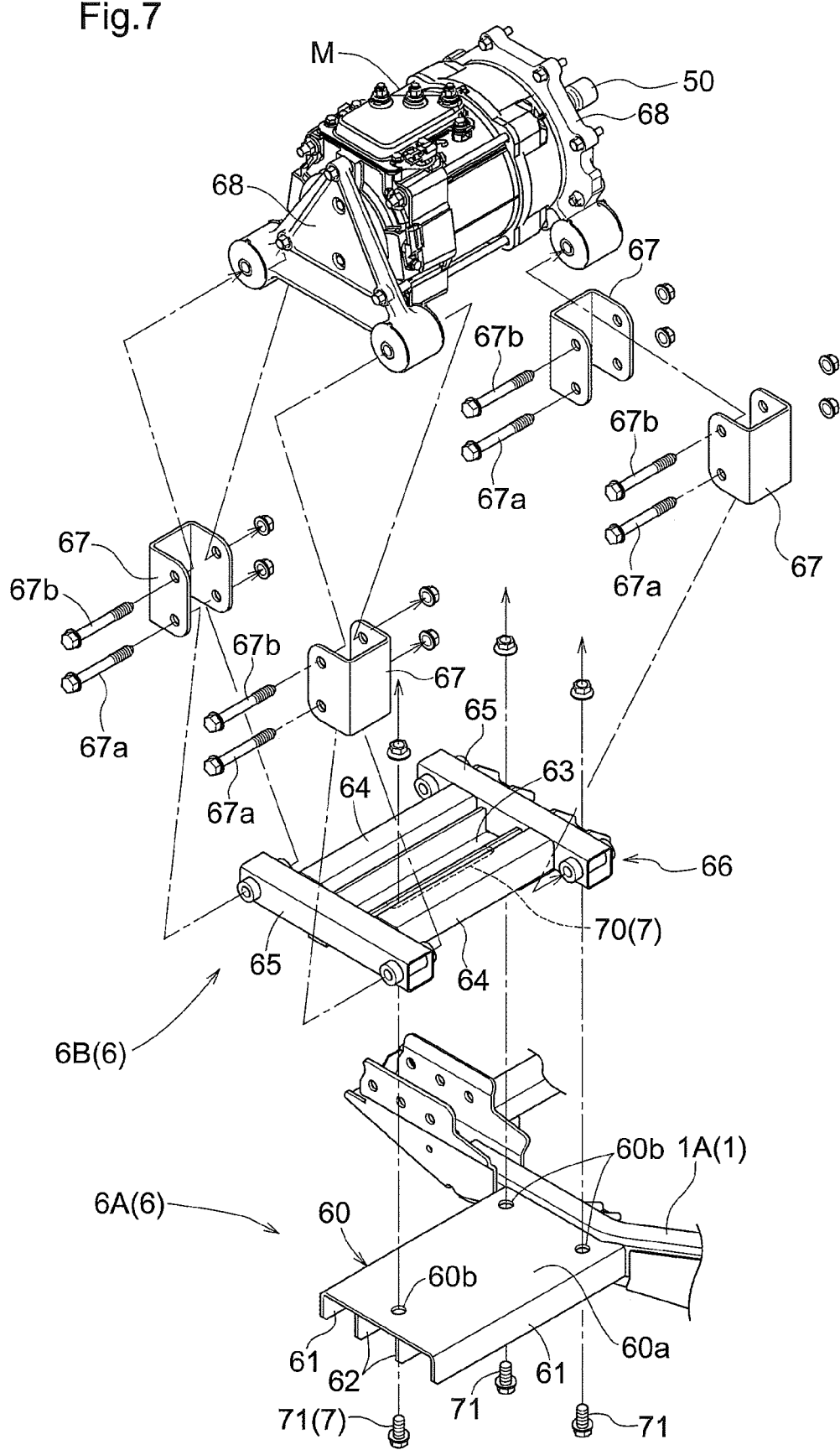
FIG. 7 is an exploded perspective view showing an assist motor and a motor support platform.

As shown in FIGS. 2, 3 and 5, the engine E is provided in the prime mover section 3 such that a crankshaft 3a thereof is orientated in a lateral direction. The transmission case 30 is provided at a position that is rearward of and adjacent to the crankshaft 3a such that an input shaft 3b is orientated in a lateral direction. A front-rear elongated muffler 38 (see FIG. 4) provided in an upper portion of the transmission case 30 rearward of the engine E.

The continuously variable transmission device 4 is provided on a lateral side each of the engine E and the transmission case 30 for transmitting power from the engine E to the transmission case 30. The assist motor M is located opposite the engine E across the continuously variable transmission device 4.

Continuously Variable Transmission Device (CVT device)

Figure 8:
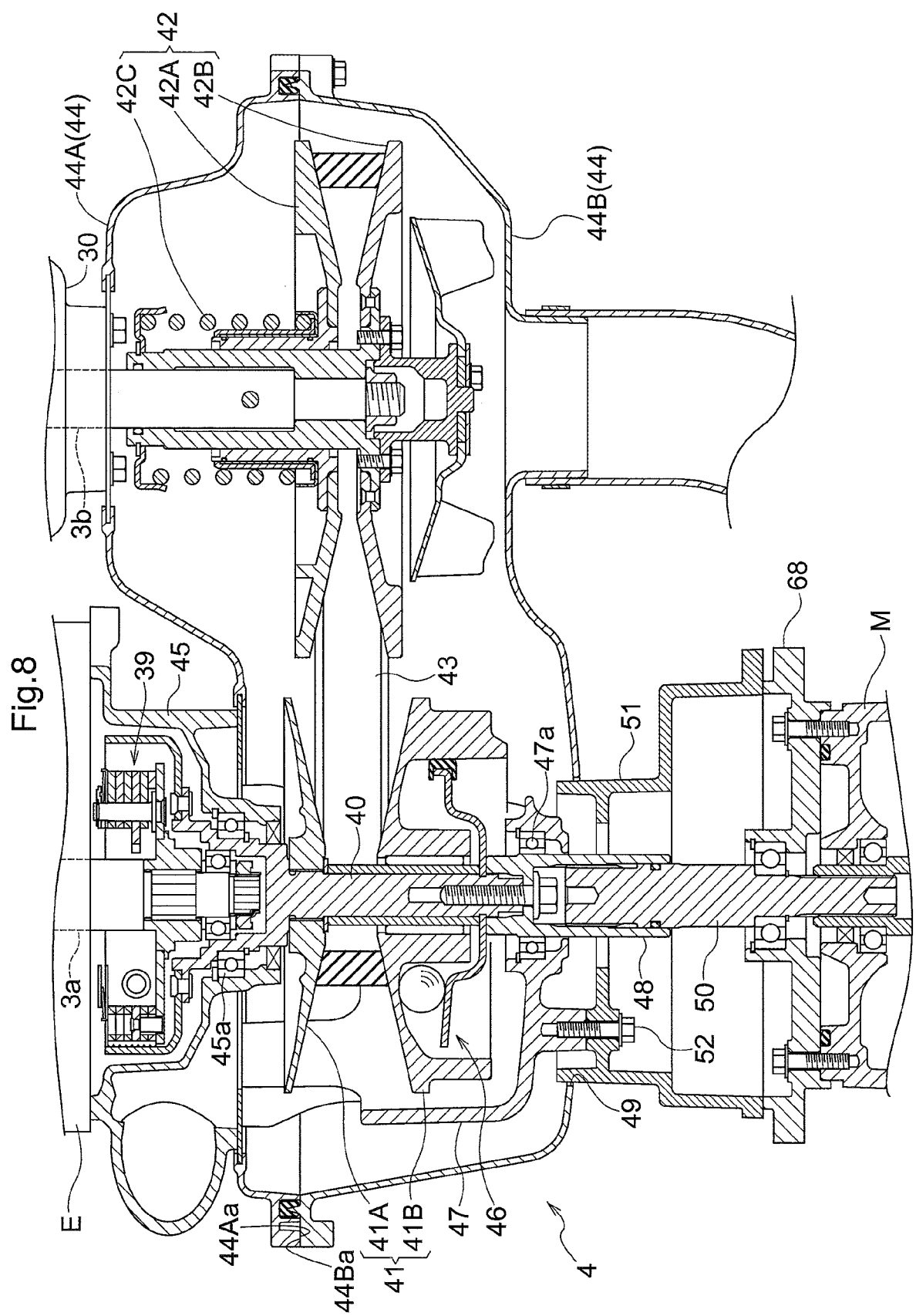
FIG. 8 is a view in horizontal section showing a structure for transmitting power from an engine and the assist motor to a continuously variable transmission device.

As shown in FIGS. 3 and 8, the continuously variable transmission device 4 includes: a driving pulley 41 (corresponding to the driving rotating body according to the present invention) whose belt winding diameter is changeable; a driven pulley 42 (corresponding to the driven rotating body according to the present invention) whose belt winding diameter is changeable; and an endless belt 43 that is made of rubber and is wound around the driving pulley 41 and the driven pulley 42. These components are housed in a transmission case 44. Note that a metal belt may be used as the endless belt 43.

A centrifugal clutch 39 that connects and disconnects a rotational driving force from the crankshaft 3a of the engine E to the continuously variable transmission device 4 is provided between the engine E and the continuously variable transmission device 4. A drive shaft 40 that is provided on the output side of the centrifugal clutch 39 includes the driving pulley 41 of the continuously variable transmission device 4.

A portion of the drive shaft 40 near the end thereof on the engine E side is rotatably supported by a bearing 45a that is provided in a clutch case 45, and a portion of the drive shaft 40 near the end thereof on the assist motor M side is rotatably supported by a bearing 47a that is provided in a support bracket 47. The input shaft 3b in the transmission case 30 includes the driven pulley 42. The drive shaft 40 of the centrifugal clutch 39 is provided coaxially with the crankshaft 3a.

When the crankshaft 3a is rotating at a low rotation speed that is lower than a predetermined value, the centrifugal clutch 39 is in a disconnected state and does not transmit the rotational force of the crankshaft 3a to the drive shaft 40. When the rotation speed of the crankshaft 3a exceeds the predetermined value, the centrifugal clutch 39 comes into a connected state and transmits the rotational force of the crankshaft 3a to the drive shaft 40.

The driving pulley 41 includes a fixed sheave 41A that is located on the base end side of the drive shaft 40 (on the side that is closer to the engine E) and a movable sheave 41B that is located on the leading end side of the drive shaft 40. Also, a winding diameter adjustment mechanism 46 that adjusts the position of the movable sheave 41B is provided at a protruding end of the drive shaft 40.

The winding diameter adjustment mechanism 46 is configured to increase the belt winding diameter of the driving pulley 41 by moving the movable sheave 41B toward the fixed sheave 41A as the rotation speed of the drive shaft 40 increases. Conversely, the winding diameter adjustment mechanism 46 is configured to reduce the belt winding diameter of the driving pulley 41 by moving the movable sheave 41B away from the fixed sheave 41A as the rotation speed of the drive shaft 40 decreases.

The driven pulley 42 includes a movable sheave 42A that is located on the base end side of the input shaft 3b (on the side that is closer to the transmission case 30), a fixed sheave 42B that is located on the leading end side of the input shaft 3b, and a coil spring 42C that applies a biasing force to bias the movable sheave 42A toward the fixed sheave 42B.

The coil spring 42C applies a biasing force to determine the position of the movable sheave 42A of the driven pulley 42 in accordance with the tension that is applied to the endless belt 43. That is, if the belt winding diameter of the driving pulley 41 changes, the tension applied to the endless belt 43 changes. The coil spring 42C moves the movable sheave 42A away from the fixed sheave 42B as the tension increases, and moves the movable sheave 42A toward the fixed sheave 42B as the tension decreases. Therefore, if the belt winding diameter of the driving pulley 41 is small, the belt winding diameter of the driven pulley 42 is set to a large value. Conversely, if the belt winding diameter of the driving pulley 41 is increased, the belt winding diameter of the driven pulley 42 is set to a small value.

The assist motor M that is located opposite the engine E across the driving pulley 41 is provided such that an output shaft 50 is orientated in a lateral direction (to face toward the driving pulley 41). In the present embodiment, the assist motor M is attached to an outer end portion of the support bracket 47, using bolts or the like. The output shaft 50 is located coaxially with the drive shaft 40. The drive shaft 40 extends to the output shaft 50, and a coupler 48 is provided so as to span between the output shaft 50 and the drive shaft 40. The coupler 48 and the output shaft 50, and the coupler 48 and the drive shaft 40, are spline-fitted to each other. The coupler 48 is supported by the bearing 47a that is provided in the support bracket 47, and thus the output shaft 50 and the drive shaft 40 are supported so as to be rotatable integrally with each other.

As shown in FIGS. 3 and 8, the transmission case 44 (corresponding to the case member according to the present invention) includes a case body 44A that is supported by the vehicle body (at least one of the transmission case 30 and the engine E) and a cover member 44B that is supported so as to be separable from the case body 44A. The clutch case 45 that surrounds the centrifugal clutch 39 is coupled to a cylinder block of the engine E, and the clutch case 45 is coupled to the case body 44A of the transmission case 44. Also, the support bracket 47 is attached to the case body 44A and the clutch case 45, using bolts or the like.

The cover member 44B has a shape that can house the driving pulley 41, the winding diameter adjustment mechanism 46, and the driven pulley 42 from a laterally outer side. Flange surfaces 44Ba, 44Aa are formed on the outer circumferential surfaces of the cover member 44B and the case body 44A. The case body 44A and the cover member 44B are coupled to each other, using bolts or the like (not shown), such that the flange surface 44Aa of the case body 44A and the flange surface 44Ba of the cover member 44B face each other and a seal member such as a piece of rubber (not shown) is sandwiched therebetween.

With this configuration, it is possible to attach and detach only the cover member 44B while keeping the case body 44A in the state of being supported by the vehicle body (at least one of the transmission case 30 and the engine E).

As shown in FIG. 8, an opening portion 49 is formed in a portion of the cover member 44B through which the output shaft 50 of the assist motor M and the coupler 48 penetrate, and a cylindrical member 51 that covers the outer circumferential surfaces of the output shaft 50 and the coupler 48 is fixed to the opening portion 49 in the state of being inserted thereinto.

An end portion of the cylindrical member 51 that is closer to the driving pulley 41 penetrates through the opening portion 49, and is coupled and fixed to the support bracket 47 using a fixing bolt 52.

An end portion of the cylindrical member 51 that faces the assist motor M is coupled and fixed to a motor attachment frame 6B of a motor support platform 6 that supports the assist motor M, using bolts or the like (not shown) as appropriate, so as to abut against the motor attachment frame 6B.

Motor Support Platform

The motor support platform 6 that supports the assist motor M is configured as shown in FIGS. 4 to 11.

The motor support platform 6 includes an extension frame portion 6A that protrudes outward to the left from one of front-rear elongated main frames 1A of the vehicle frame 1 located on the left side; and the motor attachment frame 6B that is attached to the extension frame portion 6A to be movable in the right-left direction relative to the extension frame portion 6A.

The extension frame portion 6A includes a platform member 60 that has a mounting surface 60a that faces upward, side ribs 61 that are bent downward from front and rear ends of the platform member 60, and intermediate ribs 62 that are provided on the lower surface of the platform member 60 between the front and rear side ribs 61. An end portion of the extension frame portion 6A that is closer to the main frame 1A is welded and fixed to the main frame 1A and constitutes a portion of the vehicle frame 1.

The motor attachment frame 6B includes a slidable frame body 66 that is constituted by: a guide member 63 that is channel-shaped and whose lower surface is mounted on the platform member 60 of the extension frame portion 6A; lateral bridge members 64 that are located on the front and rear sides of the guide member 63 with a longitudinal direction thereof extending along the output shaft 50 of the assist motor M; and longitudinal frame members 65 that respectively couple the right/left ends of the front/rear lateral bridge members 64 to each other.

Lower portions of four coupling members 67 in total, which are channel-shaped in plan view, are attached to the front and rear ends of the right and left longitudinal frame members 65 of the slidable frame body 66, using coupling bolts 67a. A pair of pair of right and left end portion supporting frames 68 are coupled and fixed to upper portions of the coupling members 67, using coupling bolts 67b. Thus, the motor attachment frame 6B that can support the assist motor M is formed.

The right and left ends of the assist motor M face the right and left end portion supporting frames 68, and the right and left ends are coupled to the end portion supporting frames 68 so as to be sandwiched between the right and left end portion supporting frames 68, respectively, using coupling bolts or the like (not shown) as appropriate.

The right and left end portion supporting frames 68, to which the assist motor M is coupled, are coupled and fixed to the slidable frame body 66, and the slidable frame body 66 is mounted on, and is coupled and fixed to, the platform member 60 of the extension frame portion 6A.

The above-described slidable frame body 66 is coupled and fixed to the platform member 60 of the extension frame portion 6A, using a slide movement mechanism 7.

As shown in FIGS. 7 and 9 to 11, the slide movement mechanism 7 includes: an elongated slot 70 that is formed in the channel-shaped guide member 63 of the slidable frame body 66 to extend along the output shaft 50 of the assist motor M; and one coupling bolt 71 (corresponding to the guide member) attached to the platform member 60 to extend through the elongated slot 70.

The platform member 60 has three coupling bolts 71 attached thereto, including one extending through the above-described elongated slot 70. Three through holes 60b are provided in the mounting surface 60a of the platform member 60 for inserting the coupling bolts 71. As shown in FIGS. 7 and 9 to 11, the coupling bolt 71 for extending the elongated slot 70 therethrough extends through both the through hole 60b near the extended end of the platform member 60, and the elongated slot 70.

The remaining coupling bolts 71, other than the coupling bolt 71 extending through the elongated slot 70, extend through the through holes 60b, 60b near the base end of the platform member 60, and are coupled and fixed to the lateral bridge members 64 that are located forward and rearward of the guide member 63. The coupling bolts 71 can be individually fastened, loosened, attached and detached. Therefore, the assist motor M is movable relative to the extension frame portion 6A toward and away from the main frame 1A, while the motor attachment frame 6B keeping supporting the assist motor M.

Whereby, the slidable frame body 66 is slidable along a length of the elongated slot 70 while keeping mounting the slidable frame body 66 thereon, by removing the two coupling bolts 71 attached to the platform member 60 near the end of the extension frame portion 6A attached to the main frame 1A, and loosening the one coupling bolt 71 extending through the elongated slot 70.

Figure 9:
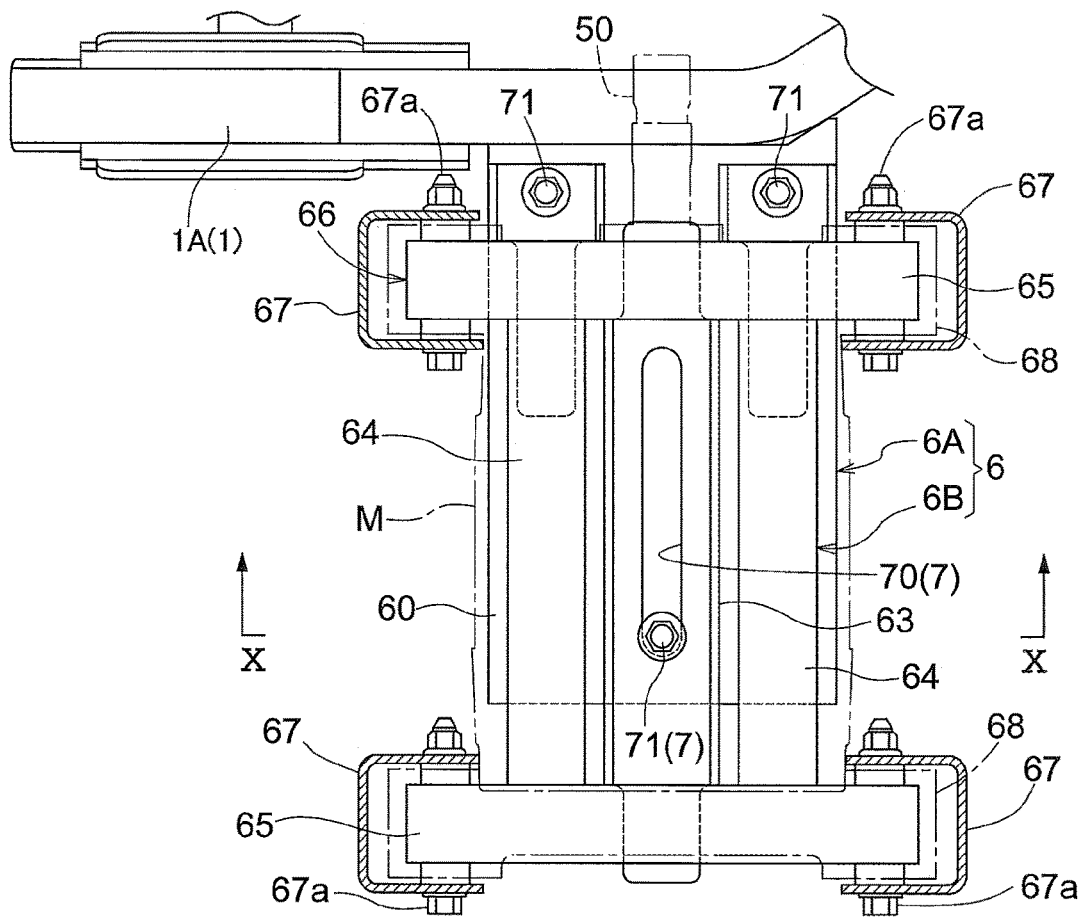
FIG. 9 is a plan view showing the assist motor and the motor support platform.
Figure 10:
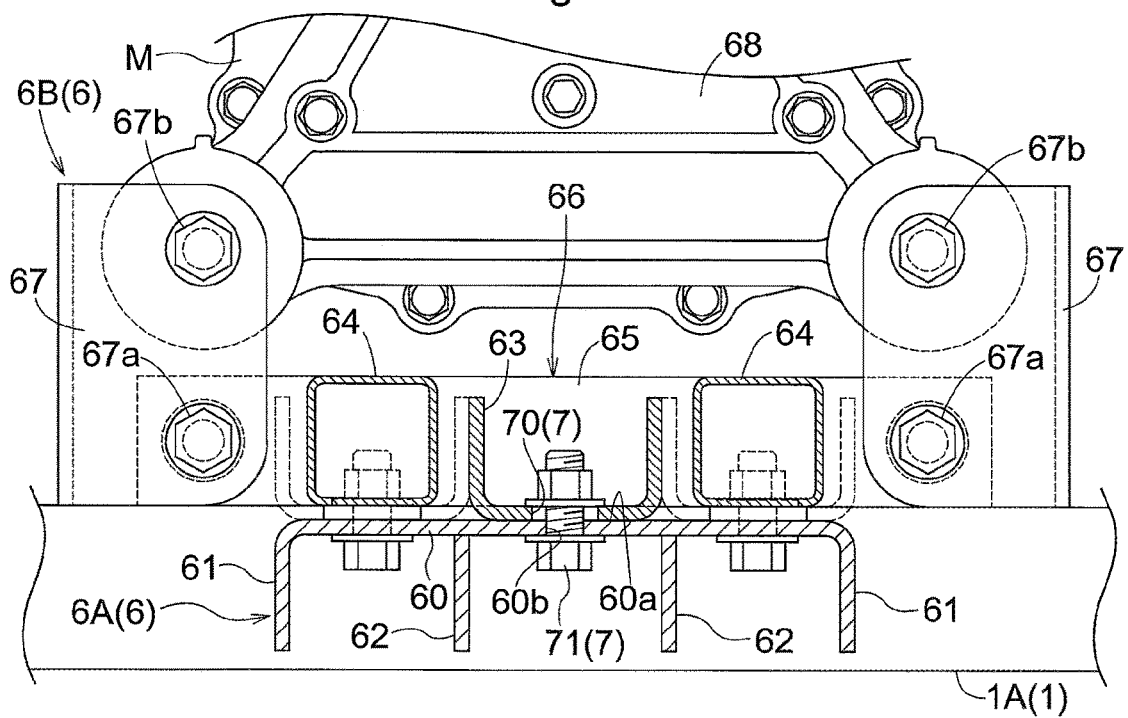
FIG. 10 is a view in section taken along a line X-X in FIG. 9.

With this configuration, as shown in FIG. 9, the motor attachment frame 6B is fixed by inserting all of the three coupling bolts 71 into the through holes 60b of the platform member 60 when the assist motor M is located closest to the vehicle frame 1. Thus, the assist motor M is fixed at a position where the assist motor M can perform usual work travelling.

Figure 11:
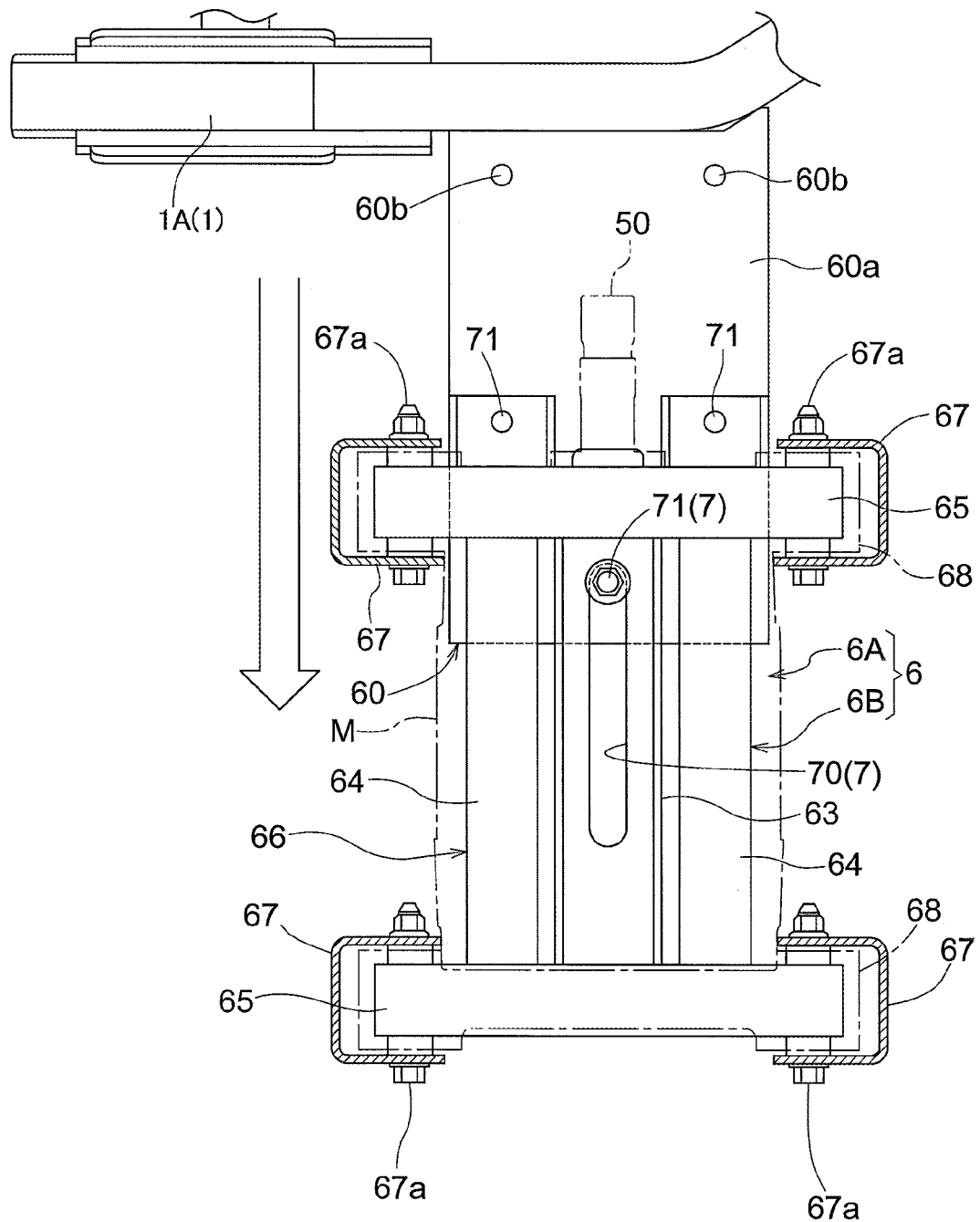
FIG. 11 is a plan view showing the assist motor and the motor support platform.

When the assist motor M is in this work travelling state, the motor attachment frame 6B can be moved laterally outward relative to the extension frame portion 6A away from the main frame 1A while the motor attachment frame 6B remains supported by the extension frame portion 6A as shown in FIG. 11, by removing the two coupling bolts 71 attached to the platform member 60 near the end coupled to the vehicle frame 1 while leaving only the one coupling bolt 71 extending through the elongated slot 70, and then loosening the one coupling bolt 71.

The major diameter length of the elongated slot 70 is set such that when the motor attachment frame 6B is drawn out laterally outward to the maximum extent, a sufficient space can be formed between the motor attachment frame 6B and the transmission case 44 of the continuously variable transmission device 4, to remove the cover member 44B for attaching/removing the endless belt 43 of the continuously variable transmission device 4.

Therefore, the heavy assist motor M can be moved toward and away from the continuously variable transmission device 4 without unloading the assist motor M from the machine body, while remaining the assist motor M supported on the motor attachment frame 6B.

Drive Control

The following describes an example of drive control that is performed on the utility vehicle.

The utility vehicle is driven by the assist motor M to travel at a low speed (low rotation speed), and is driven by the engine E (or the engine E and the assist motor M) to travel at a high speed (high rotation speed). Specifically, upon the accelerator pedal 15 being operated, power is supplied to the assist motor M from a power supply unit (not shown), and the assist motor M is driven to rotate. Until the accelerator pedal 15 is operated to a predetermined operation position (a first predetermined position), the engine E is not driven and only the assist motor M is driven at a rotation speed that corresponds to the operation position of the accelerator pedal 15. At this time, since the engine E is not driven, the rotation speed of the engine E is lower than the predetermined value and the centrifugal clutch 39 is in a disconnected state. Therefore, the rotational driving force of the assist motor M is inputted to the input shaft 3b of the transmission case 30 via the continuously variable transmission device 4, and thus the utility vehicle is driven.

Upon the accelerator pedal 15 being operated to the predetermined operation position (the first predetermined position), the engine is started up and is driven to rotate at a rotation speed that corresponds to the operation position of the accelerator pedal 15. However, until the accelerator pedal 15 is operated to an operation position (a second predetermined position) that corresponds to a preset value of the rotation speed of the engine at which the centrifugal clutch 39 comes into a connected state, the rotation speed of the engine is lower than the preset value and the centrifugal clutch 39 is in a disconnected state.

Thus, the rotational driving force of the engine E (the crankshaft 3a) is not transmitted to the drive shaft 40. Therefore, in the same manner as above, the rotational driving force of the assist motor M is inputted to the input shaft 3b of the transmission case 30 via the continuously variable transmission device 4, and thus the utility vehicle is driven. Upon the operation position of the accelerator pedal 15 reaching the second predetermined position, the rotation speed of the engine E reaches the preset value, the centrifugal clutch 39 comes into a connected state, and the rotational driving force of the engine (the crankshaft 3a) is transmitted to the drive shaft 40. In a state where the accelerator pedal 15 has been operated beyond the second predetermined position, the engine E and the assist motor M are driven to rotate at a rotation speed that corresponds to the operation position of the accelerator pedal 15, the rotational driving forces of the engine E and the assist motor M are inputted to the input shaft 3b of the transmission case 30 via the continuously variable transmission device 4, and thus the utility vehicle is driven.

When the utility vehicle is to brake, the engine E stops driving (the rotation speed of the engine becomes smaller than the preset value), the centrifugal clutch 39 comes into a disconnected state, and the assist motor M performs braking and deceleration using the regenerative brake thereof. Electrical power that is generated at this time is accumulated in the battery 8.

The above-described startup of the assist motor M and the engine and control of the rotation speed of the assist motor M and the engine E are performed by a control unit (not shown), for example. Specifically, the accelerator pedal 15 includes, for example, an operation position detection device such as a rotation sensor. The control unit performs the above-described control based on a detection signal from the operation position detection device.

Note that control of the rotation speed of the engine E is not limited to the above, and, for example, a mechanical governor may be used. If a single accelerator pedal 15 is used, a governor for controlling the rotation speed of the engine E is interlocked with the accelerator pedal 15, and an operation position detection device for detecting the rotation speed of the assist motor M is provided. If an accelerator pedal 15 for the assist motor M and an accelerator pedal 15 for the engine E are separately provided, the governor is interlocked with the accelerator pedal 15 for the engine E, and the accelerator pedal 15 for the assist motor M includes an operation position detection device.

Other Embodiments Modified from First Embodiment

The following only describes features of other embodiments that are different from those of the above-described embodiment.

(1) In the foregoing embodiment, a gasoline engine is provided as the engine E. However, the present invention is not limited in this way, and may be of a diesel type that includes a diesel engine.

(2) In the foregoing embodiment, a slide movement mechanism 7 includes a single elongated slot 70 and a guide member that is constituted by a single coupling bolt 71. However, the present invention is not limited to this configuration. For example, a plurality of elongated slots 70 that are arranged in parallel with each other and a plurality of coupling bolts 71 that are inserted into the plurality of elongated slots 70 may be used to slide the motor attachment frame 6B.

Also, the guide member is not limited to the coupling bolt 71, and any member that can guide the motor attachment frame 6B in the state of being inserted into the elongated slot 70, such as a pin or a roller, may be used.

(3) In the foregoing embodiment, a configuration in which the elongated slot 70 of the slide movement mechanism 7 is formed in the motor attachment frame 6B, which is movable, is exampled as an example. However, the present invention is not limited thereto, and a configuration in which the elongated slot 70 is formed in the extension frame portion 6A, which is fixed, may be employed.

(4) In the foregoing embodiment, the work vehicle is a utility vehicle. However, the present invention is not limited to a utility vehicle. The present invention is applicable to other kinds of work vehicles such as a lawn mower and a truck.

Second Embodiment

Overall Configuration

Figure 12:
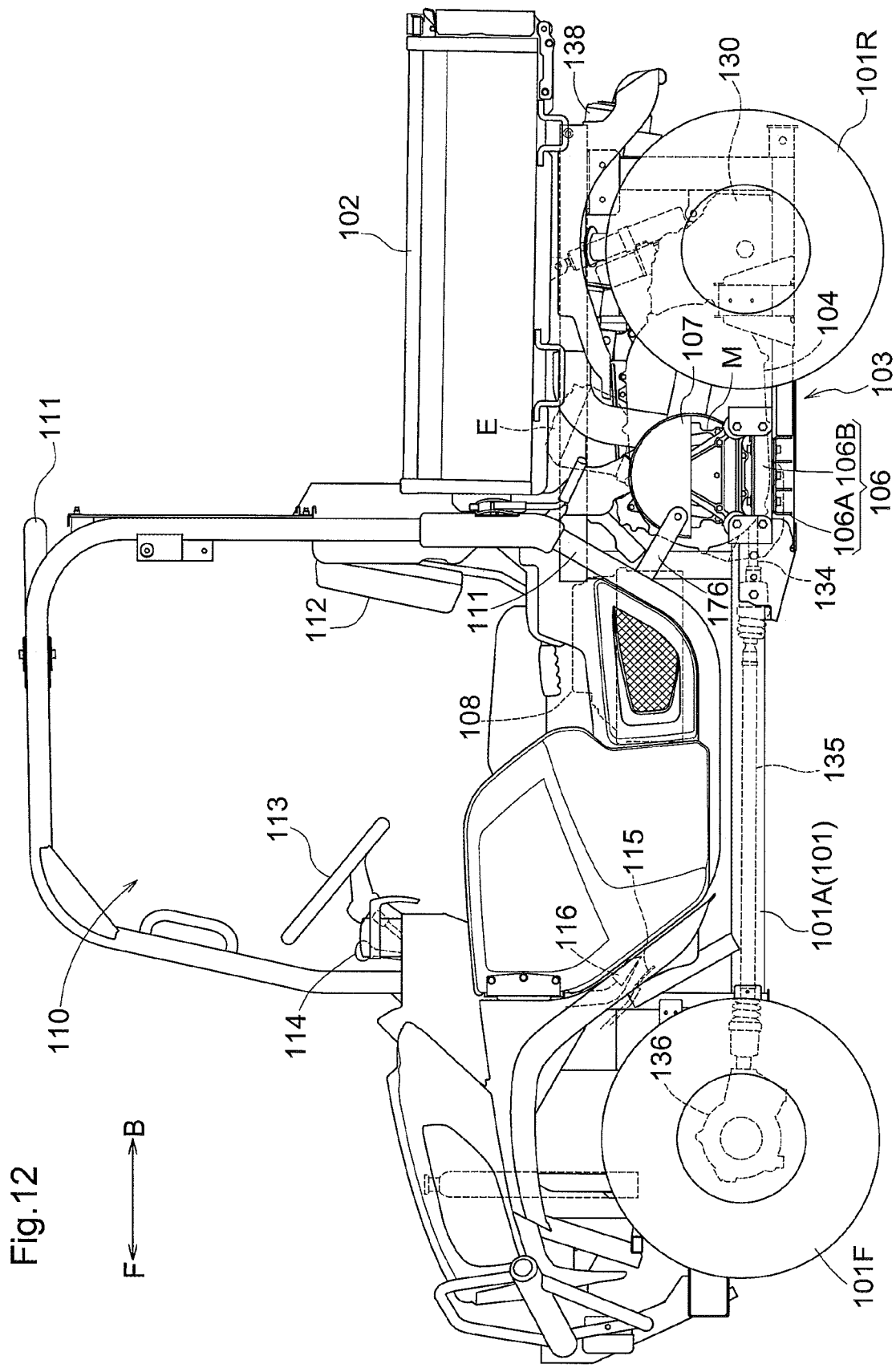
FIG. 12 is a left side view of a utility vehicle according to a second embodiment (the same applies through to FIG. 21).
Figure 13:
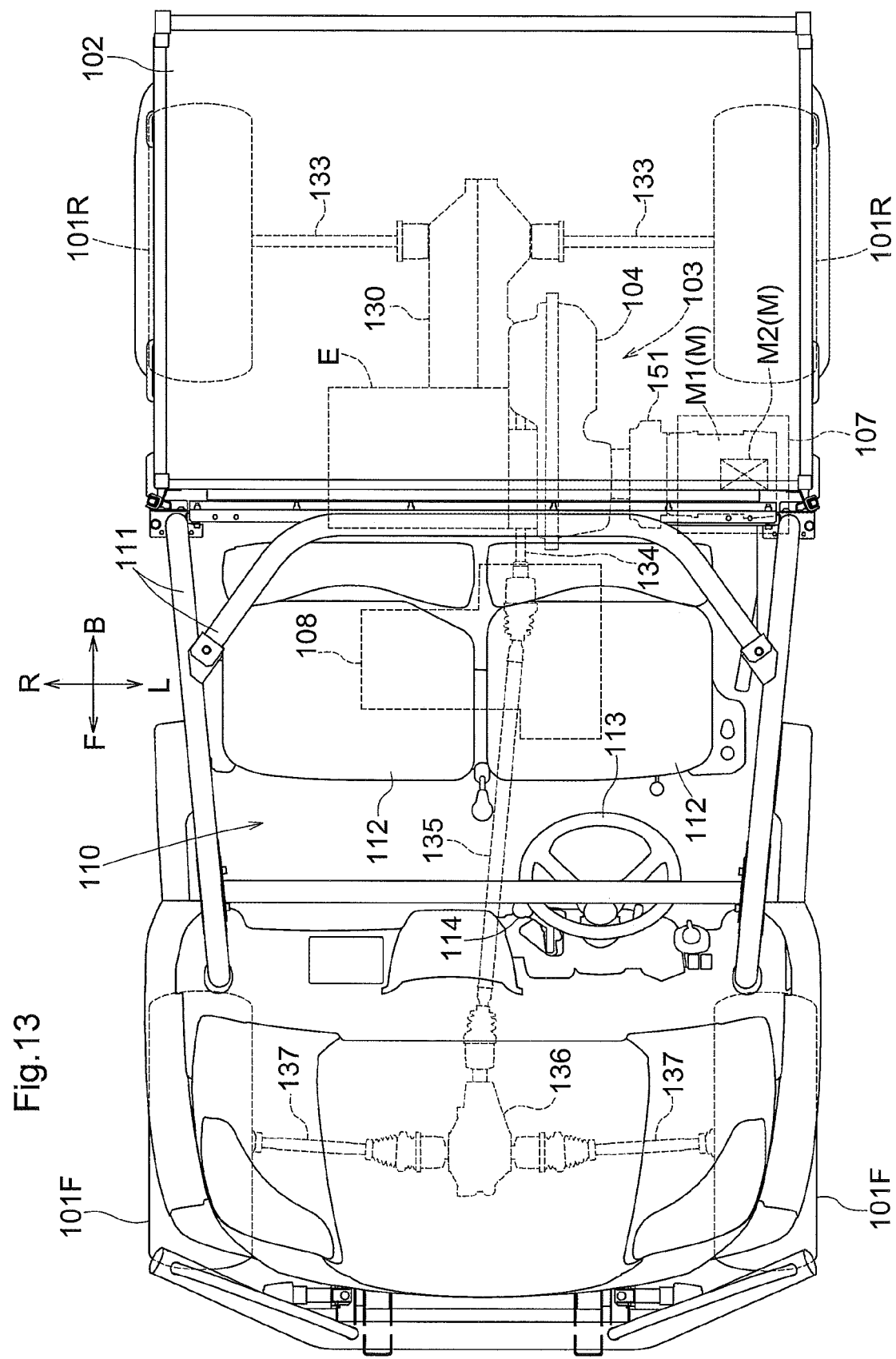
FIG. 13 is a plan view of the utility vehicle.

As shown in FIGS. 12 and 13, a utility vehicle (an example of a multipurpose vehicle) includes a pair of right and left front wheels 101F that are steerable, in a front portion of a vehicle frame 101 that constitutes the framework of a travelling machine body, and a pair of right and left rear wheels 101R that are not steerable are supported in a rear portion of the vehicle frame 101.

A driving section 110 is provided in a central portion of the travelling machine body in the front-rear direction, above the vehicle frame 101. A load carrying platform 102 is provided in a rear portion of the travelling machine body, above the vehicle frame 101, and a prime mover section 103 is provided below the load carrying platform 102.

The front wheels 101F and the rear wheels 101R are configured such that driving forces from an engine E and an assist motor M, which are included in the prime mover section 103 described below, can be transmitted thereto. Thus, the utility vehicle is configured as a four-by-four type four-wheel drive vehicle, and is used for multiple purposes such as farm work and transportation work. A ROPS frame 111 for protecting the driving section 110 is provided around the driving section 110.

The load carrying platform 102 function to discharge loads like a dump truck by raising the front end side thereof about a right-left axis extending on the rear end side, and the load carrying platform 102 is supported on the vehicle frame 101 so as to be swingable about the lateral axis. Also, a hydraulic actuator (not shown) that raises and lowers the front end side of the load carrying platform 102 is provided.

The driving section 110 includes a driver's seat 112 for a driver to sit on, a steering wheel 113 for performing control to steer the front wheels 101F, a shift lever 114, an accelerator pedal 115 for controlling the travelling speed, and a brake pedal 116 for operating brake devices 117 for the front wheels 101F and the rear wheels 101R. Typically, a passenger seat is provided adjacent to a driver's seat 112. However, this driver's seat 112 is configured as a bench seat that is constituted by one laterally-elongated seat base and one laterally-elongated seat back.

A fuel tank (not shown) for supplying fuel to the engine E and a battery device 108 for supplying electrical power to the assist motor M are provided in an under-seat space, which is a space below the driver's seat 112.

Configuration of Prime Mover Section

Figure 14:
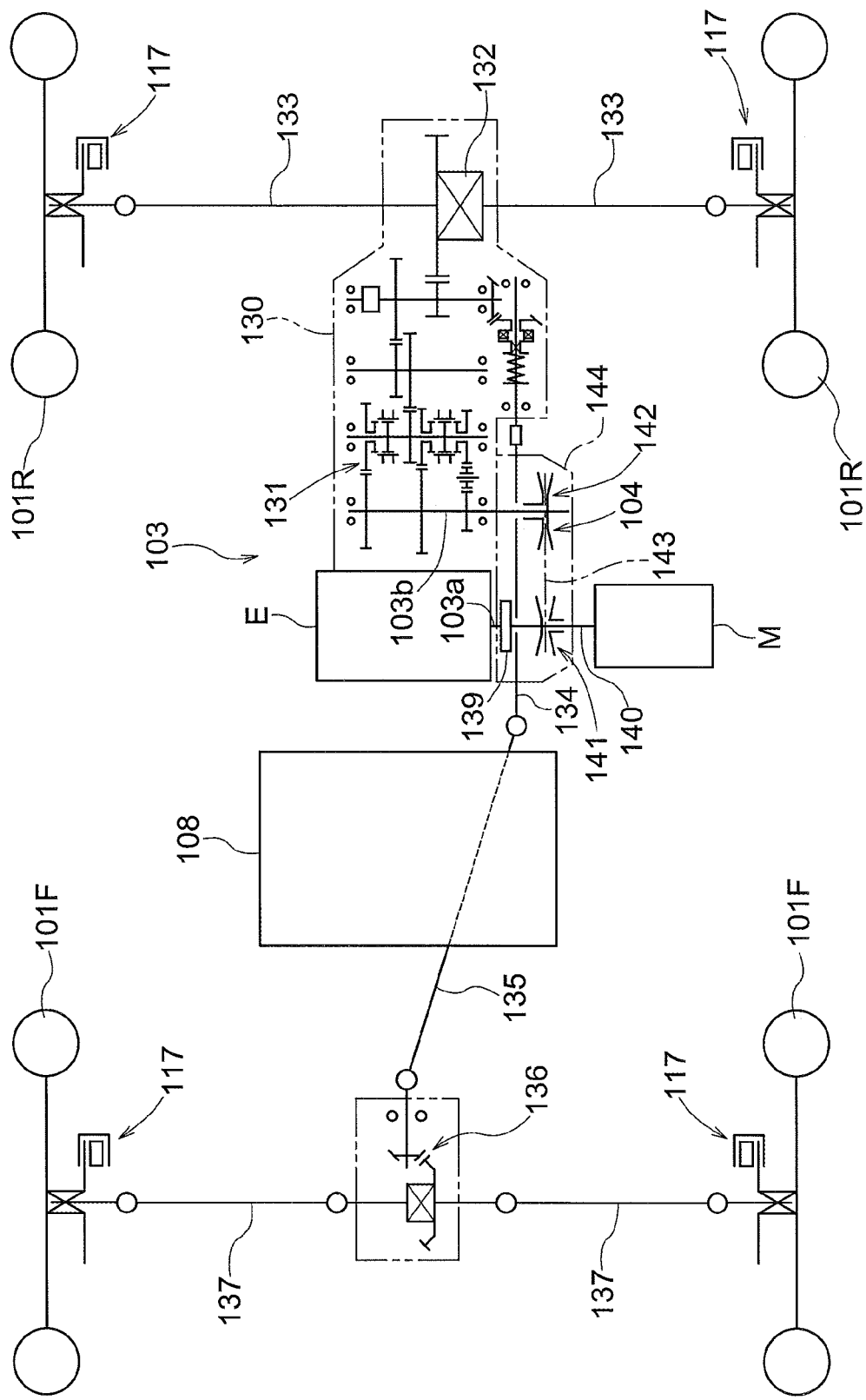
FIG. 14 is a schematic diagram showing power transmission systems for the utility vehicle.

As shown in FIGS. 13 and 14, the prime mover section 103 is provided in a rear portion of the travelling machine body so as to be located below the load carrying platform 102.

The prime mover section 103 includes: the water-cooled type gasoline engine E (hereinafter simply referred to as "engine E"), which is an internal combustion engine; the assist motor M (hereinafter simply referred to as "assist motor"), which is constituted by an electric motor; a transmission case 130; and a dry-type continuously variable transmission device 104. A gear shift mechanism 131 and a differential mechanism 132 are built into the transmission case 130. A pair of right and left rear wheel drive shafts 133 that transmit a driving force from the differential mechanism 132 to the rear wheels 101R are provided in a lower end portion of the transmission case 130.

A power take-off shaft 134 that protrudes forward is provided in a lower end portion of the transmission case 130. A transmission shaft 135 to which a driving force from the power take-off shaft 134 is transmitted is provided in a lower portion of the travelling machine body, and a front wheel differential mechanism 136, to which a driving force from the transmission shaft 135 is transmitted, and front wheel drive shafts 137, which transmit a driving force from the front wheel differential mechanism 136 to the front wheels 101F, are provided in a front portion of the travelling machine body.

The brake devices 117 are provided at the shaft ends of the pair of right and left front wheel drive shafts 137 and the shaft ends of the pair of right and left rear wheel drive shafts 133. The brake devices 117 function to apply braking forces to the front wheels 101F and the rear wheels 101R upon the brake pedal 116 being operated.

The gear shift mechanism 131 provided in the transmission case 130 is subjected to gear shifting upon the shift lever 114 being operated. In accordance with an operation made with the shift lever 114, the gear shift mechanism 131 changes the travelling speed of the travelling machine body (a high speed and a low speed), and changes the direction in which the traveling machine body travels (forward travelling and rearward travelling). The shift lever 114 is configured such that the setting of a travelling speed and the switching between forward travelling and rearward travelling can be performed by operating a single lever. However, a lever for a shift operation and a forward and rearward travelling lever for switching between forward travelling and rearward traveling may be configured as separate levers.

Figure 15:
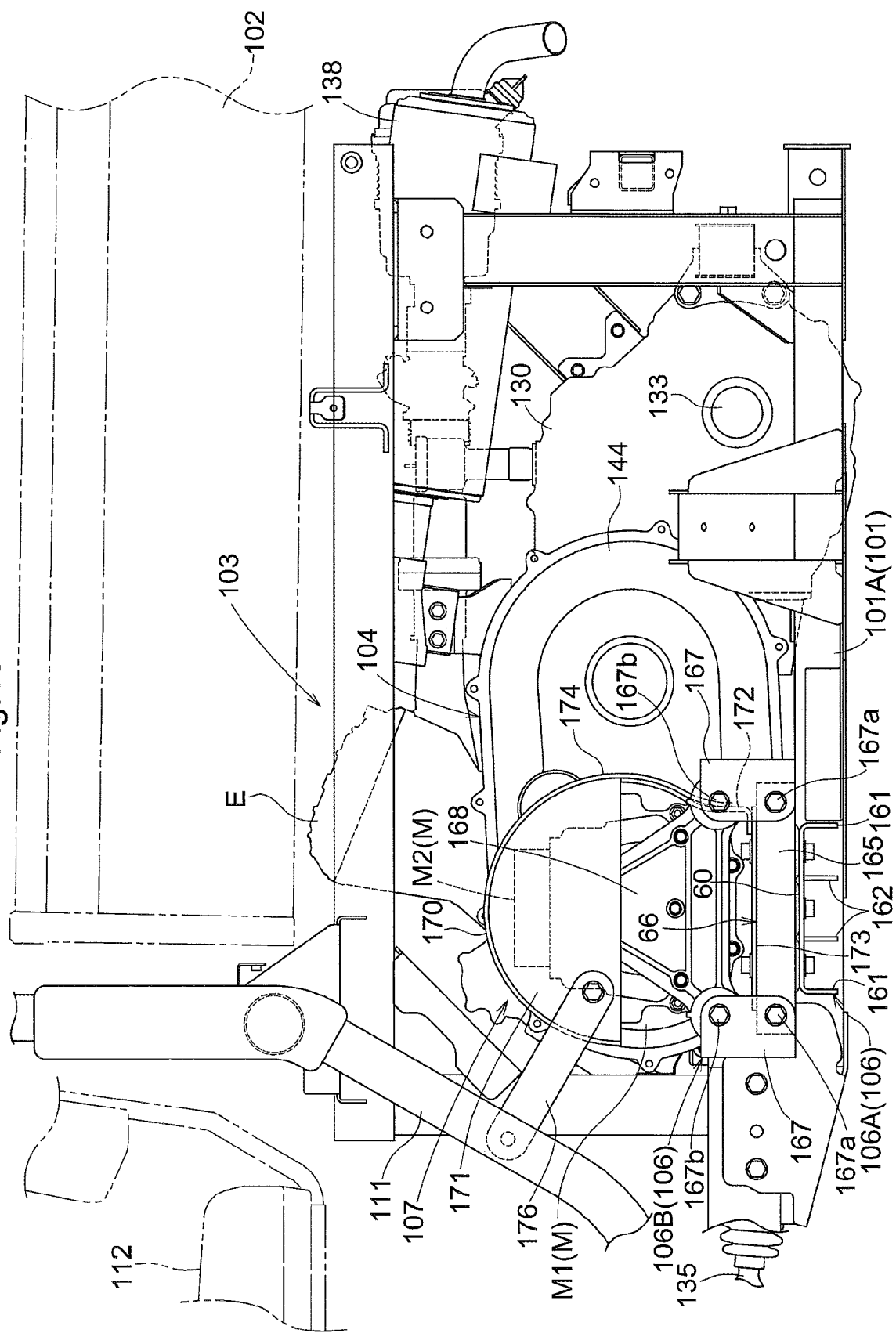
FIG. 15 is a left side view showing a prime mover section of the utility vehicle.
Figure 16:
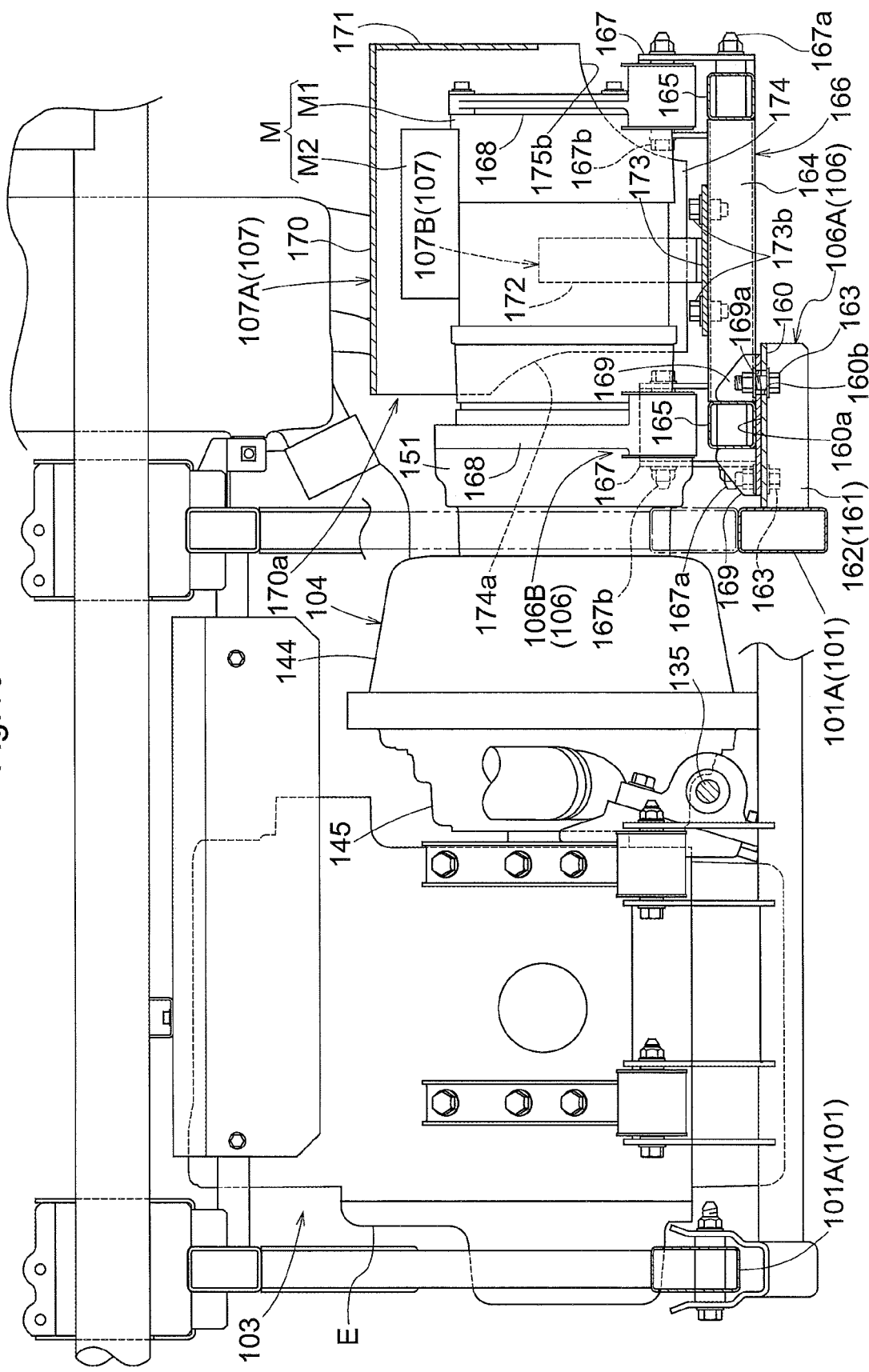
FIG. 16 is a front view showing the prime mover section of the utility vehicle.

As shown in FIGS. 13, 14 and 16, the engine E is provided in the prime mover section 103 such that a crankshaft 103*a* thereof is orientated in a lateral direction. The transmission case 130 is provided at a position that is rearward of and adjacent to the crankshaft 103*a* such that an input shaft 103*b* is orientated in a lateral direction. A front-rear elongated muffler 138 (see FIG. 15) is provided in an upper side portion of the transmission case 130 rearward of the engine E.

The continuously variable transmission device 104 is provided on a lateral side each of the engine E and the transmission case 130 for transmitting power from the engine E to the transmission case 130. The assist motor M is located opposite the engine E across the continuously variable transmission device 104.

Continuously Variable Transmission Device

Figure 19:
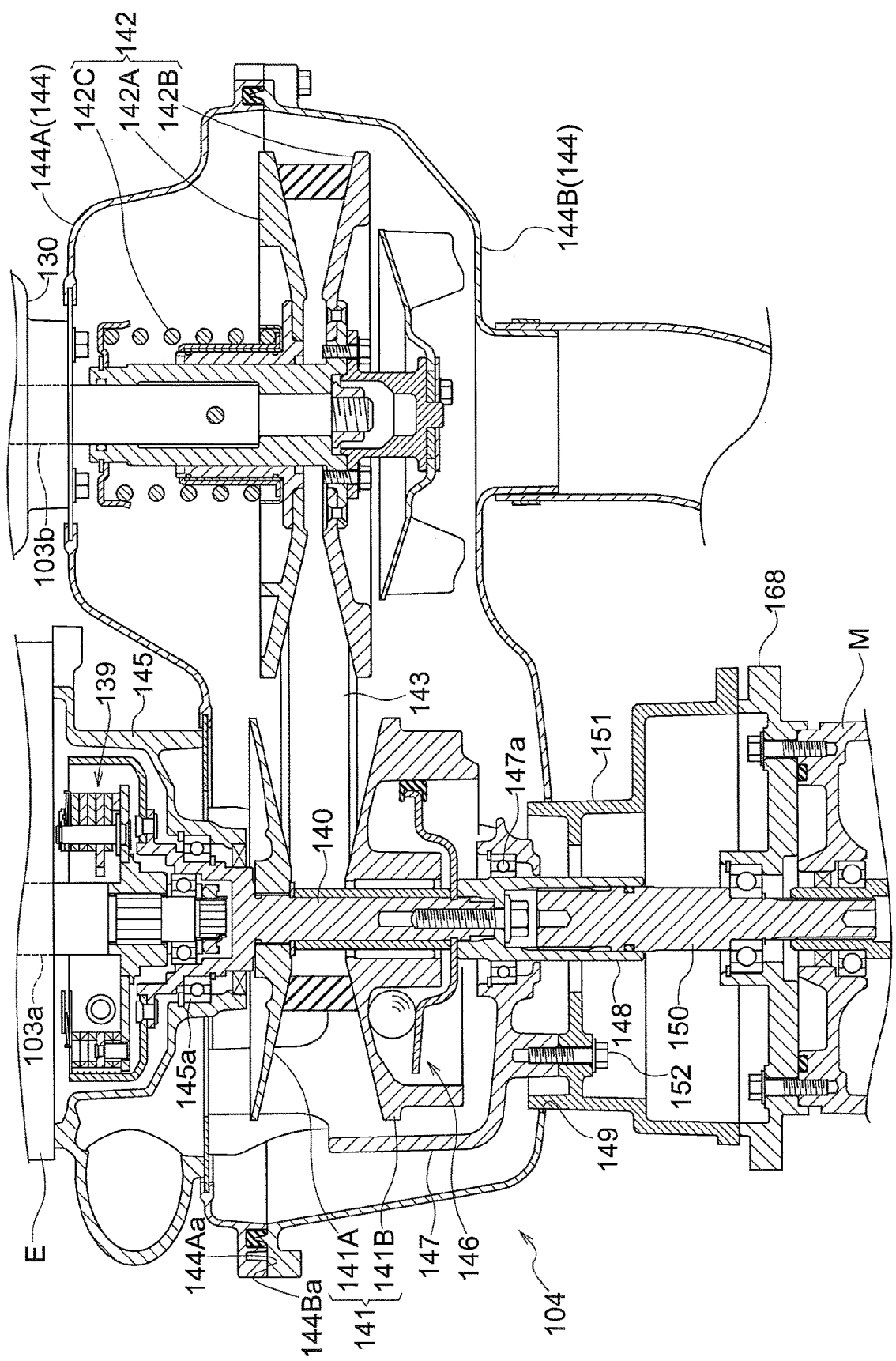
FIG. 19 is a view in horizontal section showing a structure for transmitting power from an engine and the assist motor to a continuously variable transmission device.

As shown in FIGS. 14 and 19, the continuously variable transmission device 104 includes: a driving pulley 141 whose belt winding diameter is changeable; a driven pulley 142 whose belt winding diameter is changeable; and an endless belt 143 that is made of rubber and is wound around the driving pulley 141 and the driven pulley 142. These components are housed in a transmission case 144. Note that a metal belt may be used as the endless belt 143.

A centrifugal clutch 139 that connects and disconnects a rotational driving force from the crankshaft 103*a* of the engine E to the continuously variable transmission device 104 is provided between the engine E and the continuously variable transmission device 104. A drive shaft 140 that is provided on the output side of the centrifugal clutch 139 includes the driving pulley 141 of the continuously variable transmission device 104.

A portion of the drive shaft 140 near the end thereof on the engine E side is rotatably supported by a bearing 145*a* that is provided in a clutch case 145, and a portion of the drive shaft 140 near the end thereof on the assist motor M side is rotatably supported by a bearing 147*a* that is provided in a support bracket 147. The input shaft 103*b* in the transmission case 130 includes the driven pulley 142. The drive shaft 140 of the centrifugal clutch 139 is provided coaxially with the crankshaft 103*a*.

When the crankshaft 103*a* is rotating at a low rotation speed that is lower than a predetermined value, the centrifugal clutch 139 is in a disconnected state and does not transmit the rotational force of the crankshaft 103*a* to the drive shaft 140. When the rotation speed of the crankshaft 103*a* exceeds the predetermined value, the centrifugal clutch 139 comes into a connected state and transmits the rotational force of the crankshaft 103*a* to the drive shaft 140.

The driving pulley 141 includes a fixed sheave 141A that is located on the base end side of the drive shaft 140 (on the side that is closer to the engine E) and a movable sheave 141B that is located on the leading end side of the drive shaft 140. Also, a winding diameter adjustment mechanism 146 that adjusts the position of the movable sheave 141B is provided at a protruding end of the drive shaft 140.

The winding diameter adjustment mechanism 146 is configured to increase the belt winding diameter of the driving pulley 141 by moving the movable sheave 141B toward the fixed sheave 141A as the rotation speed of the drive shaft 140 increases. Conversely, the winding diameter adjustment mechanism 146 is configured to reduce the belt winding diameter of the driving pulley 141 by moving the movable sheave 141B away from the fixed sheave 141A as the rotation speed of the drive shaft 140 decreases.

The driven pulley 142 includes a movable sheave 142A that is located on the base end side of the input shaft 103*b* (on the side that is closer to the transmission case 130), a fixed sheave 142B that is located on the leading end side of the input shaft 103*b*, and a coil spring 142C that applies a biasing force to bias the movable sheave 142A toward the fixed sheave 142B.

The coil spring 142C applies a biasing force to determine the position of the movable sheave 142A of the driven pulley 142 in accordance with the tension that is applied to the endless belt 143. That is, if the belt winding diameter of the driving pulley 141 changes, the tension applied to the endless belt 143 changes. The coil spring 142C moves the movable sheave 142A away from the fixed sheave 142B as the tension increases, and moves the movable sheave 142A toward the fixed sheave 142B as the tension decreases. Therefore, if the belt winding diameter of the driving pulley 141 is small, the belt winding diameter of the driven pulley 142 is set to a large value. Conversely, if the belt winding diameter of the driving pulley 141 is increased, the belt winding diameter of the driven pulley 142 is set to a small value.

The assist motor M that is located opposite the engine E across the driving pulley 141 is provided such that an output shaft 150 is orientated in a lateral direction (to face toward the driving pulley 141). In the present embodiment, the assist motor M is attached to an outer end portion of the support bracket 147, using bolts or the like. The output shaft 150 is located coaxially with the drive shaft 140. The drive shaft 140 extends to the output shaft 150, and a coupler 148 is provided so as to span between the output shaft 150 and the drive shaft 140. The coupler 148 and the output shaft 150, and the coupler 148 and the drive shaft 140, are spline-fitted to each other. The coupler 148 is supported by the bearing 147a that is provided in the support bracket 147, and thus the output shaft 150 and the drive shaft 140 are supported so as to be rotatable integrally with each other.

As shown in FIGS. 14 and 19, the transmission case 144 includes a case body 144A that is supported by the vehicle body (at least one of the transmission case 130 and the engine E) and a cover member 144B that is supported so as to be separable from the case body 144A. The clutch case 145 that surrounds the centrifugal clutch 139 is coupled to a cylinder block of the engine E, and the clutch case 145 is coupled to the case body 144A of the transmission case 144. Also, the support bracket 147 is attached to the case body 144A and the clutch case 145, using bolts or the like.

The cover member 144B has a shape that can house the driving pulley 141, the winding diameter adjustment mechanism 146, and the driven pulley 142 from a laterally outer side. Flange surfaces 144Ba, 144Aa are formed on the outer circumferential surfaces of the cover member 144B and the case body 144A. The case body 144A and the cover member 144B are coupled to each other, using bolts or the like (not shown), such that the flange surface 144Aa of the case body 144A and the flange surface 144Ba of the cover member 144B face each other and a seal member such as a piece of rubber (not shown) is sandwiched therebetween.

With this configuration, it is possible to attach and detach only the cover member 144B while keeping the case body 144A in the state of being supported by the vehicle body (at least one of the transmission case 130 and the engine E).

As shown in FIG. 19, an opening portion 149 is formed in a portion of the cover member 144B through which the output shaft 150 of the assist motor M and the coupler 148 penetrate, and a cylindrical member 151 that covers the outer circumferential surfaces of the output shaft 150 and the coupler 148 is fixed to the opening portion 149 in the state of being inserted thereinto.

An end portion of the cylindrical member 151 that is closer to the driving pulley 141 penetrates through the opening portion 149, and is coupled and fixed to the support bracket 147 using a fixing bolt 152.

An end portion of the cylindrical member 151 that faces the assist motor M is coupled and fixed to a motor attachment frame 106B of a motor support platform 106 that supports the assist motor M, using bolts or the like (not shown) as appropriate, so as to abut against the motor attachment frame 106B.

Motor Support Platform

The motor support platform 106 that supports the assist motor M is configured as shown in FIGS. 15 to 21.

The motor support platform 106 includes an extension frame portion 106A that protrudes outward to the left from one of front-rear elongated main frames 101A of the vehicle frame 101 located on the left side, and the motor attachment frame 106B that is attached to the extension frame portion 106A to be movable in the right-left direction relative to the extension frame portion 106A.

The extension frame portion 106A includes a platform member 160 that has a mounting surface 160a that faces upward, side ribs 161 that are bent downward from front and rear ends of the platform member 160, and intermediate ribs 162 that are provided between the side ribs 161 on the lower surface of the platform member 160. An end portion of the extension frame portion 106A that is closer to the main frame 101A is welded and fixed to the main frame 101A and constitutes a portion of the vehicle frame 101.

The motor attachment frame 106B includes a slidable frame body 166 that is constituted by: a pair of front and rear lateral bridge members 164 with a longitudinal direction thereof extending along the output shaft 150 of the assist motor M; and a pair of right and left longitudinal frame members 165 that respectively couple the right/left ends of the front/rear lateral bridge members 164 to each other.

Lower portions of four coupling members 167 in total, which are channel-shaped in plan view, are attached to the front and rear ends of the right and left longitudinal frame members 165 of the slidable frame body 166, using coupling bolts 167a. A pair of pair of right and left end portion supporting frames 168 are coupled and fixed to upper portions of the coupling members 167, using coupling bolts 167b. Thus, the motor attachment frame 106B that can support the assist motor M is formed.

The right and left ends of the assist motor M face the right and left end portion supporting frames 168, and the right and left ends are coupled to the end portion supporting frames 168 so as to be sandwiched between the right and left end portion supporting frames 168, using coupling bolts or the like (not shown) as appropriate.

The right and left end portion supporting frames 168, to which the assist motor M is coupled, are coupled and fixed to the slidable frame body 166, and the slidable frame body 166 is mounted on, and is coupled and fixed to, the platform member 160 of the extension frame portion 106A.

Figure 18:
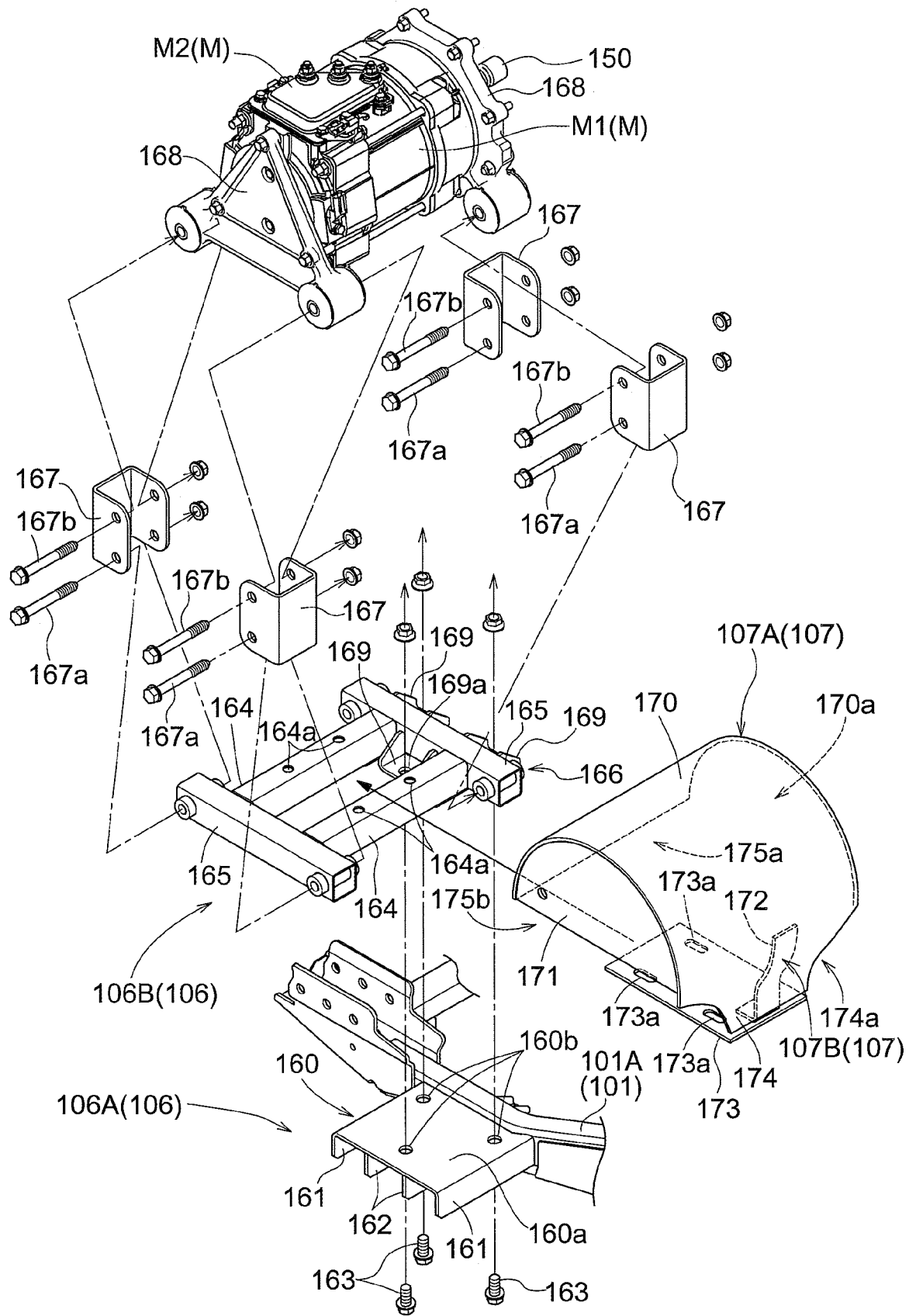
FIG. 18 is an exploded perspective view showing an assist motor, a motor support platform, and a motor cover.
Figure 20:
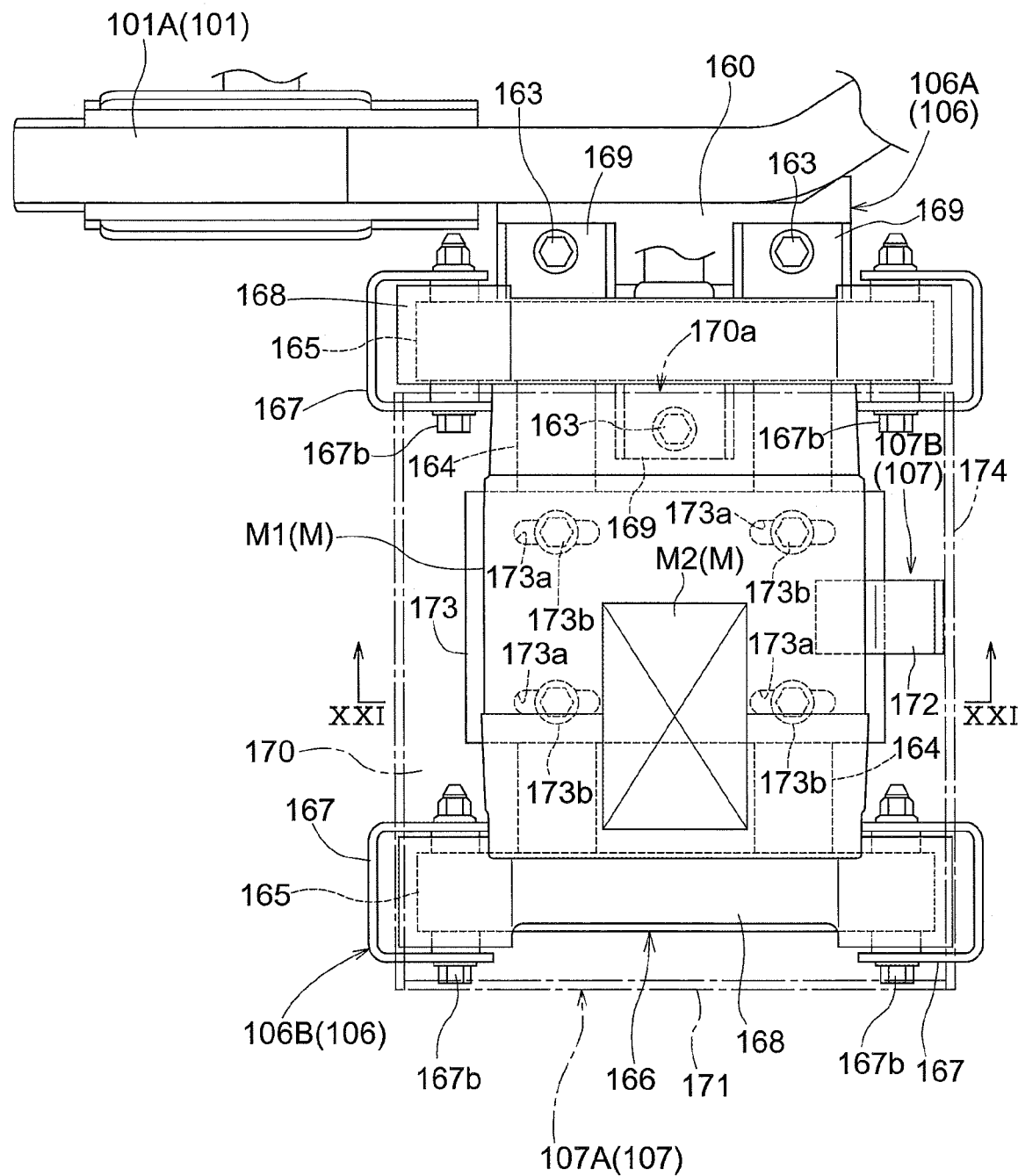
FIG. 20 is a plan view showing the assist motor, the motor support platform, and the motor cover.
Figure 21:
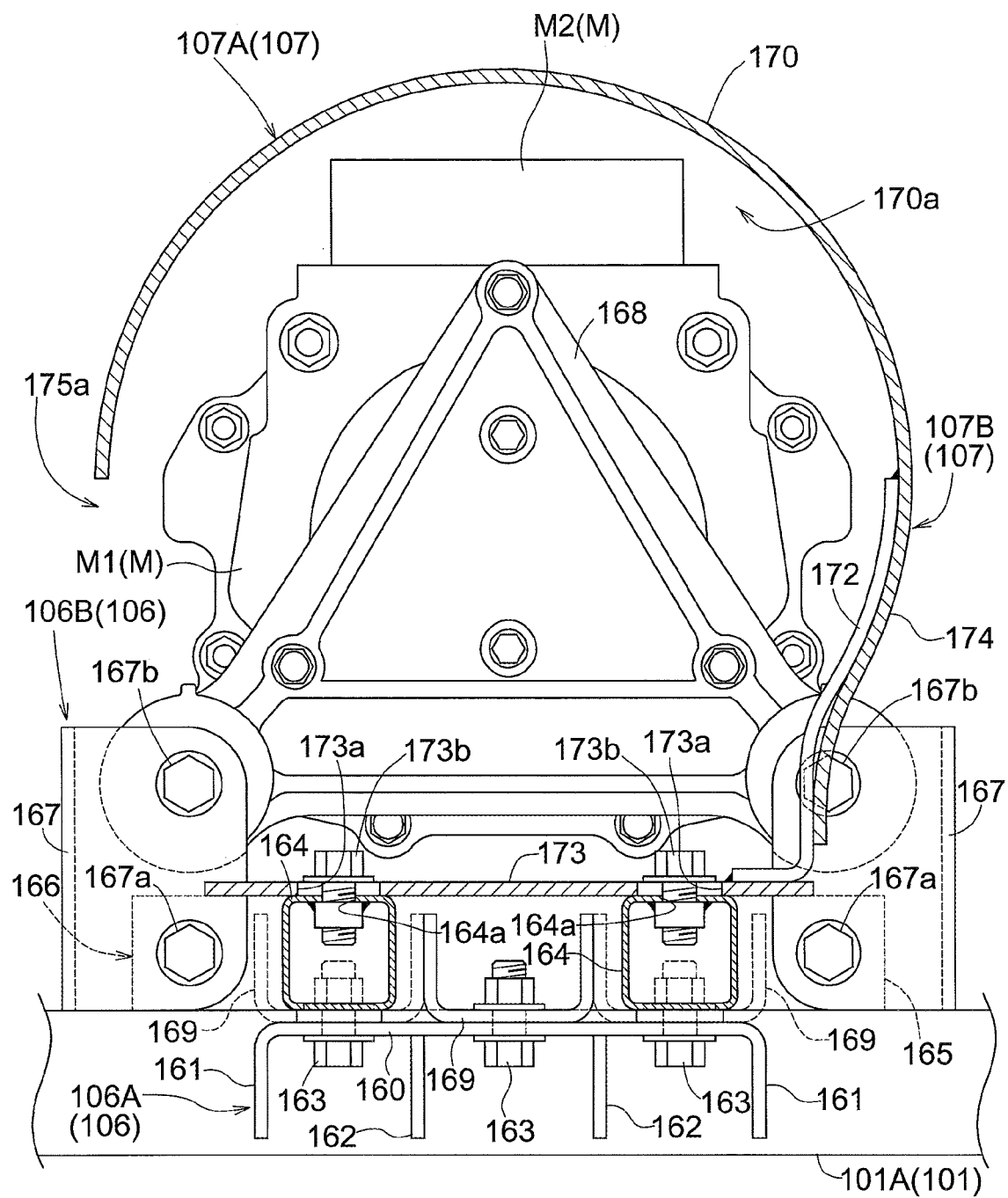
FIG. 21 is a view in section taken along a line XXI-XXI in FIG. 20.

As shown in FIGS. 18, 20 and 21, three through holes 160b, into which coupling bolts 163 are inserted, are provided in the mounting surface 160a of the platform member 160. The slidable frame body 166 includes a coupling bracket 169, and coupling holes 169a are formed in the coupling bracket 169 so as to face the through holes 160b of the mounting surface 160a.

The platform member 160 and the coupling bracket 169 of the slidable frame body 166 mounted on the mounting surface 160a of the platform member 160 can be coupled and fixed to each other by using coupling bolts 163 that are inserted into the through holes 160b on the above-described platform member 160 side and the coupling holes 169a on the slidable frame body 166 side.

Motor Cover

As shown in FIGS. 18, 20 and 21, the assist motor M includes a motor body M1 whose rotor is housed in a housing, and a connection terminal portion M2 to which conductive wires of the battery device 108 and the like are connected. The connection terminal portion M2 is provided on an upper portion of the housing of the motor body M1.

A motor cover 107 includes: a top cover portion 107A that covers an upper portion of the assist motor M including the connection terminal portion M2, and also covers an upper periphery of the assist motor M; and a cover supporting portion 107B that supports the top cover portion 107A.

The top cover portion 107A includes a top plate 170 curved in form of an arc shape in side view to cover the upper surface of the assist motor M from above. A left plate 171 is provided continuous with a left end portion of the top plate 170 of right/left end portions thereof, which portion is located laterally outward relative to the machine body, to face an upper portion of the assist motor M including the connection terminal portion M2. On the other hand, the right end portion of the top plate 170 located laterally outward relative to the machine body is open, so that hot air can easily flow toward the opening portion without staying above the assist motor M. That is, in the top cover portion 107A, this opening portion constitutes a lateral opening portion 170a that allows external air to flow to the inside of the machine body.

The lateral opening portion 170a is located to face the transmission case 144 of the continuously variable transmission device 104. However, as shown in FIG. 16, the lateral opening portion 170a is at quite a long distance from the transmission case 144, and it is unlikely that hot airflow above the assist motor M is obstructed.

The cover supporting portion 107B includes: a supporting post member 172 extending between a rear end portion of the top plate 170 and the front surface of a rear plate 174; a bottom plate 173 extending continuous with a lower end portion of the supporting post member 172; and the rear plate 174 extending continuous with a rear lower portion of the top plate 170 along the rear surface of the supporting post member 172.

The bottom plate 173 has a front-rear length that spans between the front and rear lateral bridge members 164 of the motor attachment frame 106B, and is detachably coupled via coupling bolts 173b through attachment holes 173a formed in the bottom plate 173 and attachment holes 164a formed in the lateral bridge members 164. The attachment holes 173a formed in the bottom plate 173 are front-rear elongated to allow slight adjustment of the attaching position of the motor cover 107 to the motor attachment frame 106B.

The rear plate 174 is fixed by welding to the supporting post member 172. In turn, the supporting post member 172 has a lower end thereof fixed by welding to the bottom plate 173, an upper end thereof fixed by welding to a rear end portion of the top plate 170.

As shown in FIGS. 16 and 18, a left end portion (located outward relative to the machine body) of the rear plate 174 is cut out so that a lower end portion thereof does not interfere with the coupling members 167 that are located outward of the slidable frame body 166 relative to the machine body; and a right end portion (located inward relative to the machine body) of the rear plate 174 is cut out to form a rear opening portion 174a (corresponding to the opening portion according to the present invention), so that the rear plate 174 does not interfere with the coupling members 167 that are located inward relative to the machine body, and the end portion supporting frames 168 do not obstruct external air flowing inward and rearward relative to the machine body.

The above-described cover supporting portion 107B is not surround the entire periphery of the assist motor M. The cover supporting portion 107B includes a front opening portion 175a (corresponding to the opening portion according to the present invention) and a lateral opening portion 175b (corresponding to the opening portion according to the present invention) which are located below the top cover portion 107A at positions other than the positions where the bottom plate 173 and the rear plate 174 are present, so that the front surface and the right and left surfaces of the assist motor M are open to the outside.

Figure 17:
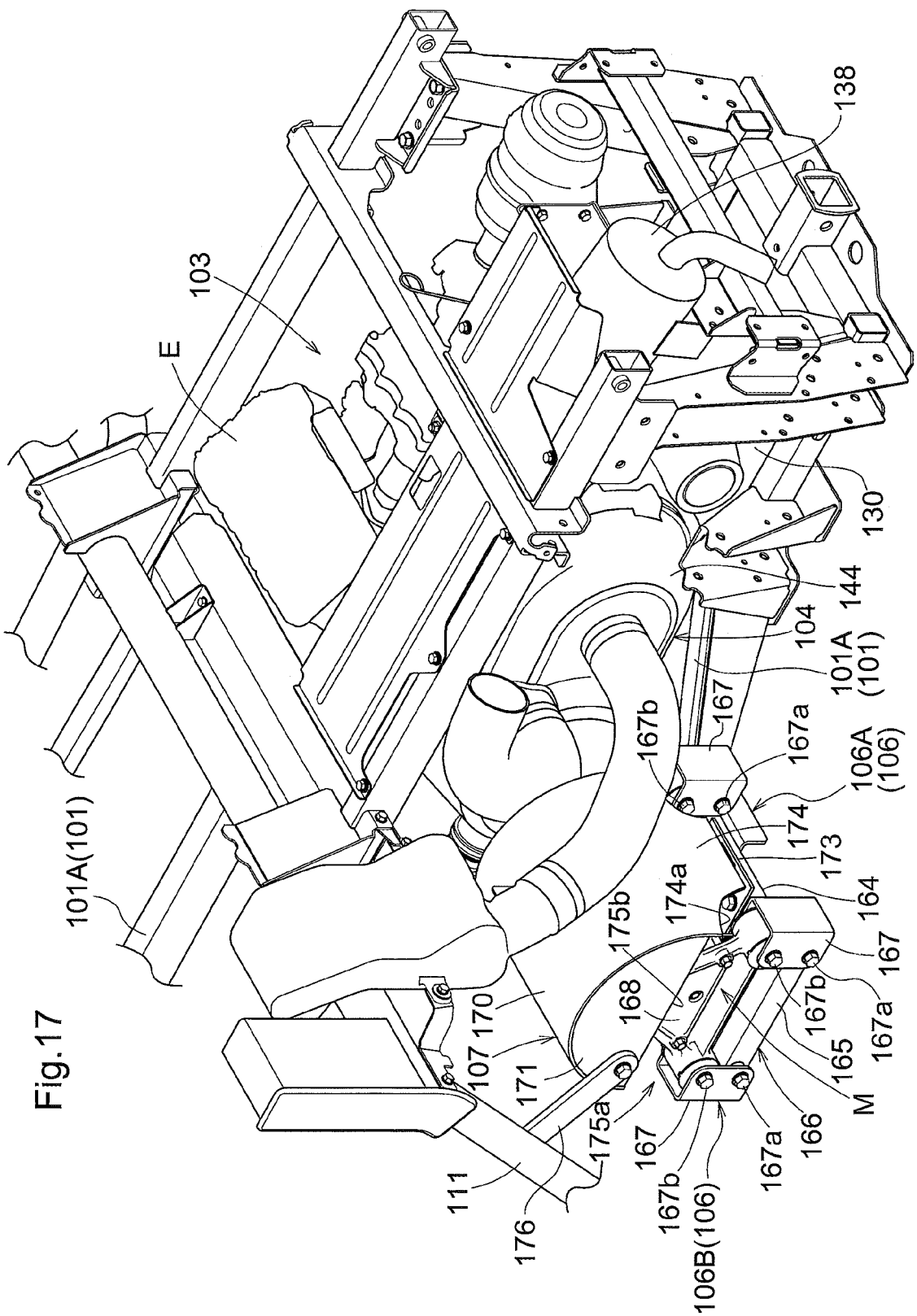
FIG. 17 is a perspective view showing the prime mover section of the utility vehicle.

As shown in FIGS. 12 and 17, the left plate 171 of the motor cover 107 on the front end side of the top cover portion 107A is coupled to a lower portion of the ROPS frame 111 (corresponding to the machine body frame that is located forward of the motor support platform) via a coupling stay 176, at a position inward relative to the machine body. Thus, an upper portion of the motor cover 107 is stably fixed and supported.

Other Embodiments Modified from Second Embodiment

The following only describes features that are different from those of the above-described embodiment.
(1) In the foregoing embodiment, the continuously variable transmission device 104 is provided as a travelling power transmission mechanism. However, the present invention is not limited thereto, and may include various kinds of travelling power transmission mechanisms such as a simple belt power transmission device and a gear power transmission device.
(2) In the foregoing embodiment, the motor cover 107 is attached to the motor attachment frame 106B. However, the present invention is not limited thereto. For example, the motor cover 107 may be attached to the assist motor M itself, or to a machine body fixing portion other than the motor attachment frame 106B.
(3) In the foregoing embodiment, the motor cover 107 is constituted by the top cover portion 107A, which includes the top plate 170 that is curved so as to have an arc shape in side view, and the cover supporting portion 107B, which supports the top cover portion 107A. However, the present invention is not limited thereto. Any shape and configuration may be employed as appropriate. For example, the top cover portion 107A may be formed to have a rectangular box shape, or the top cover portion 107A and the cover supporting portion 107B may be formed as one piece.
(4) The present invention is not limited to a utility vehicle, and is applicable to various kinds of multipurpose vehicles such as a lawn mower and a truck.

Third Embodiment

Overall Configuration

Figure 22:
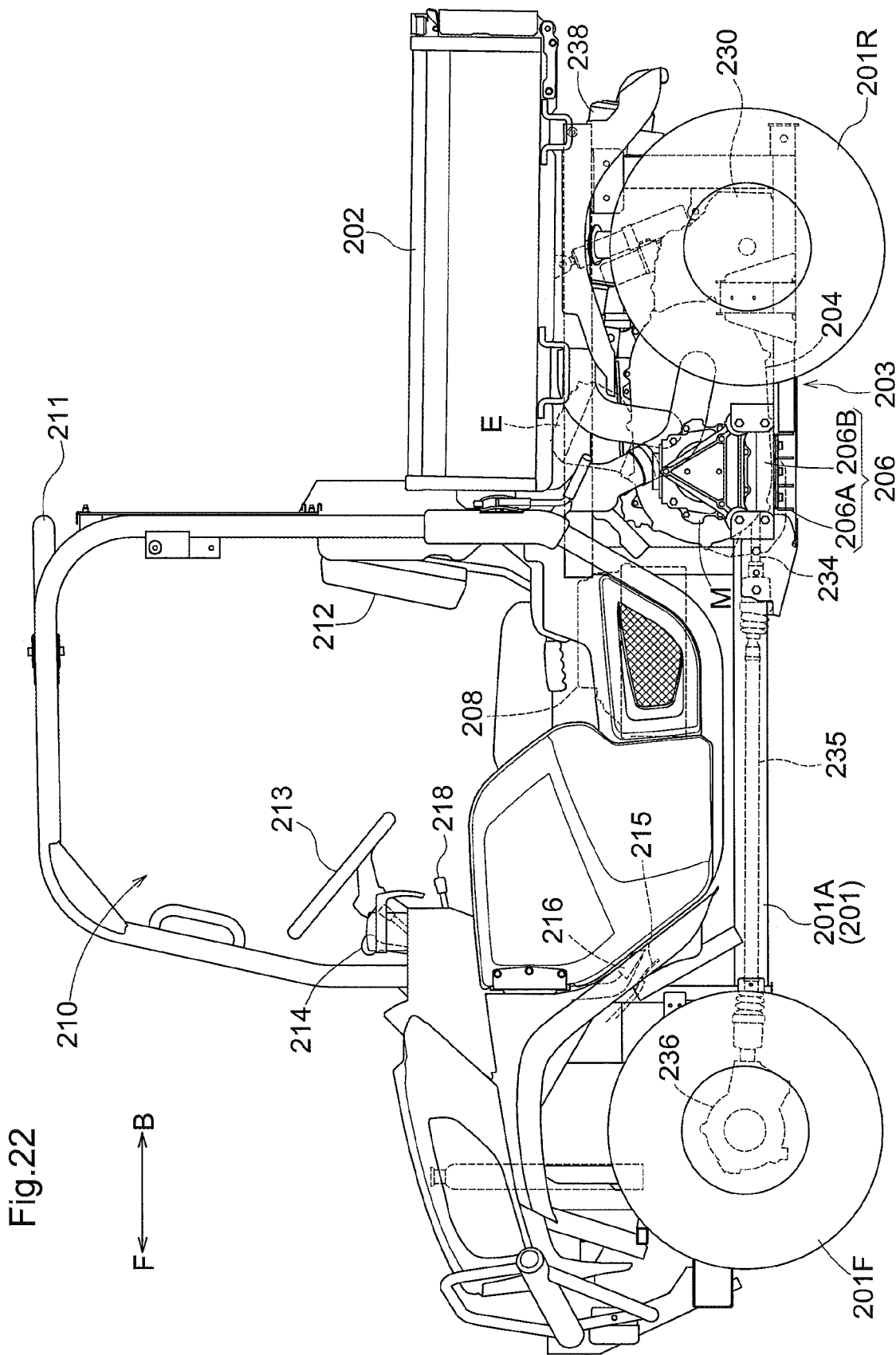
FIG. 22 is a left side view of a utility vehicle according to a third embodiment (the same applies through to FIG. 31).
Figure 23:
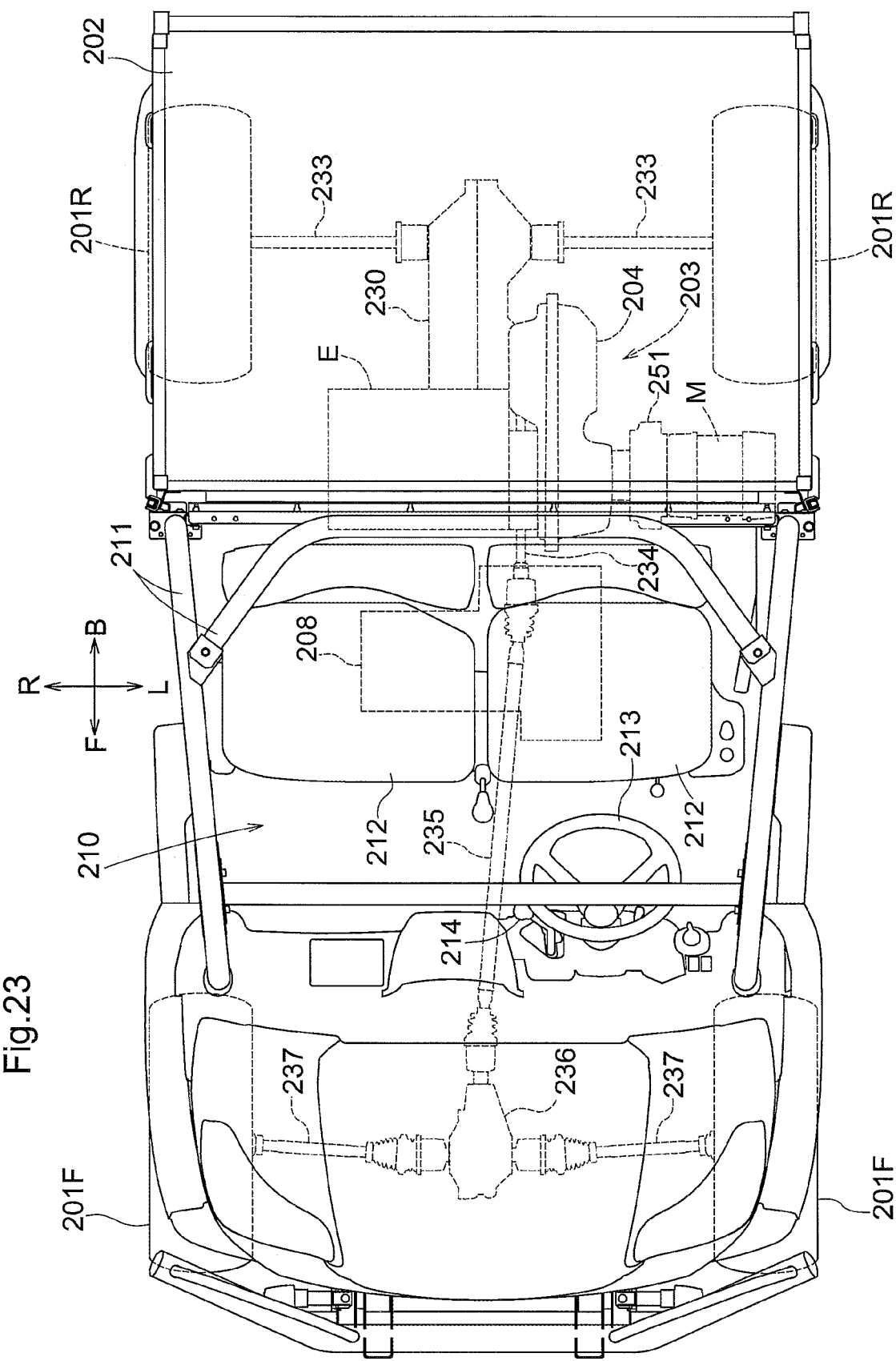
FIG. 23 is a plan view of the utility vehicle.

As shown in FIGS. 22 and 23, a utility vehicle (an example of a multipurpose vehicle) includes a pair of right and left front wheels 201F that are steerable, in a front portion of a vehicle frame 201 that constitutes the framework of a travelling machine body, and a pair of right and left rear wheels 201R that are not steerable are supported in a rear portion of the vehicle frame 201.

A driving section 210 is provided in a central portion of the travelling machine body in the front-rear direction, above the vehicle frame 201. A load carrying platform 202 is provided in a rear portion of the travelling machine body, above the vehicle frame 201, and a prime mover section 203 is provided below the load carrying platform 202.

The front wheels 201F and the rear wheels 201R are configured such that driving forces from an engine E and an assist motor M, which are included in the prime mover section 203 described below, can be transmitted thereto. Thus, the utility vehicle is configured as a four-by-four type four-wheel drive vehicle, and is used for multiple purposes such as farm work and transportation work. A ROPS frame 211 for protecting the driving section 210 is provided around the driving section 210.

The load carrying platform 202 function to discharge loads like a dump truck by raising the front end side thereof about a right-left axis extending on the rear end side, and the load carrying platform 202 is supported on the vehicle frame 201 so as to be swingable about the lateral axis. Also, a hydraulic actuator (not shown) that raises and lowers the front end side of the load carrying platform 202 is provided.

The driving section 210 includes a driver's seat 212 for a driver to sit on, a steering wheel 213 for performing control to steer the front wheels 201F, a shift lever 214, an accelerator pedal 215 for controlling the travelling speed, and a brake pedal 216 for operating brake devices 217 for the front wheels 201F and the rear wheels 201R. Typically, a passenger seat is provided adjacent to a driver's seat 212. However, this driver's seat 212 is configured as a bench seat that is constituted by one laterally-elongated seat base and one laterally-elongated seat back.

A fuel tank (not shown) for supplying fuel to the engine E and a battery 208 for supplying electrical power to the assist motor M are provided in an under-seat space, which is a space below the driver's seat 212.

Configuration of Prime Mover Section

Figure 24:
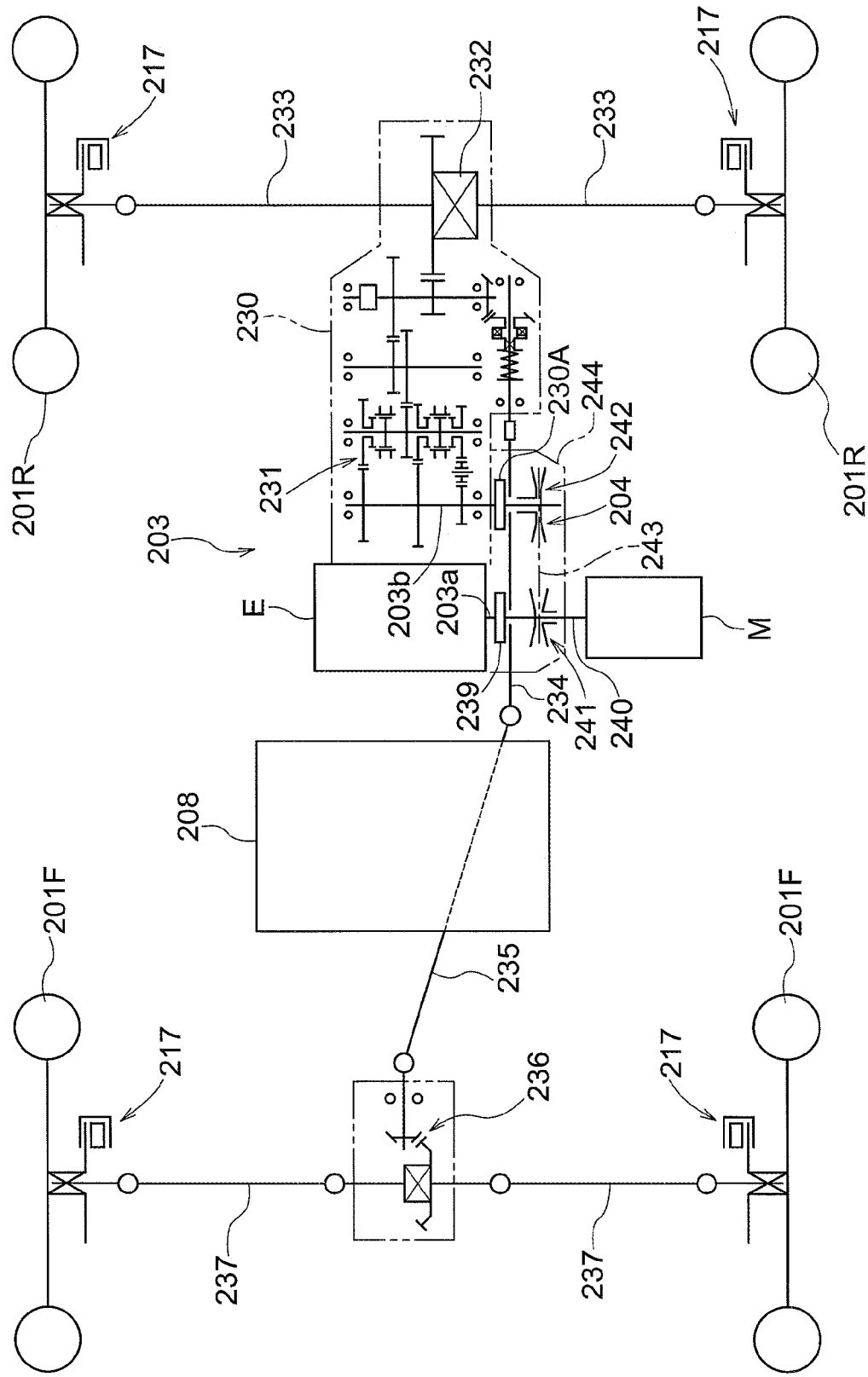
FIG. 24 is a schematic diagram showing power transmission systems for the utility vehicle.

As shown in FIGS. 23 and 24, the prime mover section 203 is provided in a rear portion of the travelling machine body so as to be located below the load carrying platform 202.

The prime mover section 203 includes: the water-cooled type gasoline engine E (hereinafter simply referred to as "engine E"), which is an internal combustion engine; the assist motor M (hereinafter simply referred to as "assist motor"), which is constituted by an electric motor; a transmission case 230; and a dry-type continuously variable transmission device 204 (an example of a travelling power transmission mechanism). A gear shift mechanism 231 and a differential mechanism 232 are built into the transmission case 230. A pair of right and left rear wheel drive shafts 233 that transmit a driving force from the differential mechanism 232 to the rear wheels 201R are provided in a lower end portion of the transmission case 230.

A power take-off shaft 234 that protrudes forward is provided in a lower end portion of the transmission case 230. A transmission shaft 235 to which a driving force from the power take-off shaft 234 is transmitted is provided in a lower portion of the travelling machine body, and a front wheel differential mechanism 236, to which a driving force from the transmission shaft 235 is transmitted, and front wheel drive shafts 237, which transmit a driving force from the front wheel differential mechanism 236 to the front wheels 201F, are provided in a front portion of the travelling machine body.

The brake devices 217 are provided at the shaft ends of the pair of right and left front wheel drive shafts 237 and the shaft ends of the pair of right and left rear wheel drive shafts 233. The brake devices 217 function to apply braking forces to the front wheels 201F and the rear wheels 201R upon the brake pedal 216 being operated.

The gear shift mechanism 231 provided in the transmission case 230 is subjected to gear shifting upon the shift lever 214 being operated. In accordance with an operation made with the shift lever 214, the gear shift mechanism 231 changes the travelling speed of the travelling machine body (a high speed and a low speed), and changes the direction in which the traveling machine body travels (forward travelling and rearward travelling). The shift lever 214 is configured such that the setting of a travelling speed and the switching between forward travelling and rearward travelling can be performed by operating a single lever. However, a lever for a shift operation and a forward and rearward travelling lever for switching between forward travelling and rearward traveling may be configured as separate levers.

Figure 25:
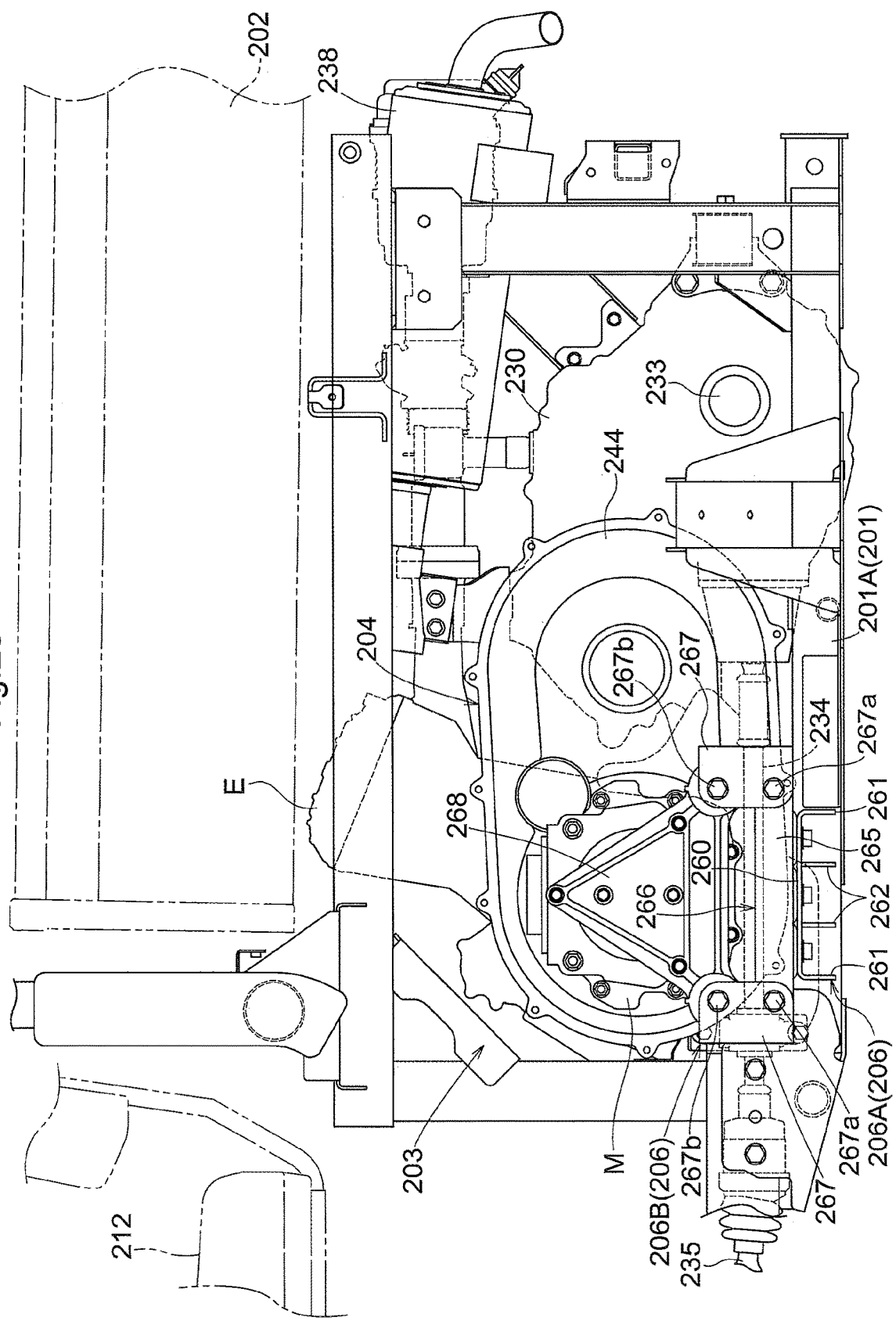
FIG. 25 is a left side view showing a prime mover section of the utility vehicle.
Figure 26:
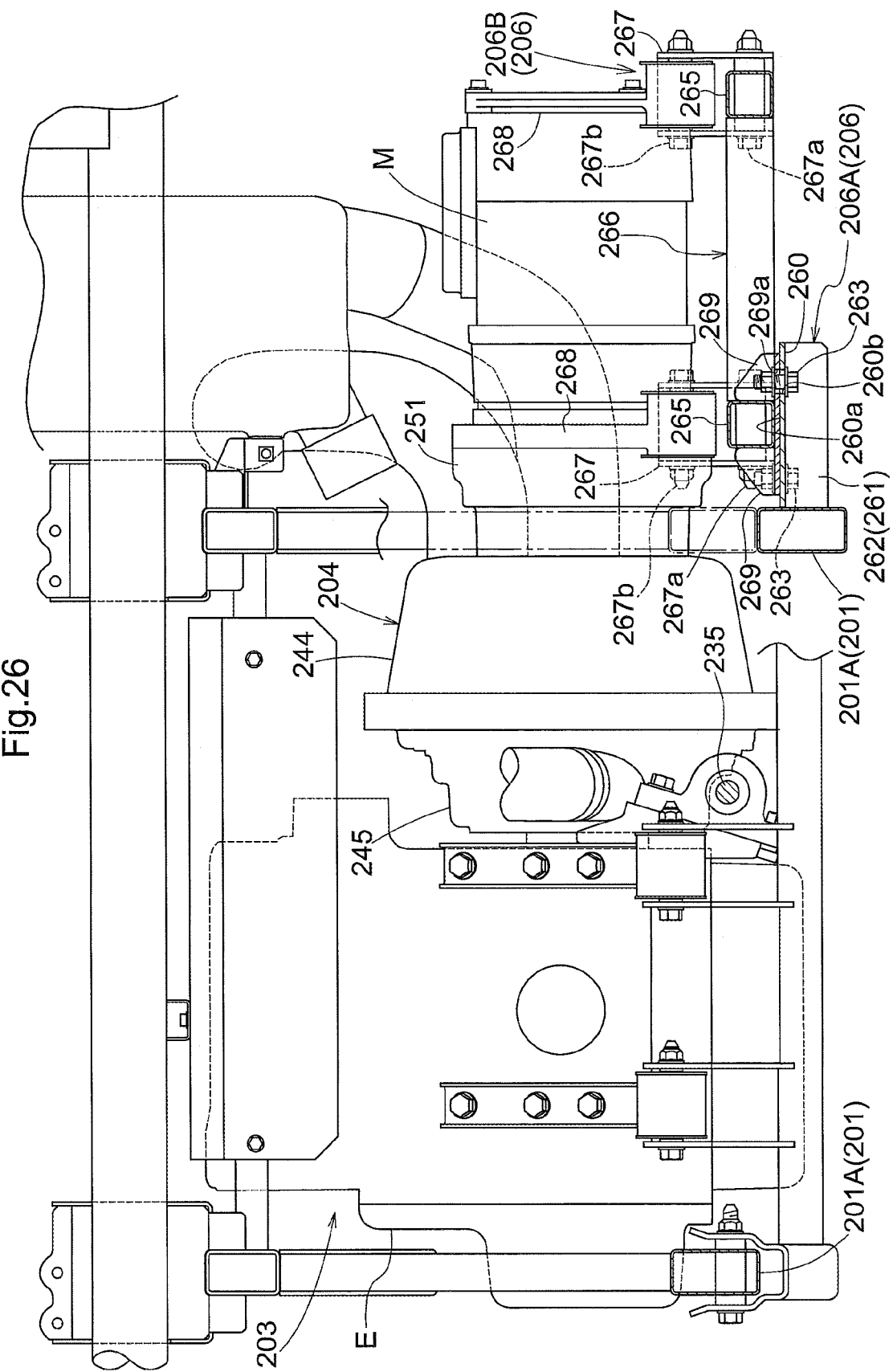
FIG. 26 is a front view showing the prime mover section of the utility vehicle.
Figure 27:
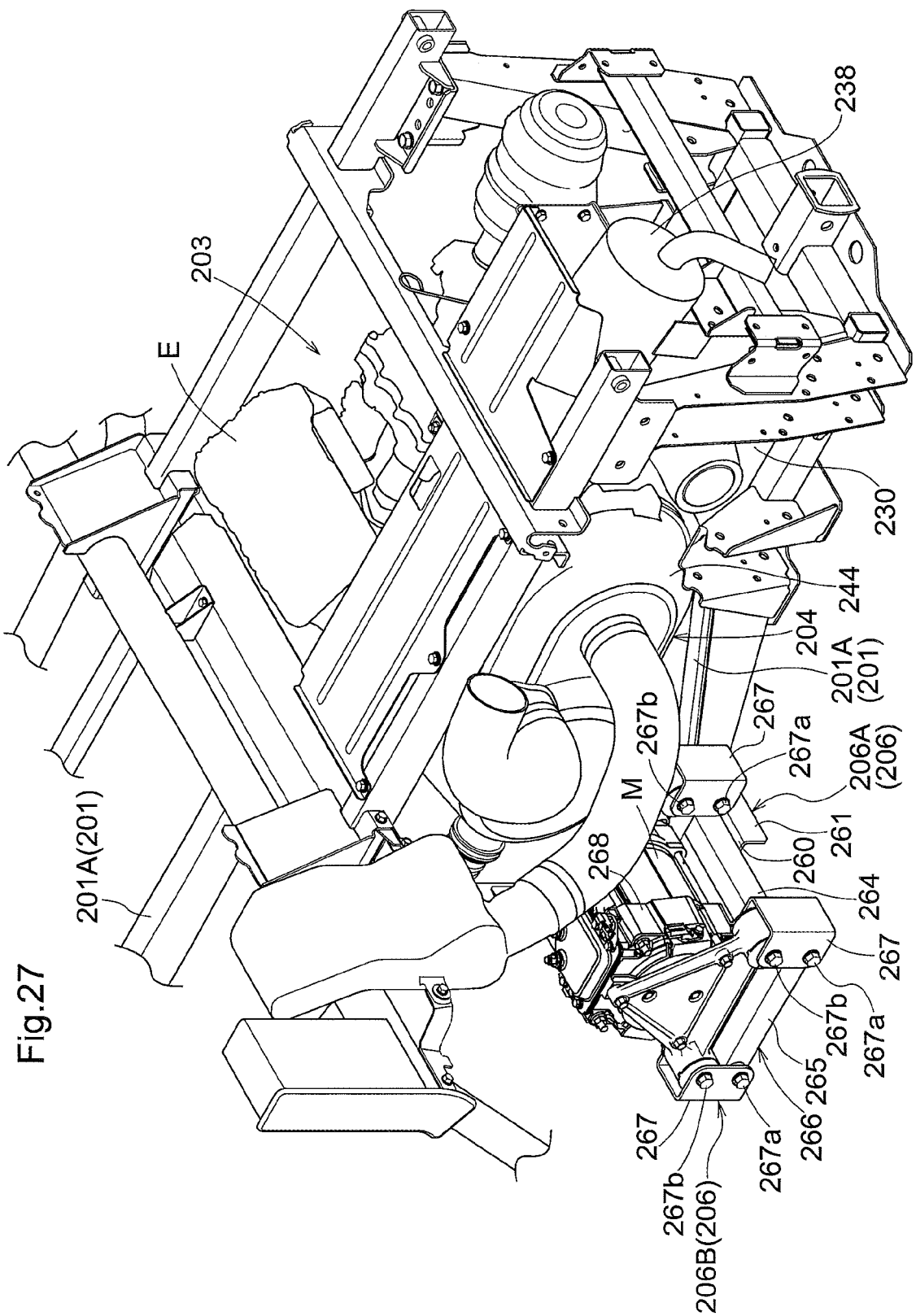
FIG. 27 is a perspective view showing the prime mover section of the utility vehicle.

As shown in FIGS. 23, 24, and 26, the engine E is provided in the prime mover section 203 such that a crankshaft 203a thereof is orientated in a lateral direction. The transmission case 230 is provided at a position that is rearward of and adjacent to the crankshaft 203a such that an input shaft 203b is orientated in a lateral direction. A front-rear elongated muffler 238 (see FIG. 25) is provided in an upper side portion of the transmission case 230 rearward of the engine E.

The continuously variable transmission device 204 is provided on a lateral side each of the engine E and the transmission case 230 for transmitting power from the engine E to the transmission case 230. The assist motor M is located opposite the engine E across the continuously variable transmission device 204.

An input clutch 230A (corresponding to the power transmission state switching device according to the present invention) for connecting and disconnecting power transmission from the continuously variable transmission device 204 to the transmission case 230 is provided at a position where the input shaft 203b of the transmission case 230 is provided.

The input clutch 230A is configured to be manually turned ON and OFF using an input clutch operation lever 218 (see FIG. 22) that is located at an appropriate position in the driving section 210.

When the input clutch 230A has been brought into an ON-state by turning on the input clutch operation lever 218, power transmission from the continuously variable transmission device 204 to the gear shift mechanism 231 in the transmission case 230 is maintained.

When the input clutch 230A is brought into an OFF state by turning OFF the input clutch operation lever 218, power transmission from the continuously variable transmission device 204 to the gear shift mechanism 231 in the transmission case 230 is disconnected.

Continuously Variable Transmission Device

Figure 29:
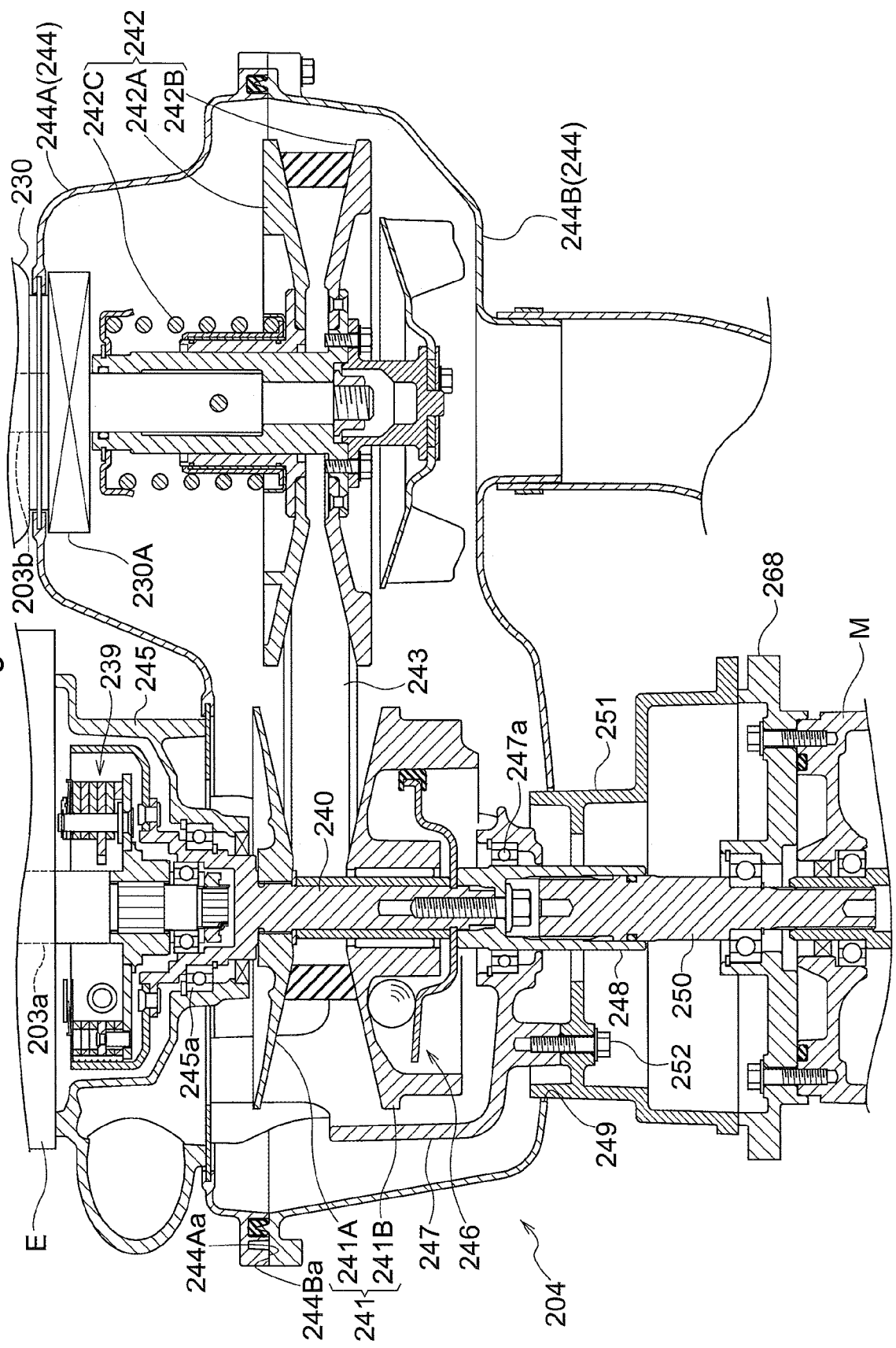
FIG. 29 is a view in horizontal section showing a structure for transmitting power from an engine and the assist motor to a continuously variable transmission device.

As shown in FIGS. 24 and 29, the continuously variable transmission device 204 includes: a driving pulley 241 whose belt winding diameter is changeable; a driven pulley 242 whose belt winding diameter is changeable; and an endless belt 243 that is made of rubber and is wound around the driving pulley 241 and the driven pulley 242. These components are housed in a transmission case 244. Note that a metal belt may be used as the endless belt 243.

A centrifugal clutch 239 that connects and disconnects a rotational driving force from the crankshaft 203a of the engine E to the continuously variable transmission device 204 is provided between the engine E and the continuously variable transmission device 204. A drive shaft 240 that is provided on the output side of the centrifugal clutch 239 includes the driving pulley 241 of the continuously variable transmission device 204.

A portion of the drive shaft 240 near the end thereof on the engine E side is rotatably supported by a bearing 245a that is provided in a clutch case 245, and a portion of the drive shaft 240 near the end thereof on the assist motor M side is rotatably supported by a bearing 247a that is provided in a support bracket 247. The input shaft 203b in the transmission case 230 includes the driven pulley 242. The drive shaft 240 of the centrifugal clutch 239 is provided coaxially with the crankshaft 203a.

When the crankshaft 203a is rotating at a low rotation speed that is lower than a predetermined value, the centrifugal clutch 239 is in a disconnected state and does not transmit the rotational force of the crankshaft 203a to the drive shaft 240. When the rotation speed of the crankshaft 203a exceeds the predetermined value, the centrifugal clutch 239 comes into a connected state and transmits the rotational force of the crankshaft 203a to the drive shaft 240.

The driving pulley 241 includes a fixed sheave 241A that is located on the base end side of the drive shaft 240 (on the side that is closer to the engine E) and a movable sheave 241B that is located on the leading end side of the drive shaft 240. Also, a winding diameter adjustment mechanism 246 that adjusts the position of the movable sheave 241B is provided at a protruding end of the drive shaft 240.

The winding diameter adjustment mechanism 246 is configured to increase the belt winding diameter of the driving pulley 241 by moving the movable sheave 241B toward the fixed sheave 241A as the rotation speed of the drive shaft 240 increases. Conversely, the winding diameter adjustment mechanism 246 is configured to reduce the belt winding diameter of the driving pulley 241 by moving the movable sheave 241B away from the fixed sheave 241A as the rotation speed of the drive shaft 240 decreases.

The driven pulley 242 includes a movable sheave 242A that is located on the base end side of the input shaft 203b (on the side that is closer to the transmission case 230), a fixed sheave 242B that is located on the leading end side of the input shaft 203b, and a coil spring 242C that applies a biasing force to bias the movable sheave 242A toward the fixed sheave 242B.

The coil spring 242C applies a biasing force to determine the position of the movable sheave 242A of the driven pulley 242 in accordance with the tension that is applied to the endless belt 243. That is, if the belt winding diameter of the driving pulley 241 changes, the tension applied to the endless belt 243 changes. The coil spring 242C moves the movable sheave 242A away from the fixed sheave 242B as the tension increases, and moves the movable sheave 242A toward the fixed sheave 242B as the tension decreases. Therefore, if the belt winding diameter of the driving pulley 241 is small, the belt winding diameter of the driven pulley 242 is set to a large value. Conversely, if the belt winding diameter of the driving pulley 241 is increased, the belt winding diameter of the driven pulley 242 is set to a small value.

The assist motor M that is located opposite the engine E across the driving pulley 241 is provided such that an output shaft 250 is orientated in a lateral direction (to face toward the driving pulley 241). In the present embodiment, the assist motor M is attached to an outer end portion of the support bracket 247, using bolts or the like. The output shaft 250 is located coaxially with the drive shaft 240. The drive shaft 240 extends to the output shaft 250, and a coupler 248 is provided so as to span between the output shaft 250 and the drive shaft 240. The coupler 248 and the output shaft 250, and the coupler 248 and the drive shaft 240, are spline-fitted to each other. The coupler 248 is supported by the bearing 247a that is provided in the support bracket 247, and thus the output shaft 250 and the drive shaft 240 are supported so as to be rotatable integrally with each other.

As shown in FIGS. 24 and 29, the transmission case 244 (corresponding to the case member according to the present invention) includes a case body 244A that is supported by the vehicle body (at least one of the transmission case 230 and the engine E) and a cover member 244B that is supported so as to be separable from the case body 244A. The clutch case 245 that surrounds the centrifugal clutch 239 is coupled to a cylinder block of the engine E, and the clutch case 245 is coupled to the case body 244A of the transmission case 244. Also, the support bracket 247 is attached to the case body 244A and the clutch case 245, using bolts or the like.

The cover member 244B has a shape that can house the driving pulley 241, the winding diameter adjustment mechanism 246, and the driven pulley 242 from a laterally outer side. Flange surfaces 244Ba, 244Aa are formed on the outer circumferential surfaces of the cover member 244B and the case body 244A. The case body 244A and the cover member 244B are coupled to each other, using bolts or the like (not shown), such that the flange surface 244Aa of the case body 244A and the flange surface 244Ba of the cover member 244B face each other and a seal member such as a piece of rubber (not shown) is sandwiched therebetween.

With this configuration, it is possible to attach and detach only the cover member 244B while keeping the case body 244A in the state of being supported by the vehicle body (at least one of the transmission case 230 and the engine E).

As shown in FIG. 29, an opening portion 249 is formed in a portion of the cover member 244B through which the output shaft 250 of the assist motor M and the coupler 248 penetrate, and a cylindrical member 251 that covers the outer circumferential surfaces of the output shaft 250 and the coupler 248 is fixed to the opening portion 249 in the state of being inserted thereinto.

An end portion of the cylindrical member 251 that is closer to the driving pulley 241 penetrates through the opening portion 249, and is coupled and fixed to the support bracket 247 using a fixing bolt 252.

An end portion of the cylindrical member 251 that faces the assist motor M is coupled and fixed to a motor attachment frame 206B of a motor support platform 206 that supports the assist motor M, using bolts or the like (not shown) as appropriate, so as to abut against the motor attachment frame 206B.

Motor Support Platform

The motor support platform 206 that supports the assist motor M is configured as shown in FIGS. 25 to 31.

The motor support platform 206 includes an extension frame portion 206A that protrudes outward to the left from one of front-rear elongated main frames 201A of the vehicle frame 201 located on the left side, and the motor attachment frame 206B that is attached to the extension frame portion 206A to be movable in the right-left direction relative to the extension frame portion 206A.

The extension frame portion 206A includes a platform member 260 that has a mounting surface 260a that faces upward, side ribs 261 that are bent downward from front and rear ends of the platform member 260, and intermediate ribs 262 that are provided between the side ribs 261 on the lower surface of the platform member 260. An end portion of the extension frame portion 206A that is closer to the main frame 201A is welded and fixed to the main frame 201A and constitutes a portion of the vehicle frame 201.

The motor attachment frame 206B includes a slidable frame body 266 that is constituted by: a pair of front and rear lateral bridge members 264 with a longitudinal direction thereof extending along the output shaft 250 of the assist motor M; and a pair of right and left longitudinal frame members 265 that respectively couple the right/left ends of the front/rear lateral bridge members 264 to each other.

Lower portions of four coupling members 267 in total, which are channel-shaped in plan view, are attached to the front and rear ends of the right and left longitudinal frame members 265 of the slidable frame body 266, using coupling bolts 267a. A pair of pair of right and left end portion supporting frames 268 are coupled and fixed to upper portions of the coupling members 267, using coupling bolts 267b. Thus, the motor attachment frame 206B that can support the assist motor M is formed.

The right and left ends of the assist motor M face the right and left end portion supporting frames 268, and the right and left ends are coupled to the end portion supporting frames 268 so as to be sandwiched between the right and left end portion supporting frames 268, using coupling bolts or the like (not shown) as appropriate.

The right and left end portion supporting frames 268, to which the assist motor M is coupled, are coupled and fixed to the slidable frame body 266, and the slidable frame body 266 is mounted on, and is coupled and fixed to, the platform member 260 of the extension frame portion 206A.

Figure 28:
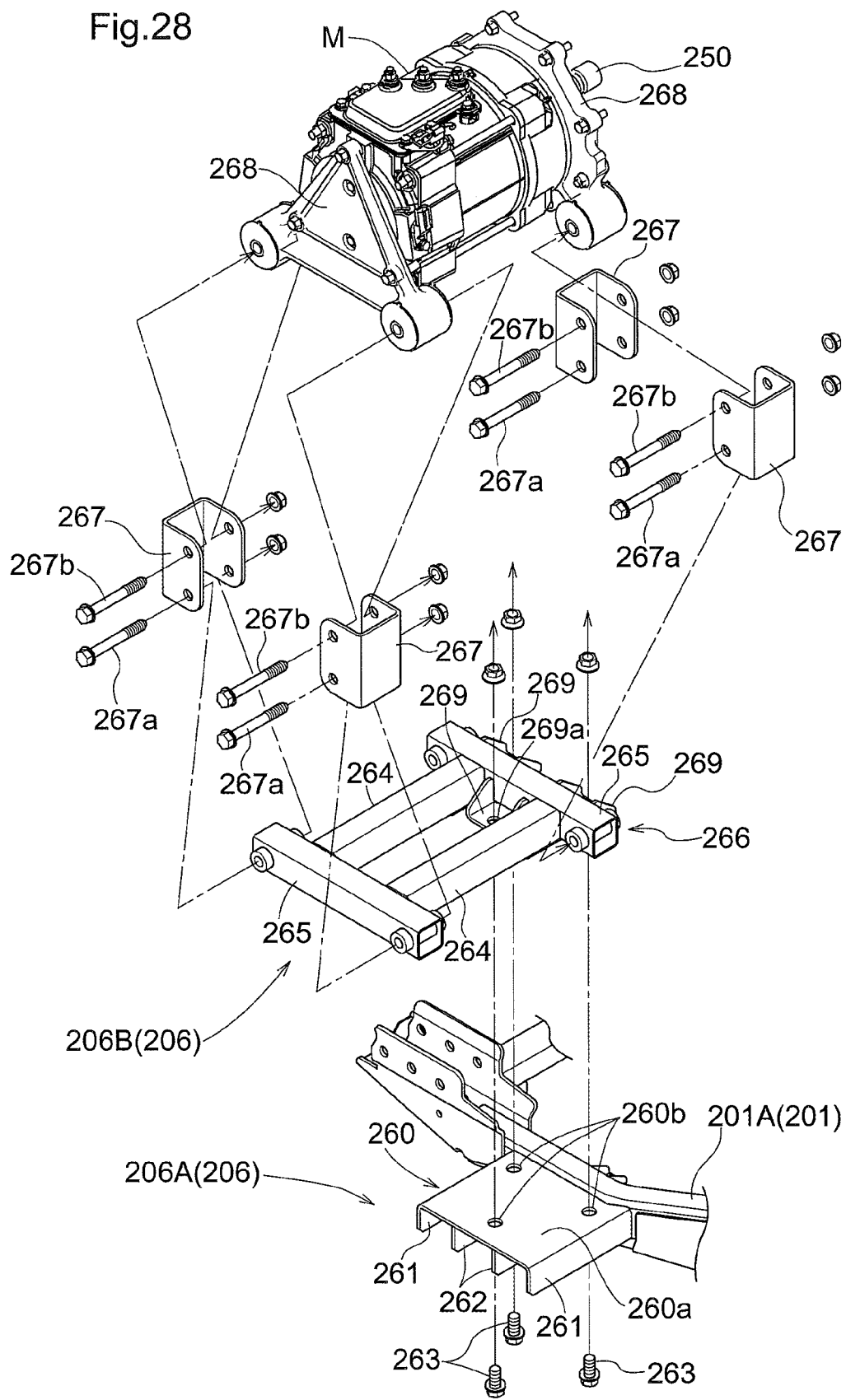
FIG. 28 is an exploded perspective view showing an assist motor and a motor support platform.
Figure 30:
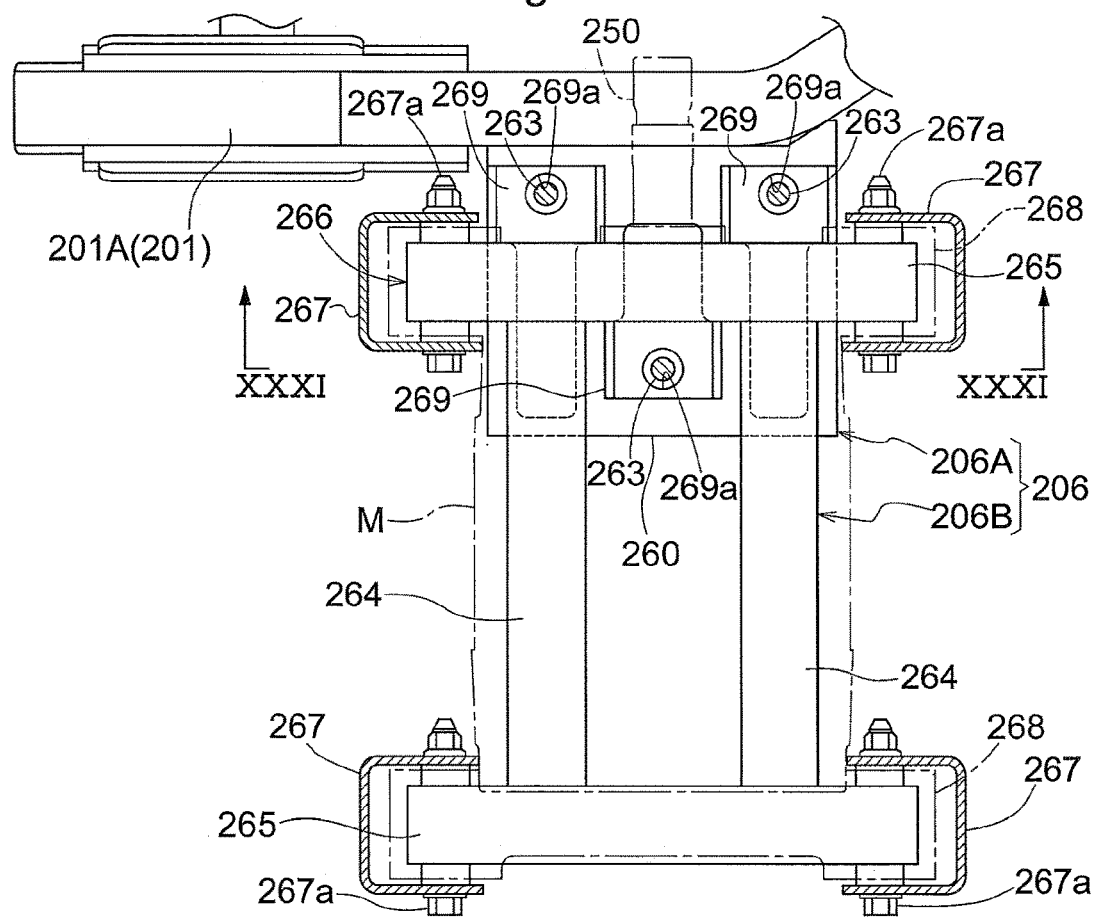
FIG. 30 is a plan view showing the assist motor and the motor support platform.
Figure 31:
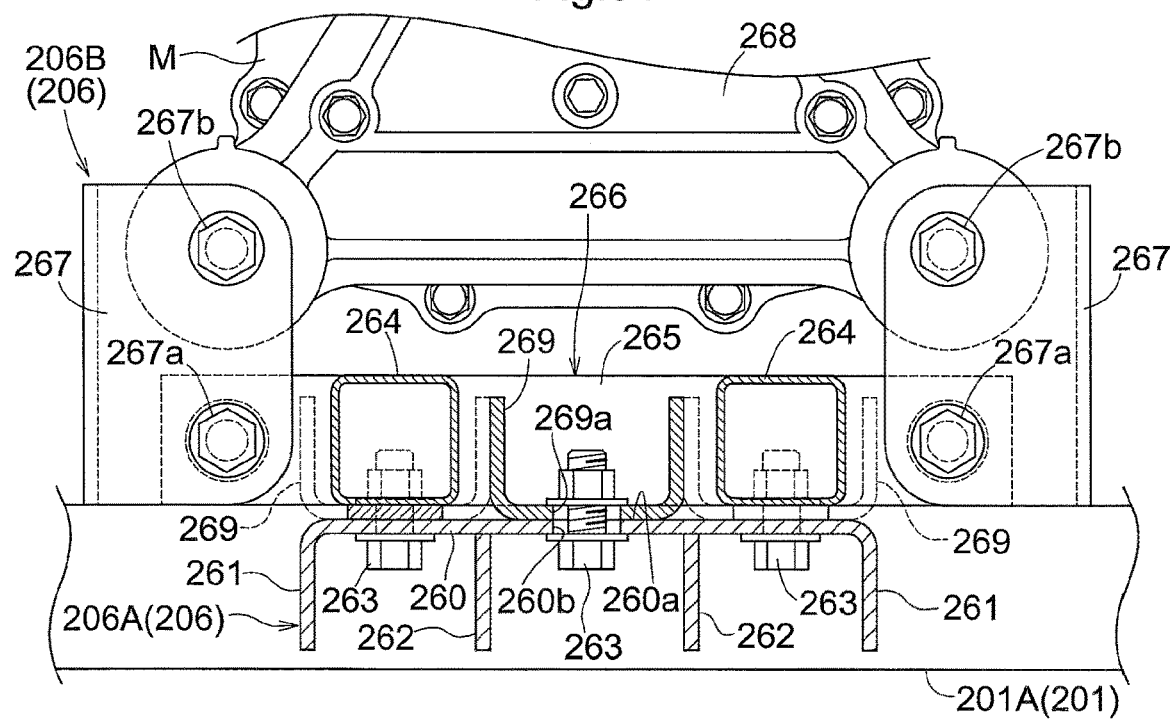
FIG. 31 is a view in section taken along a line XXXI-XXXI in FIG. 30.

As shown in FIGS. 28, 30 and 31, three through holes 260b, into which coupling bolts 263 are inserted, are provided in the mounting surface 260a of the platform member 260. A coupling bracket 269, which is provided on the slidable frame body 266, includes coupling holes 269a that are located so as to face the through holes 260b of the mounting surface 260a.

The platform member 260 and the coupling bracket 269 of the slidable frame body 266 mounted on the mounting surface 260a of the platform member 260 can be coupled and fixed to each other by using coupling bolts 263 that are inserted into the through holes 260b on the above-described platform member 260 side and the coupling holes 269a on the slidable frame body 266 side.

The through holes 260b in the above-described platform member 260 and the coupling holes 269a in the coupling bracket 269 are formed such that the inner diameters thereof are slightly larger than the outer diameters of the coupling bolts 263, so that some play is formed between the outer diameter of the inserted coupling bolts 263 and the holes.

This configuration is employed to make it easier to accurately align the axis of the output shaft 250 of the assist motor M with the axis of the crankshaft 203a and the axis of the drive shaft 240 of the continuously variable transmission device 204 when attaching the assist motor M to a position that is opposite the engine E across the continuously variable transmission device 204.

That is, when performing processing to form the through holes 260b in the extension frame portion 206A that protrudes outward to the left from the main frame 201A, and when performing processing to form the coupling holes 269a in the coupling bracket 269 on the slidable frame body 266 side, it is very difficult to accurately perform such processing such that the axes of these three kinds of elements perfectly coincide with each other. However, as described above, by forming the inner diameter of the through holes 260b and the inner diameter of the coupling holes 269a so as to be slightly larger than the outer diameter of the coupling bolts 263 so that some play is formed between the outer diameter of the inserted coupling bolts 263 and the holes, it becomes easier to adjust the orientation of the axis of the output shaft 250 of the assist motor M so that the axes of the three kinds of elements coincide with each other.

Drive Control

The following describes an example of drive control that is performed on the utility vehicle.

First, when the input clutch operation lever 218 has been turned ON and the input clutch 230A for connecting and disconnecting power transmission from the continuously variable transmission device 204 to the transmission case 230 is in an ON-state (a connected state), the utility vehicle is driven in the following manner.

In the utility vehicle, the engine E is started up by a start-up switch (not shown). The utility vehicle is driven by the assist motor M to travel at a low speed (low rotation speed), and is driven by the engine E (or the engine E and the assist motor M) to travel at a high speed (high rotation speed).

Specifically, upon the accelerator pedal 215 being operated, power is supplied to the assist motor M from a power supply unit (not shown), and the assist motor M is driven to rotate.

In this state, the engine E is driven to rotate at a rotation speed that corresponds to the operation position of the accelerator pedal 215. However, until the accelerator pedal 215 is operated to an operation position that corresponds to a preset value of the rotation speed of the engine at which the centrifugal clutch 239 comes into a connected state, and the rotation speed of the engine reaches the preset value, the centrifugal clutch 239 is in a disconnected state. Therefore, the rotational driving force of the engine E (the crankshaft 203a) is not transmitted to the drive shaft 240, and the rotational driving force of the assist motor M is inputted to the input shaft 203b of the transmission case 230 via the continuously variable transmission device 204, and thus the utility vehicle is driven.

Upon the accelerator pedal 215 being further operated and the rotation speed of the engine E reaching the preset value, the centrifugal clutch 239 comes into a connected state and the rotational driving force of the engine E (the crankshaft 203a) is transmitted to the drive shaft 240. In this state, both the engine E and the assist motor M are driven to rotate at a rotation speed that corresponds to the operation position of the accelerator pedal 215, and rotational driving forces from the engine E and the assist motor M are inputted to the input shaft 203b of the transmission case 230 via the continuously variable transmission device 204, and thus the utility vehicle is driven.

When the utility vehicle is to brake, the assist motor M performs braking and deceleration using the regenerative brake thereof. Electrical power generated at this time is accumulated in the battery 208.

The above-described control of the rotation speed of the assist motor M and the engine E is performed by a control unit (not shown), for example. Specifically, the accelerator pedal 215 includes, for example, an operation position detection device such as a rotation sensor. The control unit performs the above-described control based on a detection signal from the operation position detection device.

Next, when the input clutch operation lever 218 has been turned OFF and the input clutch 230A for connecting and disconnecting power transmission from the continuously variable transmission device 204 to the transmission case 230 is in an OFF state (a disconnected state), the utility vehicle is driven in the following manner.

Power transmission from the continuously variable transmission device 204 to the transmission case 230 is interrupted, and therefore the utility vehicle is in a stopped state.

Specifically, upon the accelerator pedal 215 being operated, power is supplied to the assist motor M from a power supply unit (not shown), and the assist motor M is driven to rotate.

In this state, the engine is driven to rotate at a rotation speed that corresponds to the operation position of the accelerator pedal 215. However, until the accelerator pedal 215 is operated to an operation position that corresponds to a preset value of the rotation speed of the engine at which the centrifugal clutch 239 comes into a connected state, and the rotation speed of the engine reaches the preset value, the centrifugal clutch 239 is in a disconnected state. Therefore, the rotational driving force of the engine E (the crankshaft 203a) is not transmitted to the drive shaft 240, and the rotational driving force of the assist motor M is transmitted to the transmission case 230 side via the continuously variable transmission device 204. However, since the input clutch 230A is in a disconnected state, the utility vehicle still remains in the stopped state.

Upon the accelerator pedal 215 being further operated and the rotation speed of the engine E reaching the preset value, the centrifugal clutch 239 comes into a connected state and the rotational driving force of the engine E (the crankshaft 203a) is transmitted to the drive shaft 240. In this state, the engine E is driven to rotate at a rotation speed that corresponds to the operation position of the accelerator pedal 215.

Then, upon the operation position detection device such as a rotation sensor detecting that the rotation speed of the engine has reached the preset value at which the centrifugal clutch 239 can come into a connected state, a detection signal from a detection sensor (not shown) for detecting an OFF state of the input clutch operation lever 218 is simultaneously detected, and the control unit outputs an instruction to interrupt power supply to the assist motor M. Thus, the driving of the assist motor M using power supplied from the battery 208 is stopped.

However, the output shaft 250 of the assist motor M is coupled to the drive shaft 240 of the continuously variable transmission device 204, and the continuously variable transmission device 204 is driven by the driving force of the engine E. Therefore, the assist motor M is also driven by the driving force of the engine E to serve as a generator, and charges the battery 208. Here, the input clutch 230A is in a disconnected state, and therefore the utility vehicle is kept in a stopped state.

Other Embodiments Modified from Third Embodiment

The following only describes features that are different from those of the above-described embodiment.
(1) In the foregoing embodiment, the continuously variable transmission device 204 is provided as a travelling power transmission mechanism. However, the present invention is not limited thereto, and may include various kinds of travelling power transmission mechanisms such as a simple belt power transmission device and a gear power transmission device.
(2) In the foregoing embodiment, the engine E is started up by a start-up switch, but this is not limitative.

For example, as described below, a configuration in which control is performed such that the engine E is started up and stopped according to the degree of operation of the accelerator pedal 215 may be employed.

According to control in the other embodiment, the engine E is not started up by a start-up switch.

First, when the input clutch operation lever 218 has been turned ON and the input clutch 230A for connecting and disconnecting power transmission from the continuously variable transmission device 204 to the transmission case 230 is in an ON-state (a connected state), the utility vehicle is driven in the following manner.

The utility vehicle is driven by the assist motor M to travel at a low speed, and is driven by the engine E (or the engine E and the assist motor M) to travel at a high speed. Specifically, upon the accelerator pedal 215 being operated, power is supplied to the assist motor M from a power supply unit (not shown) and the assist motor M is driven to rotate. Until the accelerator pedal 215 is operated to the predetermined operation position (the first predetermined position), the engine E is not driven and only the assist motor M is driven at a rotation speed that corresponds to the operation position of the accelerator pedal 215. At this time, since the engine E is not driven, the rotation speed of the engine E is lower than the predetermined value and the centrifugal clutch 239 is in a disconnected state. Therefore, the rotational driving force of the assist motor M is inputted to the input shaft 203b of the transmission case 230 via the continuously variable transmission device 204, and thus the utility vehicle is driven.

Upon the accelerator pedal 215 being operated to the predetermined operation position (the first predetermined position), the engine is started up and is driven to rotate at a rotation speed that corresponds to the operation position of the accelerator pedal 215. However, until the accelerator pedal 215 is operated to the operation position (the second predetermined position) that corresponds to a preset value of the rotation speed of the engine at which the centrifugal clutch 239 comes into a connected state, the rotation speed of the engine is lower than the preset value and the centrifugal clutch 239 is in a disconnected state.

Thus, the rotational driving force of the engine E (the crankshaft 203a) is not transmitted to the drive shaft 240. Therefore, in the same manner as above, the rotational driving force of the assist motor M is inputted to the input shaft 203b of the transmission case 230 via the continuously variable transmission device 204, and thus the utility vehicle is driven. Upon the operation position of the accelerator pedal 215 reaching the second predetermined position, the rotation speed of the engine E reaches the preset value, the centrifugal clutch 239 comes into a connected state, and the rotational driving force of the engine E (the crankshaft 203a) is transmitted to the drive shaft 240. In the state where the accelerator pedal 215 has been operated beyond the second predetermined position, both the engine E and the assist motor M are driven to rotate at a rotation speed that corresponds to the operation position of the accelerator pedal 215, and rotational driving forces from the engine E and the assist motor M are inputted to the input shaft 203b of the transmission case 230 via the continuously variable transmission device 204, and thus the utility vehicle is driven.

When the utility vehicle is to brake, the engine E stops driving (the rotation speed of the engine becomes smaller than the preset value), the centrifugal clutch 239 comes into a disconnected state, and the assist motor M performs braking and deceleration using the regenerative brake thereof. Electrical power that is generated at this time is accumulated in the battery 208.

The above-described startup of the assist motor M and the engine and control of the rotation speed of the assist motor M and the engine E are performed by a control unit (not shown), for example. Specifically, the accelerator pedal 215 may include, for example, an operation position detection device such as a rotation sensor. The control unit performs the above-described control based on a detection signal from the operation position detection device.

Next, when the input clutch operation lever 218 has been turned OFF and the input clutch 230A for connecting and disconnecting power transmission from the continuously variable transmission device 204 to the transmission case 230 is in an OFF state (a disconnected state), the utility vehicle is driven in the following manner.

Power transmission from the continuously variable transmission device 204 to the transmission case 230 is interrupted, and therefore the utility vehicle is in a stopped state.

In this state, upon the accelerator pedal 215 being operated, power is supplied to the assist motor M from a power supply unit (not shown), and the assist motor M is driven to rotate. Until the accelerator pedal 215 is operated to the predetermined operation position (the first predetermined position), the engine E is not driven and only the assist motor M is driven at a rotation speed that corresponds to the operation position of the accelerator pedal 215. At this time, since the engine E is not driven, the rotation speed of the engine E is lower than the predetermined value and the centrifugal clutch 239 is in a disconnected state. Therefore, although the rotational driving force of the assist motor M is inputted to the input shaft 203b of the transmission case 230 via the continuously variable transmission device 204, the input clutch 230A is also in a disconnected state, and therefore the utility vehicle still remains in the stopped state.

Upon the accelerator pedal 215 being operated to the predetermined operation position (the first predetermined position), the engine is started up and is driven to rotate at a rotation speed that corresponds to the operation position of the accelerator pedal 215. However, until the accelerator pedal 215 is operated to the operation position (the second predetermined position) that corresponds to a preset value of the rotation speed of the engine at which the centrifugal clutch 239 comes into a connected state, the rotation speed of the engine is lower than the preset value and the centrifugal clutch 239 is in a disconnected state.

Thus, the rotational driving force of the engine E (the crankshaft 203a) is not transmitted to the drive shaft 240. Therefore, in the same manner as above, although the rotational driving force of the assist motor M is inputted to the input shaft 203b of the transmission case 230 via the continuously variable transmission device 204, the input clutch 230A is also in a disconnected state, and therefore the utility vehicle still remains in the stopped state.

Upon the operation position of the accelerator pedal 215 reaching the second predetermined position, the rotation speed of the engine E reaches the preset value, the centrifugal clutch 239 comes into a connected state, and the rotational driving force of the engine E (the crankshaft 203a) is transmitted to the drive shaft 240. In a state where the accelerator pedal 215 has been operated beyond the second predetermined position, the engine E is driven to rotate at a rotation speed that corresponds to the operation position of the accelerator pedal 215.

Then, upon the operation position detection device such as a rotation sensor detecting that the operation position of the accelerator pedal 215 has reached the second predetermined position, a detection signal from a detection sensor (not shown) for detecting an OFF state of the input clutch operation lever 218 is simultaneously detected, and the control unit outputs an instruction to interrupt power supply to the assist motor M. Thus, the driving of the assist motor M using power supply from the battery 208 is stopped.

However, the output shaft 250 of the assist motor M is coupled to the drive shaft 240 of the continuously variable transmission device 204, and the continuously variable transmission device 204 is driven by the driving force of the engine E. Therefore, the assist motor M is also driven by the driving force of the engine E to serve as a generator, and charges the battery 208. Here, the input clutch 230A is in a disconnected state, and therefore the utility vehicle is kept in a stopped state.

(3) In the above-described other embodiment (2), even when the input clutch operation lever 218 has been turned OFF and the input clutch 230A for connecting and disconnecting power transmission from the continuously variable transmission device 204 to the transmission case 230 is in an OFF state (a disconnected state), only the assist motor M is driven at a rotation speed that corresponds to the operation position of the accelerator pedal 215 until the accelerator pedal 215 is operated to the first predetermined position or the second predetermined position. However, the present invention is not limited thereto.

For example, upon the detection sensor detecting that the input clutch operation lever 218 has been turned OFF and the input clutch 230A for connecting and disconnecting power transmission from the continuously variable transmission device 204 to the transmission case 230 is in an ON-state (a connected state), the rotational driving of the assist motor M may also be stopped, until the accelerator pedal 215 is operated to the first predetermined position or the second predetermined position.

(4) The present invention is not only applicable to a truck that includes a gasoline engine, but also to various kinds of multipurpose vehicles such as a truck that includes a diesel engine.

Fourth Embodiment

Overall Configuration

Figure 32:
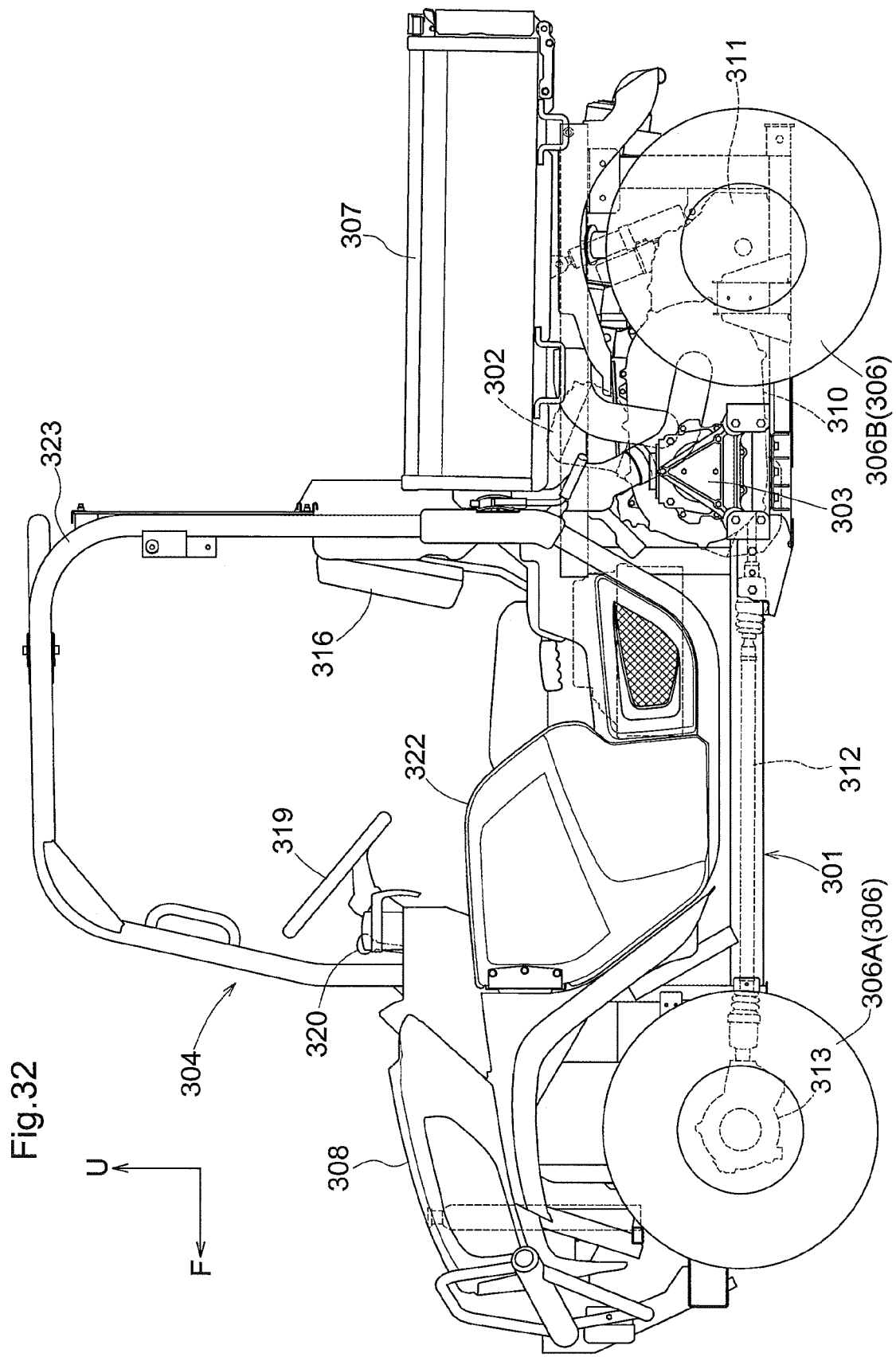
FIG. 32 is a left side view of a multipurpose vehicle according to a fourth embodiment (the same applies through to FIG. 36).
Figure 33:
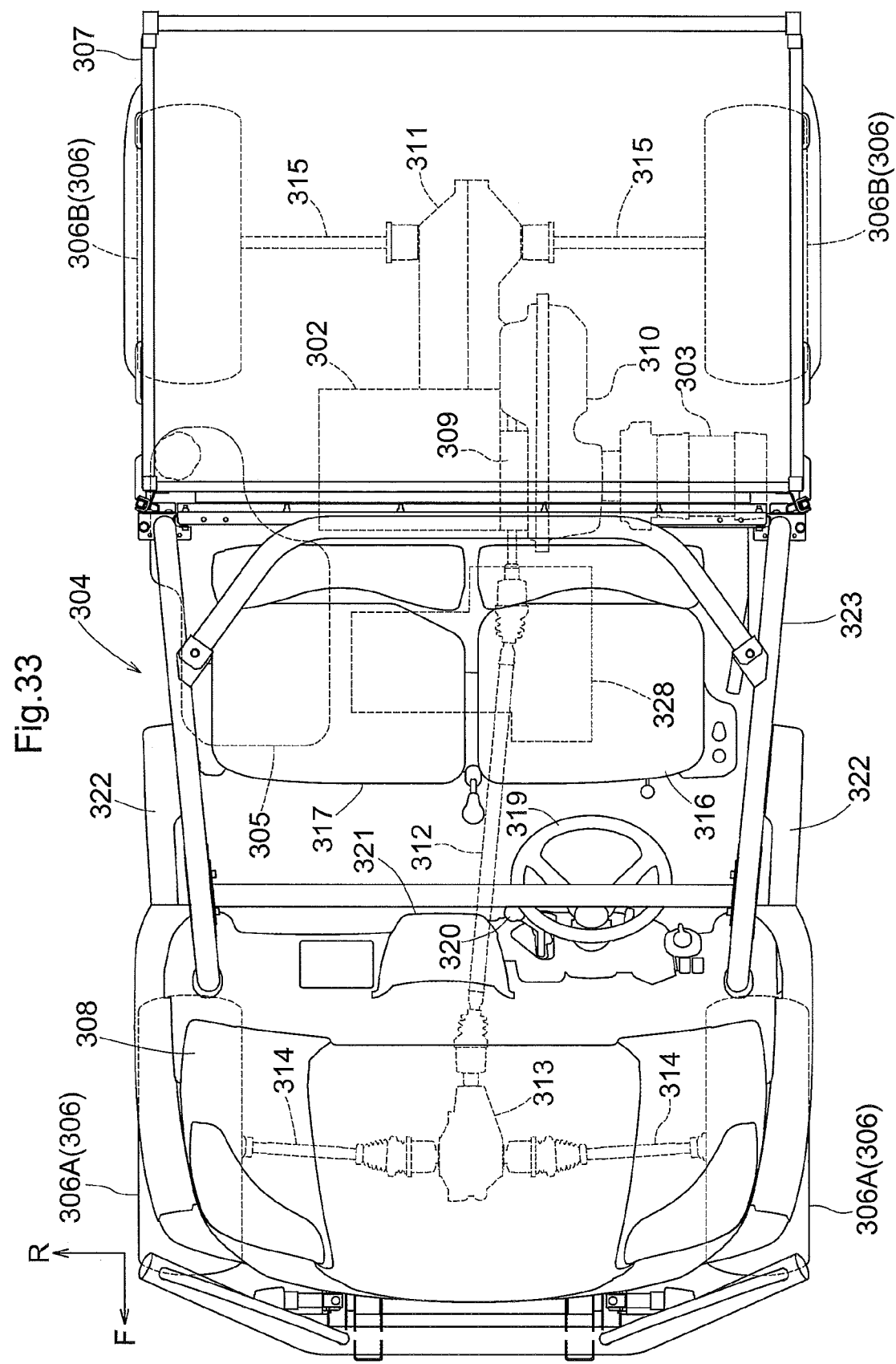
FIG. 33 is a plan view of the multipurpose vehicle.

As shown in FIGS. 32 and 33, a multipurpose work vehicle (an example of a work vehicle) includes, for example: a vehicle frame 301 that constitutes the framework of the vehicle body; a gasoline engine 302 (hereinafter referred to as "engine 302") and a motor generator 303 (an example of an electric motor) that serve as power supply sources that output travelling power, and are provided in a central portion of the vehicle body in the front-rear direction; a two-seater riding section 304 that is provided in a central portion of the vehicle body in the front-rear direction; a fuel tank 305 that is provided in a right side portion of the vehicle body; a wheel type travelling device 306 that has right and left front wheels 306A and right and left rear wheels 306B; a load carrying platform 307 that is attached to a rear portion of the vehicle body so as to be able to swing upward and downward; and a bonnet 308 that swings to open and close. The engine 302 and the motor generator 303 are interlocked and coupled to each other so that the engine 302 and the motor generator 303 can be connected and disconnected to/from each other, using an electromagnetic clutch (not shown).

Power from the power sources is transmitted to a gear type transmission device 311 via a centrifugal clutch 309 and a belt type continuously variable transmission device 310. Power for driving the front wheels, which is taken out from the gear type transmission device 311, is transmitted to the right and left front wheels 306A via a first power transmission shaft 312, a front wheel differential device 313, right and left second power transmission shafts 314, and so on. Also, power for driving the rear wheels, which is taken out from the gear type transmission device 311, is transmitted to the right and left rear wheels 306B via right and left third power transmission shafts 315 and so on.

Although not shown in the drawings, the gear type transmission device 311 includes a transmission mechanism, a rear wheel differential mechanism, right and left brakes, and so on, which are disposed in the casing of the gear type transmission device 311. The transmission mechanism switches power from the power sources to forward travelling power and a rearward travelling power, and also switches forward travelling power to two levels, namely a high level and a low level.

As shown in FIGS. 32 to 35, the riding section 304 includes, for example: a driver's seat 316 that is located on the left side; a passenger seat 317 that is located on the right side; an accelerator pedal 318 (an example of an acceleration tool) that is located in a foot area on the driver's seat side; a steering wheel 319 that is provided forward of the driver's seat 316 and is used to steer the front wheels; a front-rear swing type shift lever 320 that is located on the right side of the steering wheel 319 so as to be adjacent to the steering wheel 319; an indicator device 321 that indicates various kinds of information; right and left doors 322; and a protection frame 323. The shift lever 320 is configured to be switchable to a neutral position N, a low-speed forward travelling position L that is located forward of the neutral position N relative to the vehicle body, a high-speed forward travelling position H that is located forward of the low-speed forward travelling position L relative to the vehicle body, and a rearward travelling position R that is located rearward of the neutral position N relative to the vehicle body. The operation of the shift lever 320 is linked with the transmission mechanism via a control cable (not shown) or the like. The transmission mechanism is switched to a working state that corresponds to the operation position of the shift lever 320, based on an operation performed using the shift lever 320.

Description of Control Block

Figure 35:
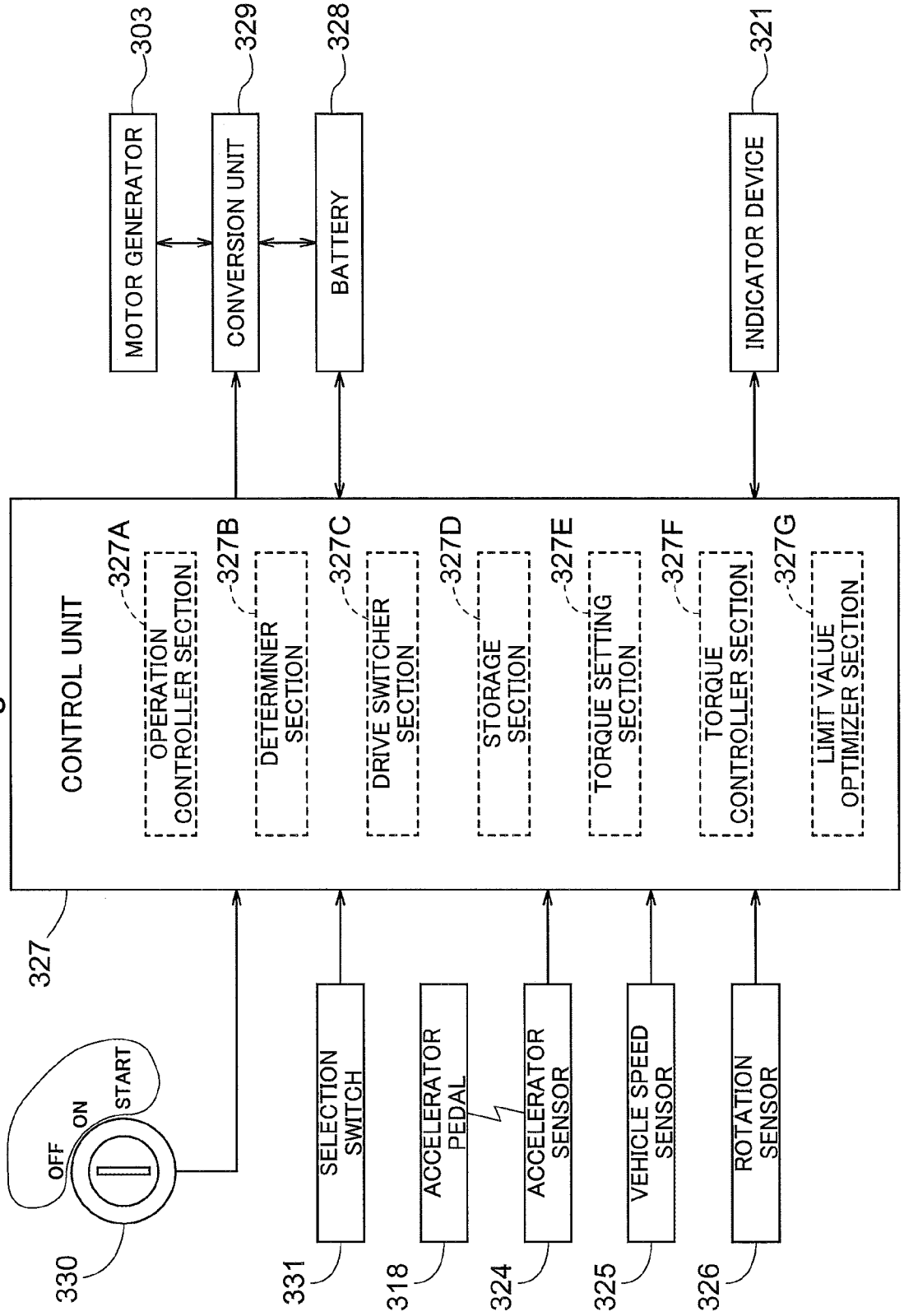
FIG. 35 is a block diagram showing a portion of a structure for controlling the multipurpose work vehicle.

As shown in FIGS. 33 and 35, the multipurpose work vehicle includes: an accelerator sensor 324 that detects the operation amount of the accelerator pedal 318 (an example of an acceleration tool); a vehicle speed sensor 325 that detects the speed of the vehicle; a rotation sensor 326 that detects the rotation speed of the motor generator 303; a control unit 327 that controls the operations of the motor generator 303 and so on; and a battery 328 that is charged using electrical power from the motor generator 303.

The control unit 327 is connected to various electrical components such as the motor generator 303 and the indicator device 321 via an in-vehicle communication network such as CAN (Controller Area Network), power lines, and so on so as to be able to communicate with, and transmit electrical power to, the electrical components. The battery 328 is a lithium ion battery that is connected to various electrical components such as the motor generator 303 and the control unit 327 via a conversion unit 329 and so on.

Although not shown in the drawings, the battery 328 includes, for example, a management system that monitors the voltage, current, temperature, and so on of the battery 328 and, for example, protects the battery 328 upon detecting an abnormality by restricting or stopping the charging and discharging of the battery 328. The motor generator 303 functions as a travelling motor using electrical power supplied from the battery 328, and functions as a generator using power from the engine 302. The conversion unit 329 includes an inverter, an AC-DC converter, a DC-DC converter, and so on.

Figure 34:
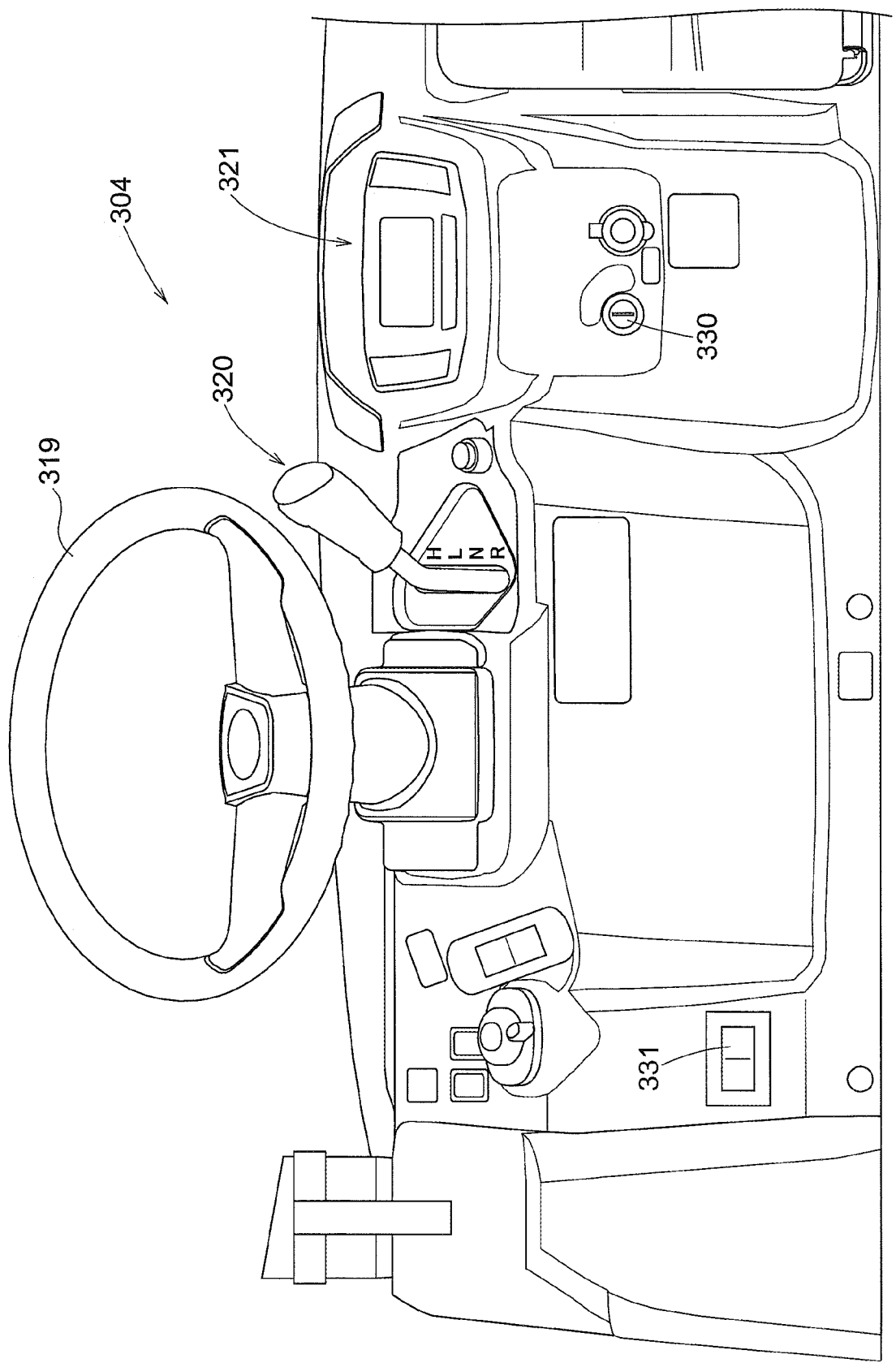

As shown in FIGS. 34 and 35, the multipurpose work vehicle includes a key-operated main switch 330 that connects and disconnects power supply to the electrical components such as the control unit 327. The main switch 330 can be operated to an "OFF" position, an "ON" position and a "START" position, and can also be held at the "OFF" position and the "ON" position. A biasing force is applied to return the main switch 330 from the "START" position to the "ON" position. Upon being manually operated to the "OFF" position, the main switch 330 switches the power state to a disconnected state, in which power supply from the battery 328 to the electrical components is disconnected. Upon being manually operated to the "ON" position, the main switch 330 switches the power state to a connected state, in which power supply from the battery 328 to the electrical components is connected. Upon being manually operated to the "START" position, the main switch 330 supplies the control unit 327 with an instruction to start the engine 302, while maintaining a connected state.

Although not shown in the drawings, the control unit 327 transmits an engine start instruction from the main switch 330 to an electronic control unit for the engine (hereinafter referred to as "engine ECU"). Based on the engine start instruction, the engine ECU starts up the starter motor and so on to start up the engine 302.

Detailed Configuration of Control Unit

As shown in FIGS. 34 and 35, the control unit 327 includes, for example: an operation controller section 327A that controls the operations of the motor generator 303, an electromagnetic clutch, and so on; a determiner section 327B that determines the operation position of the main switch 330; and a drive switcher section 327C that switches between travel drive modes in which the work vehicle travels. As the travel drive modes, the control unit 327 includes an electric mode in which the control unit 327 drives the travelling device 306 using only power from the motor generator 303, an engine drive mode in which the control unit 327 drives the travelling device 306 using only power from the engine 302, and a hybrid drive mode in which the control unit 327 drives the travelling device 306 using both power from the motor generator 303 and power from the engine 302.

Upon detecting that the main switch 330 has been switched from the "OFF" position to the "ON" position based on information from the determiner section 327B, the drive switcher section 327C switches the travel drive mode to the electric mode. Upon detecting that the main switch 330 has been switched from the "ON" position to the "START" position based on information from the determiner section 327B, the drive switcher section 327C switches the travel drive mode to the drive mode that has been manually selected using a selection switch 331 that is provided in the riding section 304. The selection switch 331 is switched to a first state in which the engine drive mode is to be selected, and a second state in which the hybrid drive mode is to be selected. If the selection switch 331 is in the first state, the drive switcher section 327C switches the travel drive mode to the engine drive mode. If the selection switch 331 is in the second state, the drive switcher section 327C switches the travel drive mode to the hybrid drive mode.

Thus, the driver can select the electric mode as the travel drive mode by operating the main switch 330 from the "OFF" position to the "ON" position, and can enable the vehicle body to travel without driving the engine 302. Then, in a state where the main switch 330 has been operated from the "ON" position to the "START" position and the engine 302 is driven, the driver can switch the travel drive mode to the engine drive mode and the hybrid drive mode by operating the selection switch 331.

Description of Modes

If the electric mode is selected, the operation controller section 327A switches the electromagnetic clutch to a disconnected state to interrupt the interlocking between the engine 302 and the motor generator 303, and thus the motor generator 303 is used as the travelling motor. Then, the operation controller section 327A controls the operation of the inverter of the conversion unit 329 based on, for example, an output from the accelerator sensor 324 and a control program for the electric mode. The inverter outputs, to the motor generator 303, a drive control current (such as a PWM (pulse width modulation) signal) that corresponds to, for example, the operation amount of the accelerator pedal 318, according to the control operation performed by the operation controller section 327A.

If the engine drive mode is selected, the operation controller section 327A switches the electromagnetic clutch to a connected state to use the motor generator 303 as a generator that generates electrical power using power from the engine 302. Then, the operation controller section 327A transmits an output from the accelerator sensor 324 to the engine ECU. The engine ECU controls the output rotation speed of the engine 302 based on, for example, the output from the accelerator sensor 324 and a control program for the engine drive mode.

If the hybrid drive mode is selected, the operation controller section 327A transmits an output from the accelerator sensor 324 to the engine ECU, and controls, for example, the operations of the electromagnetic clutch and the inverter of the conversion unit 329 based on, for example, an output from the accelerator sensor 324 and a control program for the hybrid drive mode. The engine ECU controls the output rotation speed of the engine 302 based on, for example, the output from the accelerator sensor 324 and a control program for the engine drive mode. The inverter outputs, to the motor generator 303, a drive control current (such as a PWM signal) that corresponds to, for example, the requested assisting force, based on, for example, an output from the accelerator sensor 324 and a control program for the hybrid drive mode.

That is, with the above-described configuration, the driver can adjust the vehicle speed by pressing the accelerator pedal 318 regardless of which travel drive mode has been selected.

A rotary potentiometer or the like can be employed as the accelerator sensor 324. Electromagnetic pickup type sensors or the like can be employed as the vehicle speed sensor 325 and the rotation sensor 326.

Torque Map

Figure 36:
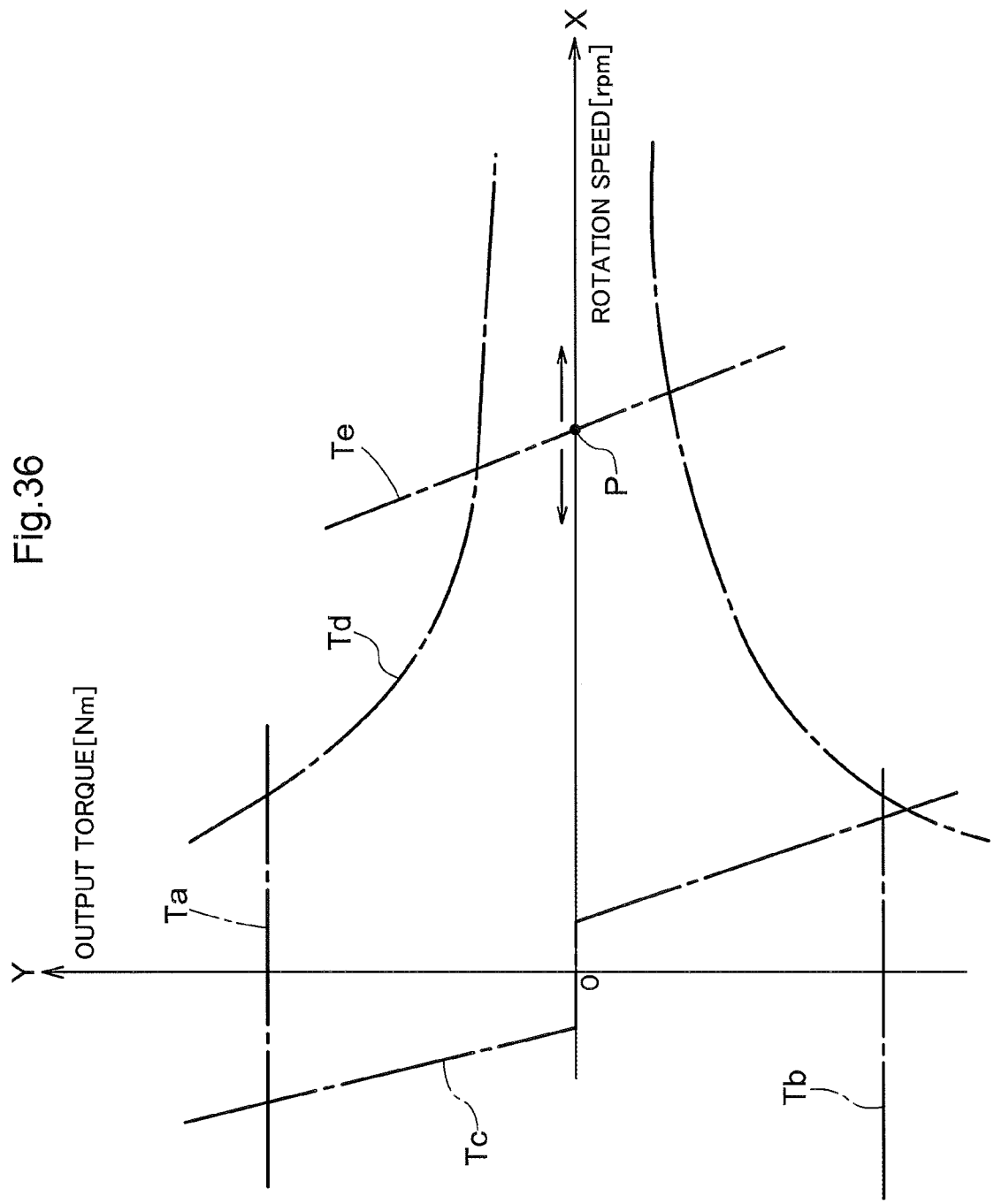
FIG. 36 is a torque map for the multipurpose work vehicle, which shows a relationship between the rotation speed of an electric motor and a torque limit value that is based on an output torque and a speed limit value.

As shown in FIGS. 35 and 36, the control unit 327 includes: a storage section 327D that stores a torque map (an example of data) that shows the relationship between the rotation speed and the output torque of the motor generator 303; a torque setting section 327E that sets a torque instruction value in the electric mode based on the torque map, detection performed by the accelerator sensor 324, and detection performed by the rotation sensor 326; and a torque controller section 327F that controls the operation of the motor generator 303 in the electric mode so that the output torque reaches the torque instruction value. The storage section 327D stores a torque limit value (a second torque limit value Te described below) that has been set based on the speed limit value (the maximum vehicle speed) of the vehicle. A non-volatile memory such as an EEPROM (Electrically Erasable Programmable Read-Only Memory) is employed as the storage section 327D.

In the torque map as shown in FIG. 36, a horizontal axis X indicates the rotation speed of the motor generator 303, and a vertical axis Y indicates the output torque of the motor generator 303. In the torque map, the area above the horizontal axis X is a power running area, and the area below the horizontal axis X is a regenerative area. The upper horizontal line in the torque map indicates a torque upper limit value Ta that is determined based on a motor generator 303 that is employed. The lower horizontal line in the torque map indicates a torque lower limit value Tb that is determined based on a motor generator 303 that is employed. The oblique line on the low-speed side in the torque map indicates a torque lower limit value Tc that ensures stable travelling at a low speed. The upper curve in the torque map indicates a first torque limit value Td that is based on a current limit value. The oblique line on the high-speed side in the torque map indicates a second torque limit value Te that is based on a speed limit value. Basically, the second torque limit value Te is set such that the vehicle speed is kept at the speed limit value when the driver increases the operation amount of the accelerator pedal 318 to the maximum while the multipurpose work vehicle is travelling on flat ground in the electric mode.

Limit Value Optimizer Section

As shown in FIGS. 35 and 36, the control unit 327 includes a limit value optimizer section 327G that appropriately adjusts the second torque limit value Te based on, for example, detection performed by the vehicle speed sensor 325. In the electric mode, if the torque instruction value reaches the second torque limit value Te when the vehicle speed has not reached the speed limit value, the limit value optimizer section 327G performs limit value lowering processing to lower the second torque limit value Te so that the vehicle speed increases toward the speed limit value, and if the vehicle speed exceeds the speed limit value, the limit value optimizer section 327G performs limit value raising processing to raise the second torque limit value Te so that the vehicle speed decreases toward the speed limit value.

With this configuration, for example, when the multipurpose work vehicle is travelling in the electric mode on an upslope or the like that has a large travelling resistance, if the torque instruction value set by the torque setting section 327E reaches the second torque limit value Te before the vehicle speed reaches the speed limit value, the limit value optimizer section 327G performs limit value lowering processing, so that the torque instruction value decreases together with the second torque limit value Te (in the torque map shown in FIG. 36, the intersection P of the oblique line indicating the second torque limit value Te, with the horizontal axis X, is displaced to the right). Thus, even if the travelling resistance is large, it is possible to raise the vehicle speed toward the speed limit value due to the torque controller section 327F performing control. Then, upon the vehicle speed reaching the speed limit value, the limit value optimizer section 327G ends limit value lowering processing, and the vehicle speed is kept at the speed limit value due to the torque controller section 327F performing control based on the torque instruction value at this end point.

Conversely, when the multipurpose work vehicle is travelling in the electric mode on a downslope or the like that has a small travelling resistance, if the vehicle speed exceeds the speed limit value, the limit value optimizer section 327G performs limit value raising processing to raise the torque instruction value, so that the torque instruction value increases together with the second torque limit value Te (in the torque map shown in FIG. 36, the intersection P of the oblique line indicating the second torque limit value Te with the horizontal axis X is displaced to the left). Thus, if the travelling resistance is small, it is possible to lower the vehicle speed toward the speed limit value through control performed by the torque controller section 327F. Then, upon the vehicle speed reaching the speed limit value, the limit value optimizer section 327G ends limit value raising processing, and the vehicle speed is kept at the speed limit value due to the torque controller section 327F performing control based on the torque instruction value at this end point.

That is, due to control performed by the limit value optimizer section 327G, it is possible to appropriately adjust the second torque limit value Te according to changes in the travelling resistance, and due to this adjustment, it is easier to keep the vehicle speed at the speed limit value regardless of changes in the travelling resistance.

The limit value optimizer section 327G may perform integral control (I control) using the speed limit value as a target value and the vehicle speed as a control amount, to perform the limit value raising processing.

Thus, it is possible to eliminate a residual deviation that occurs in limit value raising processing.

Consequently, it is possible to keep the vehicle speed at the speed limit value with high accuracy when the multipurpose work vehicle is travelling on a downslope or the like that has a small travelling resistance.

Other Embodiments Modified from Fourth Embodiment

The following only describes features that are different from those of the above-described embodiment.

(1) The configuration of the work vehicle may be variously modified.

For example, the work vehicle may include a semi-crawler type travelling device 306 that includes right and left crawlers instead of the right and left rear wheels 306B.

For example, the work vehicle may include a full-crawler type travelling device 306 that includes right and left crawlers instead of the right and left front wheels 306A and the right and left rear wheels 306B.

For example, the work vehicle may be configured as a hybrid vehicle that includes a diesel engine that has a common rail system, instead of the gasoline engine 302.

For example, the work vehicle may be configured as an electric vehicle that is not provided with the engine 302 and is only provided with an electric motor (or a motor generator).

For example, the work vehicle may include an accelerator lever for setting constant speed, which serves as an acceleration tool, instead of the accelerator pedal 318 in the foregoing embodiment.

For example, the work vehicle may include an accelerator pedal and an accelerator lever for setting constant speed, which serve as acceleration tools.

(2) The electric motor may be a travelling-dedicated motor that is not provided with the functions of a generator. Alternatively, the electric motor may be an in-wheel type motor.

(3) The storage section 327D may store a relational equation, which is data indicating the rotation speed of the electric motor and the output torque, instead of the torque map.

(4) The limit value optimizer section 327G may perform integral control (I control) to perform the above-described limit value lowering processing and limit value raising processing.

(5) The limit value optimizer section 327G may be configured to perform proportional control (P control (proportional control)) and integral control (I control) to perform at least one of the above-described limit value lowering processing and limit value raising processing.

(6) In the foregoing embodiment the work vehicle is a multipurpose work vehicle. However, the present invention is applicable to other kinds of work vehicles such as a tractor and riding-type mower.

What is claimed is:

1. A work vehicle comprising:
an engine;
a continuously variable transmission device that is located on a lateral side of the engine and receives a driving force from the engine, the continuously variable transmission device having a drive shaft;
an assist motor that is located opposite the engine across the continuously variable transmission device, the assist motor having an output shaft that extends coaxially with the drive shaft and is interlocked with the drive shaft;
a motor support platform that supports the assist motor, the motor support platform protruding more outward than the continuously variable transmission device does in a lateral direction relative to a vehicle body; and
a slide movement mechanism that is provided for the motor support platform, the slide movement mechanism being configured to change a position at which the assist motor is attached, relative to the continuously variable transmission device, axially of the drive shaft, between a connected position and a disconnected position of the drive shaft and the output shaft.

2. The work vehicle according to claim 1, further comprising:
a vehicle frame to which the engine and the continuously variable transmission device are attached;
wherein the motor support platform includes an extension frame portion that protrudes more outward than the continuously variable transmission device attached to the vehicle frame does in a lateral direction relative to the vehicle body, and a motor attachment frame that is attached to the extension frame portion so as to be movable relative to the extension frame portion,
the slide movement mechanism is provided between the extension frame portion and the motor attachment frame, and
the assist motor is attached to the motor attachment frame.

3. The work vehicle according to claim 2, wherein
the slide movement mechanism includes an elongated slot that is formed in one of the extension frame portion and the motor attachment frame and extends axially of the drive shaft, and a guide member that is formed on the other of the extension frame portion and the motor attachment frame and is guided by being engaged with the elongated slot.

4. A multipurpose vehicle comprising:
a pair of right and left front wheels and a pair of right and left rear wheels;
a vehicle frame that is supported by the front wheels and the rear wheels;
a driving section that is located on a front portion of the vehicle frame;
a load carrying platform that is located on the vehicle frame at a position that is rearward of the driving section;
an engine and an assist motor that transmit driving forces to the front wheels and the rear wheels, the engine being located below the load carrying platform, the assist motor being located forward of the rear wheels and laterally outward of the engine, and the assist motor including a connection terminal portion, to which a wire is connected, in an upper portion thereof; and a motor cover that covers the assist motor, the motor cover including a top cover portion that covers an upper portion of the assist motor, the upper portion including the connection terminal portion, and a cover supporting portion that supports the top cover portion, the cover supporting portion including an opening portion that allows external air to come into contact with the assist motor.

5. The multipurpose vehicle according to claim 4, wherein the motor cover covers a bottom surface of the assist motor, a rear surface of the assist motor, which faces a front side of the rear wheels, and the connection terminal portion and the vicinity thereof, and a front surface and right and left surfaces of the assist motor are open to the outside through the opening portion.

6. The multipurpose vehicle according to claim 4, further comprising:

a motor support platform that protrudes laterally outward from the vehicle frame, and on which the assist motor is mounted; and a continuously variable transmission mechanism that is provided on a lateral side of the engine, wherein the cover supporting portion is attached to the motor support platform at a position that is laterally outward of the continuously variable transmission mechanism, and the top cover portion is coupled to the vehicle frame at a position that is forward of the motor support platform.

7. A work vehicle comprising:
an acceleration tool;
an accelerator sensor that detects an operation amount of the acceleration tool;
a vehicle speed sensor that detects a vehicle speed;
an electric motor that outputs travelling power;
a rotation sensor that detects a rotation speed of the electric motor;
a control unit that controls an operation of the electric motor;
wherein the control unit includes: a storage section that stores data that indicates a relationship between the rotation speed and output torque of the electric motor; a torque setting section that sets a torque instruction value based on the data, detection performed by the accelerator sensor and detection performed by the rotation sensor; and a torque controller section that controls an operation of the electric motor so that the output torque reaches the torque instruction value,
the storage section stores a torque limit value that has been set based on a speed limit value of the vehicle,
the control unit includes a limit value optimizer section,
if the torque instruction value reaches the torque limit value when the vehicle speed has not reached the speed limit value, the limit value optimizer section performs limit value lowering processing to lower the torque limit value so that the vehicle speed increases toward the speed limit value, and
if the vehicle speed exceeds the speed limit value, the limit value optimizer section performs limit value raising processing to raise the torque limit value so that the vehicle speed decreases toward the speed limit value.

8. The work vehicle according to claim 7, wherein
the limit value optimizer section performs integral control using the speed limit value as a target value and the vehicle speed as a control amount, to perform the limit value raising processing.

* * * * *